United States Patent
Yamaga et al.

(10) Patent No.: US 10,665,259 B1
(45) Date of Patent: May 26, 2020

(54) MAGNETIC RECORDING MEDIUM AND CARTRIDGE

(71) Applicant: Sony Corporation, Tokyo (JP)

(72) Inventors: Minoru Yamaga, Miyagi (JP); Noboru Sekiguchi, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/455,158

(22) Filed: Jun. 27, 2019

(30) Foreign Application Priority Data

May 8, 2019 (JP) ................................. 2019-088508

(51) Int. Cl.
*G11B 5/706* (2006.01)
*G11B 5/78* (2006.01)
*G11B 5/73* (2006.01)
*G11B 5/008* (2006.01)

(52) U.S. Cl.
CPC ...... *G11B 5/73927* (2019.05); *G11B 5/00813* (2013.01); *G11B 5/78* (2013.01)

(58) Field of Classification Search
CPC ........... G11B 7/35; G11B 5/706; G11B 5/584; G11B 5/78; G11B 5/70; G11B 5/65; G11B 5/725; G11B 5/667; G11B 5/735; G11B 5/70684; G11B 5/127; G11B 5/738; G11B 5/7085; G11B 5/7013; G11B 5/70678

USPC ................... 360/134, 231, 90, 77.12, 73.04; 428/832.2, 845.1, 847.2, 847.8
See application file for complete search history.

(56) References Cited

U.S. PATENT DOCUMENTS

2007/0009768 A1* 1/2007 Takeda .................... G11B 5/70
428/842

FOREIGN PATENT DOCUMENTS

| JP | 2005-332510 A | 12/2005 |
|---|---|---|
| JP | 2009-087471 A | 4/2006 |
| JP | 2007-250147 A | 9/2007 |
| JP | 2010-218684 A | 9/2010 |
| JP | 2014-199706 A | 10/2014 |

* cited by examiner

*Primary Examiner* — Nabil Z Hindi
(74) *Attorney, Agent, or Firm* — K&L Gates LLP

(57) ABSTRACT

A tape-type magnetic recording medium, includes a substrate; and a magnetic layer provided on the substrate. In a case where $w_{max}$ and $w_{min}$ are respectively maximum and minimum of average values of width of the magnetic recording medium measured under four environments whose temperature and relative humidity are (10° C., 10%), (10° C., 80%), (29° C., 80%), and (45° C., 10%), respectively, $w_{max}$ and $w_{min}$ satisfy a relation of $(w_{max}-w_{min})/w_{min} \leq 400$ [ppm]. The substrate contains polyester, and the magnetic layer has a squareness ratio of 65% or more in the vertical direction.

27 Claims, 13 Drawing Sheets

MAGNETIC RECORDING MEDIUM AND CARTRIDGE

CROSS REFERENCE TO RELATED APPLICATIONS

This application claims the benefit of Japanese Priority Patent Application JP 2019-088508 filed on May 8, 2019, the entire contents of which are incorporated herein by reference.

TECHNICAL FIELD

The present disclosure relates to a magnetic recording medium and a cartridge.

BACKGROUND ART

Tape-type magnetic recording media have been widely used as data storage for computers. Such magnetic recording media have been studied for various characteristics improvements, one of which is off-track characteristics improvement.

PTL 1 describes a tape-type magnetic recording medium in which environmentally-induced width-direction size changes are reduced to ensure stable recording and reproducing characteristics with reduced off-track. Furthermore, PTL 1 describes reduction of a width-direction size change amount with respect to a longitudinal-direction tension change.

CITATION LIST

Patent Literature

[PTL 1]
JP 2005-332510 A

SUMMARY

Technical Problem

Recently, the tape-type magnetic recording media have been configured to have more recording tracks in response to the demand for greater capacity, thereby having narrower recording track widths. With such a configuration, a slight change in the width of the tape-type magnetic recording media due to a change in environmental temperature or humidity after recording data on the magnetic recording media would possibly cause off-track.

The purpose of the present disclosure is to provide a magnetic recording medium and a cartridge which can down-regulate off-track even in a case where a change in environmental temperature or humidity occurs.

Solution to Problem

A first disclosure to achieve the above object relates to a tape-type magnetic recording medium, including: a substrate; and a magnetic layer provided on the substrate, in which $$(w_{max} - w_{min})/w_{min} \leq 400 \text{ [ppm]} \qquad (1)$$

where $w_{max}$ and $w_{min}$ are respectively maximum and minimum of average values of width of the tape-type magnetic recording medium measured under four environments whose temperature and relative humidity are (10° C., 10%), (10° C., 80%), (29° C., 80%), and (45° C., 10%), respectively, the substrate containing polyester, and the magnetic layer having a squareness ratio of 65% or more in the vertical direction.

A second disclosure relates to a cartridge, including: the magnetic recording medium according to the first disclosure; and a memory including an area for storing adjustment information for adjusting a tension applied on the magnetic recording medium in a longitudinal direction.

DESCRIPTION OF EMBODIMENTS

Embodiments of the present disclosure will be described in the following order. Note that like or corresponding sections will be labeled in the same manner in all the drawings for these embodiments.

1 First Embodiment
2 Second Embodiment
3 Modifications

[Configuration of Recording and Reproducing System]

Figure 1:
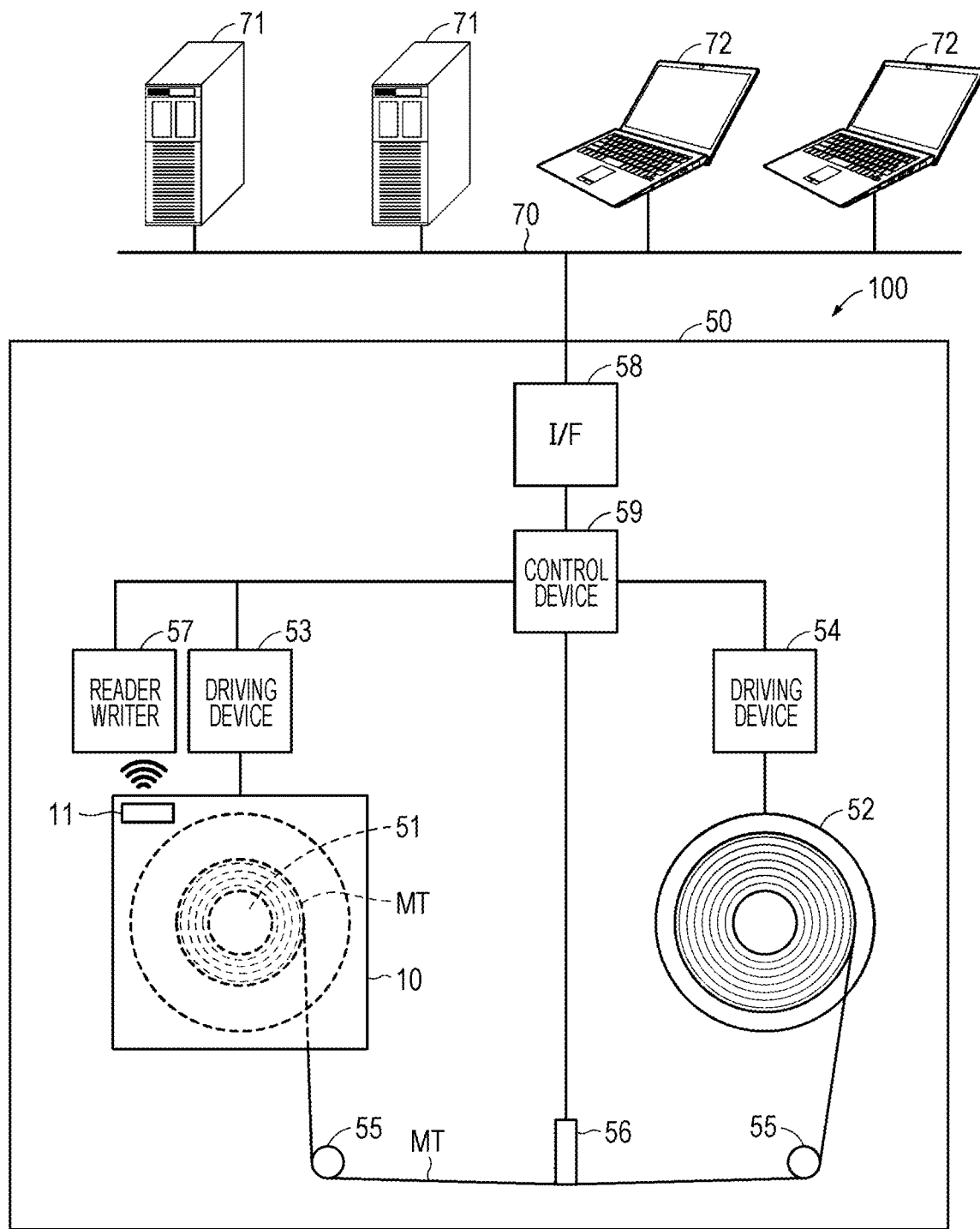
FIG. 1 is a schematic diagram illustrating one example of a configuration of a recording and reproducing system according to a first embodiment of the present disclosure.

FIG. 1 is a schematic diagram illustrating one example of a configuration of a recording and reproducing system 100 according to the first embodiment of the present disclosure. The recording and reproducing system 100 is a magnetic tape recording and reproducing system and includes a cartridge 10 and a recording and reproducing device 50 configured such that the cartridge 10 can be loaded and unloaded to/from the recording and reproducing device 50.

[Configuration of Cartridge]

Figure 2:
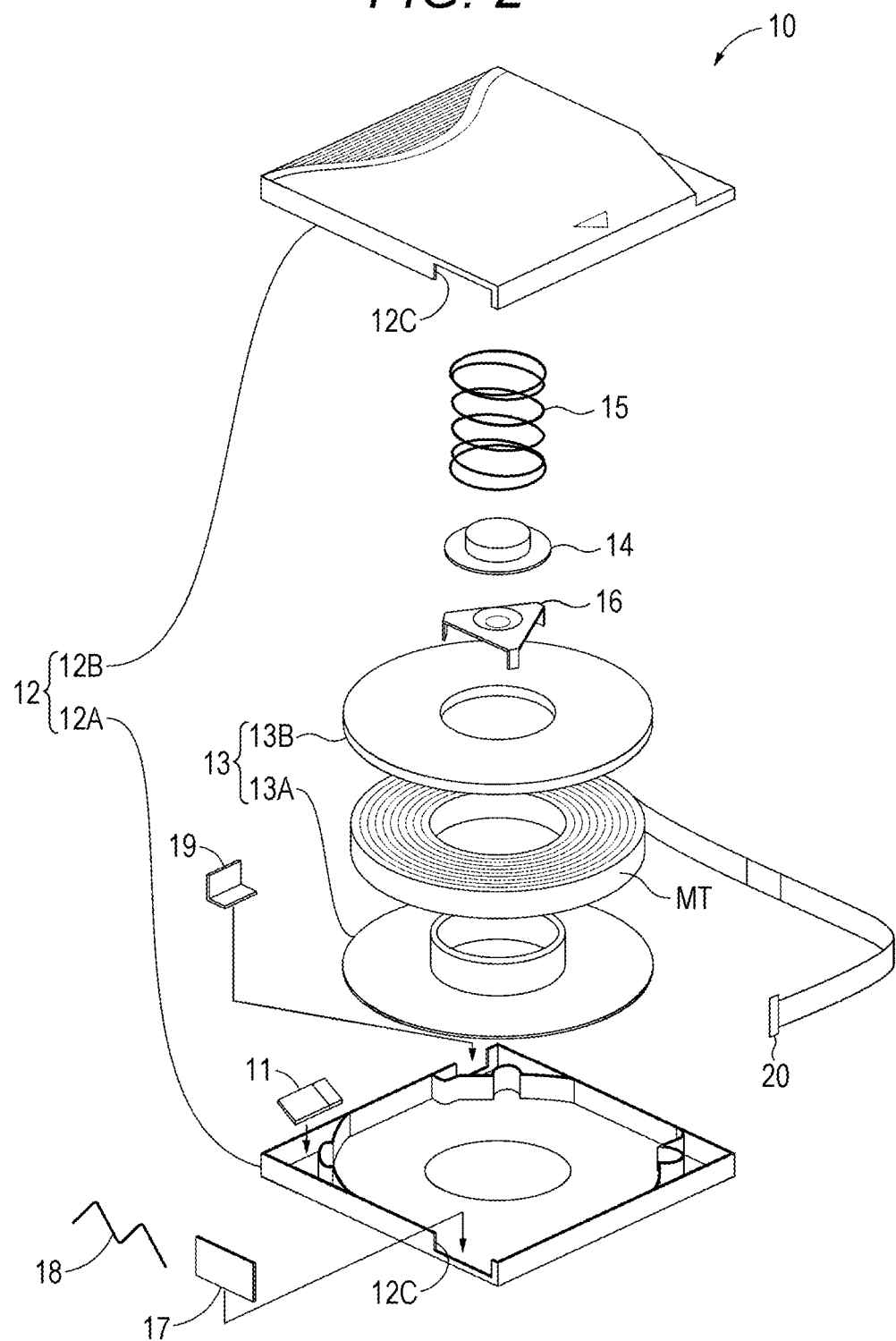
FIG. 2 is an exploded perspective view illustrating one example of a configuration of a cartridge.

FIG. 2 is an exploded perspective view illustrating one example of a configuration of the cartridge 10. The cartridge 10 is a magnetic-tape cartridge based on the Linear Tape-Open (LTO) standard, and includes, inside a cartridge case 12 constituted by a lower shell 12A and an upper shell 12B, a reel 13 around which a magnetic tape (tape-type magnetic recording medium) MT is wound up, a reel lock 14 and a reel spring 15 for locking rotation of the reel 13, a spider 16 for releasing the reel 13 from the locking, a slide door 17 for opening and closing a tape outlet 12C provided on the cartridge case 12 in such a way that the tape outlet 12C opens partly on the lower shell 12A and partly on the upper shell 12B, a door spring 18 for biasing the slide door 17 toward a position for closing the tape outlet 12C, a light protect 19 for preventing erroneous deletion, and a cartridge memory 11. The reel 13 has a substantially disk shape having an opening at its center, and is constituted by a reel hub 13A and a flange 13B made from a rigid material such as plastic. At one end of the magnetic tape MT, a reader pin 20 is provided.

The cartridge memory 11 is provided in the vicinity of one corner section of the cartridge 10. The cartridge 10 is configured such that the cartridge memory 11 faces a reader writer 57 of a recording and reproducing device 50 when the cartridge 10 is loaded to the recording and reproducing device 50. The cartridge memory 11 is configured to communicate with the recording and reproducing device 50, more specifically with the reader writer 57 according to the wireless communication standard based on the LTO standard.

[Configuration of Cartridge Memory]

Figure 3:
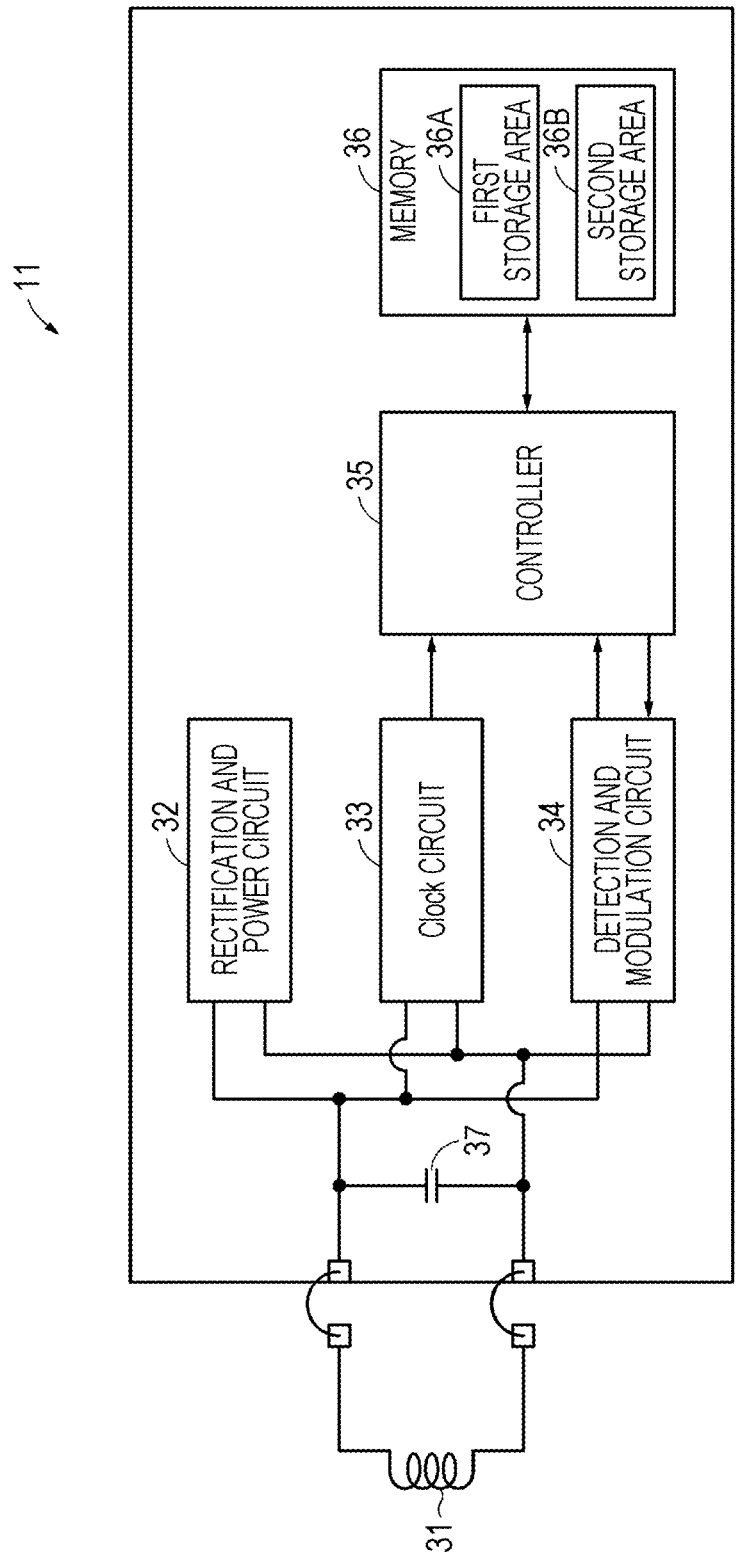
FIG. 3 is a block diagram illustrating one example of a configuration of a cartridge memory.

FIG. 3 is a block diagram illustrating one example of a configuration of the cartridge memory 11. The cartridge memory 11 includes an antenna coil (communicating unit) 31 for communicating with the reader writer 57 according to a prescribed communication standard, a rectification and power circuit 32 for forming a power source by power generation and rectification by using an induced electromotive force from electric waves received via the antenna coil 31, a clock circuit 33 for generating clock, likewise by using the induced electromotive force from the electric waves received via the antenna coil 31, a detection and modulation circuit 34 for performing detection of the electric waves received via the antenna coil 31 and modulation of a signal to be transmitted via the antenna coil 31, a controller (control unit) 35 constituted by logic circuits and the like for finding commands and data in a digital signal extracted from the detection and modulation circuit 34 and processing the commands and data, and a memory (storage unit) 36 for storing information. Furthermore, the cartridge memory 11 includes a capacitor 37 connected in parallel with respect to the antenna coil 31, by which a resonance circuit is formed with the antenna coil 31 and the capacitor 37.

The memory 36 is configured to store information or the like related to the cartridge 10. The memory 36 is a nonvolatile memory (NVM). Preferably, the memory 36 has a recording capacity of approximately 32 KB or more.

The memory 36 has a first storage area 36A and a second storage area 36B. The first storage area 36A corresponds to storage areas of cartridge memories based on the LTO standard generations up to LTO-8 (hereinafter, "conventional cartridge memories"), and is an area for storing information based on the LTO standard generations up to LTO-8. The information based on the LTO standard generations up to LTO-8 may be, for example, production information (for example, product number unique to the cartridge 10 or the like), usage history (for example, count of pulling out the tape from the cartridge 10 (thread count), or the like.

The second storage area 36B corresponds to an expanded storage area other than the storage areas of the conventional cartridge memories. The second storage area 36B is an area for storing additional information. Here, the additional information means information relating to the cartridge 10 but is not prescribed under the LTO standard generations up to LTO-8. Examples of the additional information include tension adjusting information, management ledger data, index information, and video thumbnail information stored on the magnetic tape MT, etc., but not limited to these data. The tension adjusting information is information for adjusting tension that may occur longitudinally on the magnetic tape MT The tension adjusting information includes how long a distance between adjacent servo bands was when recording data on the magnetic tape MT (a distance between servo patterns recorded respectively in the adjacent servo bands). The distance between the adjacent servo bands is one example of width-related information relating to the width of the magnetic tape MT. Details of the distance between the servo bands will be described later. In the descriptions below, information to be stored in the first storage area 36A may be referred to as "first information" and information to be stored in the second storage area 36B may be referred to as "second information".

The memory 36 may include a plurality of banks. In this case, the memory 36 may be configured such that one or some of the plurality of banks constitute the first storage area 36A while the rest of the plurality of banks constitute the second storage area 36B.

The antenna coil 31 is configured to induce an induction voltage by electromagnetic induction. The controller 35 is configured to communicate with the recording and reproducing device 50 according to the prescribed communication standard via the antenna coil 31.

Specifically, for example, the controller 35 performs two-way authentication, command transmission and reception, data transmission and reception, or the like.

The controller 35 is configured to store in the memory 36 the information received from the recording and reproducing device 50 via the antenna coil 31. For example, the controller 35 stores in the second storage area 36B of the memory 36 the tension adjusting information received from the recording and reproducing device 50 via the antenna coil 31. The controller 35 is configured to, in response to a request from the recording and reproducing device 50, read out information from the memory 36 and transmit the information to the recording and reproducing device 50 via the antenna coil 31. For example, in response to a request from the recording and reproducing device 50, the controller 35 reads out the tension adjusting information from the second storage area 36B of the memory 36 and transmits the tension adjusting information to the recording and reproducing device 50 via the antenna coil 31.

[Configuration of Magnetic Tape]

Figure 4:
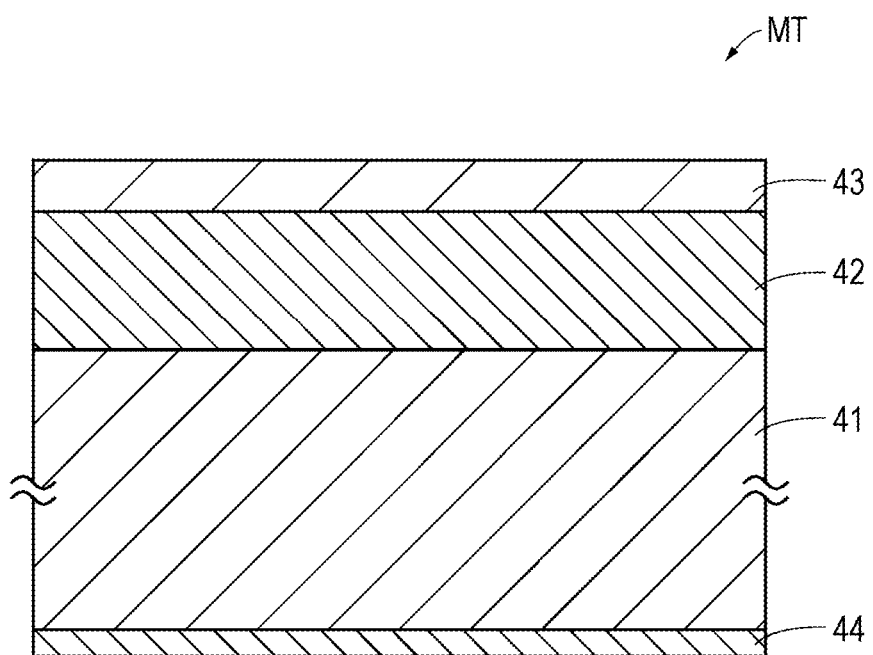
FIG. 4 is a sectional view illustrating one example of a configuration of a magnetic tape.

FIG. 4 is a sectional view illustrating one example of a configuration of the magnetic tape MT The magnetic tape MT includes a substrate 41 having a long tape-like shape, an underlayer 42 provided on one of main surfaces of the substrate 41, a magnetic layer 43 provided on the underlayer 42, and a back layer 44 provided on the other one of the main surfaces of the substrate 41. Note that the underlayer 42 and the back layer 44 are provided if necessary, and may be omitted.

The magnetic tape MT has a long tape-like shape and runs in the longitudinal direction when recording or reproducing. Note that a surface of the magnetic layer 43 is the surface over which a magnetic head runs. It is preferable that the magnetic tape MT be used for a recording and reproducing device equipped with a ring-type head as a recording head. It is preferable that the magnetic tape MT be used in a recording and reproducing device capable of recording data with a data track width of 1500 nm or less or of 1000 nm or less.

(Substrate)

The substrate 41 is a non-magnetic supporting member for supporting the underlayer 42 and the magnetic layer 43. The substrate 41 has a long tape-like film shape. The substrate 41 has an average thickness whose upper limit is preferably 4.2 µm or less, more preferably 3.8 µm or less, or further more preferably 3.4 µm or less. When the upper limit of average thickness of the substrate 41 is 4.2 µm or less, it may become possible to attain a greater recording capacity recordable in one data cartridge than general magnetic tapes. A lower limit of the average thickness of the substrate 41 is preferably 3 µm or more, more preferably 3.2 µm or more. When the lower limit of the average thickness of the substrate 41 is 3 µm or more, it may become possible to alleviate strength deterioration of the substrate 41.

The average thickness of the substrate 41 can be worked out as below. To begin with, a magnetic tape MT of ½ inches in width is prepared and cut to 250 mm in length, so as to prepare a sample. After that, the layers other than the substrate 41 (that is, the underlayer 42, the magnetic layer 43, and the back layer 44) are removed from the sample with a solvent such as MEK (methylethylketone) or a dilute hydrochloric acid. After that, the thickness of the sample (substrate 41) is measured at five or more measuring points by using a laser hologauge (Mitsutoyo) as a measuring device, and measurements thus obtained are simply averaged (arithmetic average) to work out the average thickness of the substrate 41. Note that the measuring points are selected randomly on the sample.

The substrate 41 contains polyester. With the polyester contained in the substrate 41, the substrate 41 can reduce a longitudinal Young's modulus, for example, to less than 7.5 GPa. Therefore, by using the recording and reproducing device 50 to adjust the longitudinal tension on the magnetic tape MT in running, it is possible to keep the width of the magnetic tape MT constant or substantially constant.

The polyester includes at least one of, for example, polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB), or polyethylene bisphenoxy carboxylate.

In a case where the substrate the substrate 41 includes two or more polyesters, the two or more polyesters may be mixed together, copolymerized, or laminated. The polyester may be modified at a terminal and/or on a side chain.

For example, by the following way, it is possible to confirm that the substrate 41 contains polyester. To begin with, the other layers than the substrate 41 are removed from the sample in a similar way as in the measuring method of the average thickness of the substrate 41. After that, by infrared absorption spectrometry (IR), IR spectrum of the sample (substrate 41) is obtained. On the basis of this IR spectrum, it is possible to confirm that the substrate 41 contains polyester.

In addition to polyester, the substrate 41 may further contain, for example, at least one of polyamide, polyimide, or polyamideimide, or may further contain at least one of polyamide, polyimide, polyamideimide, polyolefins, cellulose derivatives, vinyl resin, or other polymer resin. The polyamide may be aromatic polyamide (aramid). The polyimide may be aromatic polyimide. The polyamideimide may be aromatic polyamideimide.

In a case where the substrate 41 contains a polymer resin other than polyester, it is preferable that the substrate 41 contain polyester as its main component. Here, "main component" means a component that accounts for the greatest content (mass ratio) in the substrate 41 among the polymer reins contained therein. In a case where the substrate 41 contains a polymer resin other than polyester, polyester and the polymer resin other than polyester may be mixed together or copolymerized.

The substrate 41 may be biaxially extended in a longitudinal direction and a width direction. The polymer resin(s) contained in the substrate 41 is (are) preferably oriented diagonally to the width direction of the substrate 41.

(Magnetic Layer)

The magnetic layer 43 is a recording layer for recording signals thereon. The magnetic layer 43 includes, for example, magnetic powder and a bonding agent. The magnetic layer 43 may further contain at least one additive among a lubricant, an anti-static agent, an abrading agent, a curing agent, an anti-rusting agent, non-magnetic reinforcing particles, and the like, if necessary.

It is preferable that the magnetic layer 43 have a surface with many pores and a lubricant be contained in the pores With this configuration, it may become possible to reduce abrasion caused when the magnetic tape MT touches a head. It is preferable that the pores extend along a vertical direction to the surface of the magnetic layer 43, because this configuration can make it easier to supply the lubricant to the surface of the magnetic layer 43. Note that part of the pores may be extended in the vertical direction.

Figure 5A:
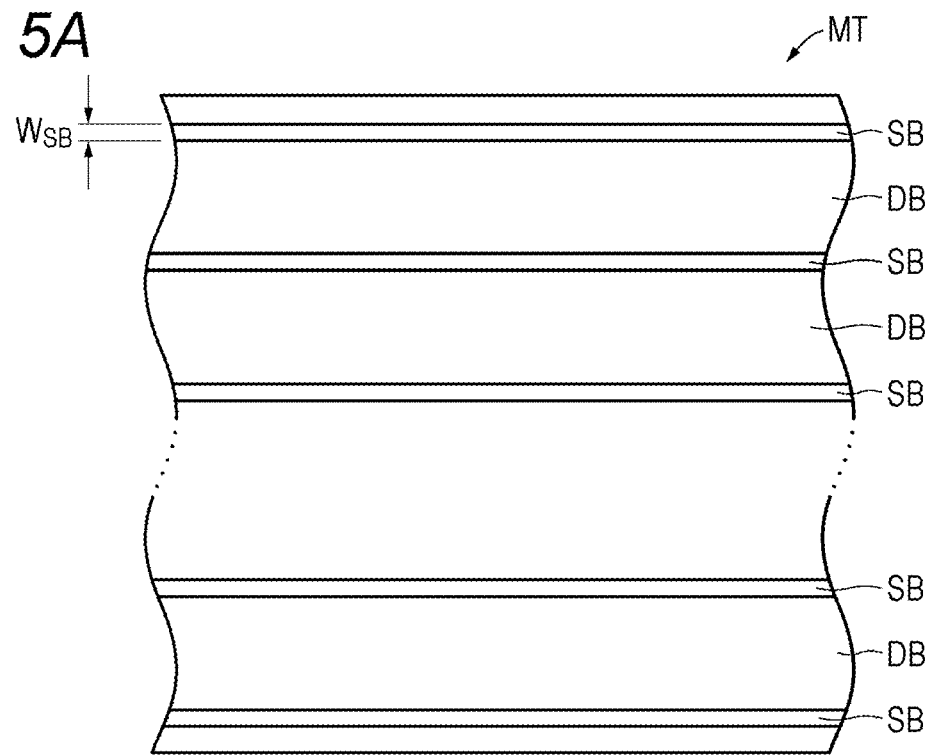
FIG. 5A is a schematic view illustrating one example of a layout of a data band and a servo band.

It is preferable that the magnetic layer 43 include a plurality of servo bands SB and a plurality of data bands DB in advance, as illustrated in FIG. 5A. The plurality of servo bands SB is aligned with equal intervals in the width direction of the magnetic tape MT. Between adjacent servo bands SB, a data band DB is provided. On the servo bands SB, servo signals for facilitating tracking control of the magnetic head are written in advance. The data bands DB are for recoding user data.

For securing a high recording capacity, a ratio $R_S$ of a total area $S_{SB}$ of the servo bands SB over a surface area S of the magnetic layer 43 (=$(S_{SB}/S) \times 100$) is such that an upper limit of the ratio $R_S$ is preferably 4.0% or less, more preferably 3.0% or less, or further more preferably 2.0% or less. Meanwhile, for securing five or more servo tracks, the ratio $R_S$ of the total area $S_{SB}$ of the servo bands SB over the surface area S of the magnetic layer 43 is such that a lower limit of the ratio $R_S$ is preferably 0.8% or more.

The ratio $R_S$ of the total area $S_{SB}$ of the servo bands SB over the surface area S of the magnetic layer 43 can be worked out as below. To begin with, the surface of the magnetic layer 43 is observed with a Magnetic Force Microscope (MFM) to obtain an MFM image. After that, with the MFM image thus obtained, a servo band width $W_{SB}$ is measured and the number of the servo bands SB is counted. After that, the ratio $R_S$ can be worked out from the following equation:

Ratio $R_S$ [%]=(((Servo Band Width $W_{SB}$)×(Number of Servo Bands))/(Width of Magnetic Tape MT))×100

The number of the servo bands SB is preferably not less than 5, more preferably not less than 5+4n (where n is a positive integer). When the number of the servo bands SB is not less than 5, it may become possible to facilitate more stable recording and reproducing characteristics with less off-track by reducing an influence of the size change of the magnetic tape MT in the width direction onto the servo signals. The number of the servo bands SB is not particularly limit in terms of the upper limit and can be 33 or less, for example. The number of the servo bands SB can be confirmed as below. To begin with, the surface of the magnetic layer 43 is observed with a Magnetic Force Microscope (MFM) to obtain an MFM image. After that, using the MFM image, the number of the servo bands SB is counted.

For securing a high recording capacity, an upper limit of the servo band width $W_{SB}$ is preferably 95 µm or less, more preferably 60 µm or less, or further more preferably 30 µm or less. A lower limit of the servo band width $W_{SB}$ is preferably 10 µm or more. It is difficult to produce a recording head capable of reading a servo signal of a servo band width $W_{SB}$ of less than 10 µm.

Figure 5B:
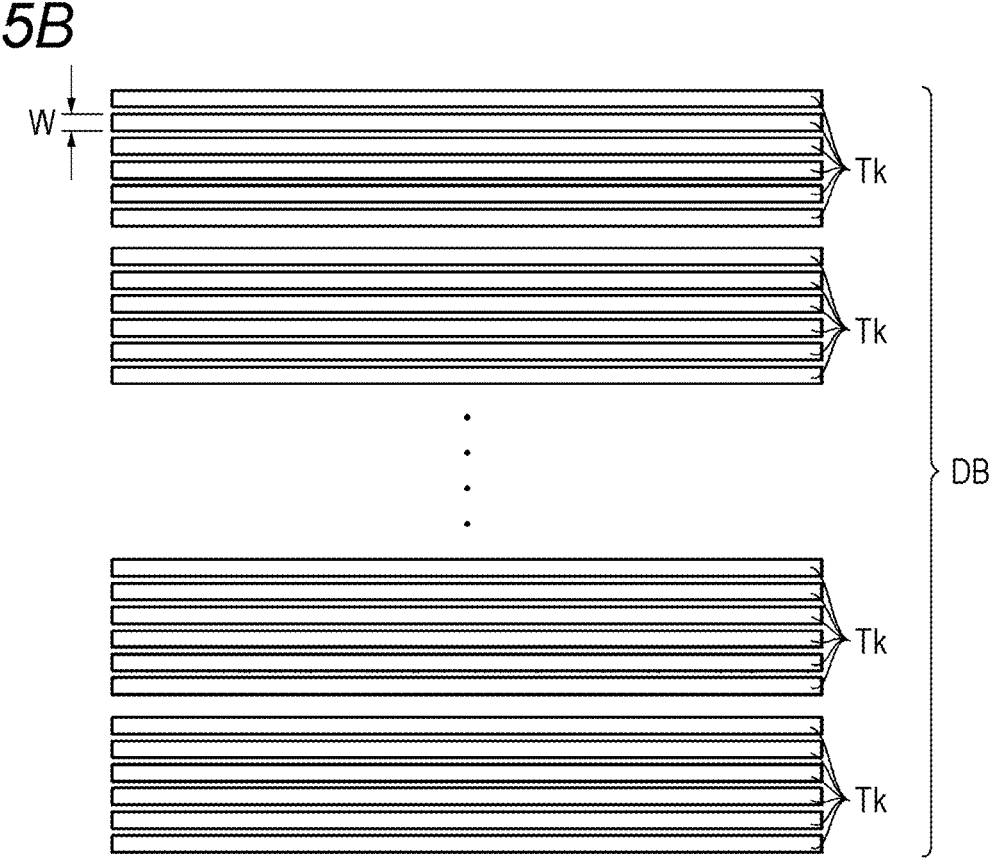
FIG. 5B is an enlarged view illustrating one example of a configuration of the data band.

The width of the servo band width $W_{SB}$ can be worked out as below. To begin with, the surface of the magnetic layer 43 is observed with a Magnetic Force Microscope (MFM) to obtain an MFM image. After that, using the MFM image, the width of the servo band width $W_{SB}$ is measured. The magnetic layer 43 is, as illustrated in FIG. 5B, configured such that a plurality of data tracks Tk can be formed in a data band DB. For improving a track recording density and securing a high recording capacity, the data track width W has an upper limit of preferably 1500 nm or less, and more preferably 1000 nm. In consideration of a magnetic particle size, the data track width W has a lower limit of preferably 20 nm or more.

The magnetic layer 43 is configured such that data can be recorded thereon in such a way that preferably $W/L \leq 35$, more preferably $W/L \leq 30$, or further more preferably $W/L \leq 25$, where L is a minimum magnetic reversal interval and W is the data track width. If the minimum magnetic reversal interval L is a constant value while $W/L > 35$, where L is the minimum magnetic reversal interval and W is the track width (that is, if the track width W is large), there would be such a possibility that the track recording density would not be improved, thereby failing to ensure sufficient recording capacity. Furthermore, if the track width W is a constant value while $W/L > 35$, where L is the minimum magnetic reversal interval and W is the track width (that is, if the minimum magnetic reversal interval L is small), there would be a possibility that the bit length would be small, thereby resulting in a greater linear recording density but spacing loss as well, which would lead to a significant deterioration of electromagnetic conversion characteristics (for example, Signal-to-Noise Ratio (SNR)). Therefore, in order to ensure the recording capacity while suppressing the deterioration of the electromagnetic conversion characteristics (for example SNR), it is preferable that $W/L \leq 35$, as described above. W/L is not particularly limited in terms of lower limit but may be such that $1 \leq W/L$, for example.

Figure 6:
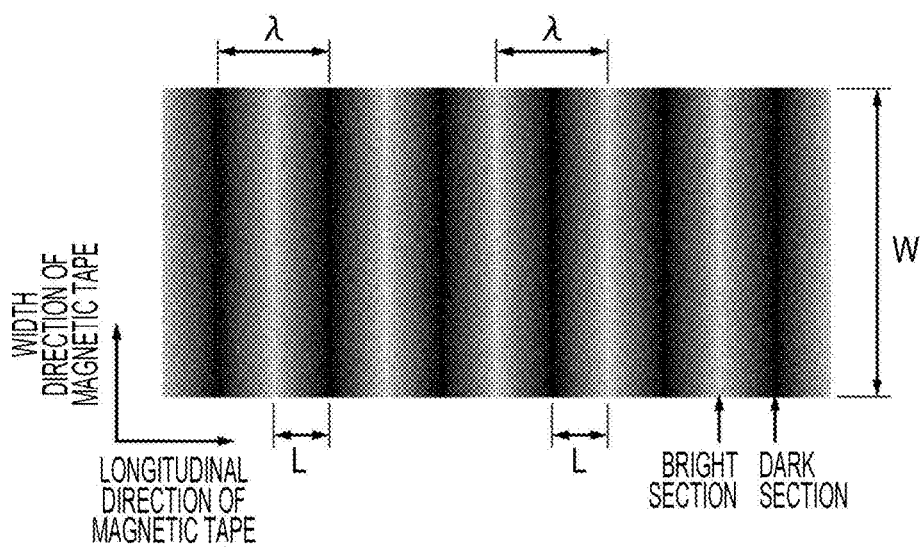
FIG. 6 illustrates an MFM image of a case where a data signal was recorded at wavelength λ.

The minimum magnetic reversal interval L and the data track width W are worked out as below. To begin with, a data signal is written on the magnetic tape MT at a shortest recording wavelength. After that, the magnetic tape MT is cut out to obtain a sample, and the sample is fixed on a sample stage by using an electrically conductive double-faced tape. After that, the sample was observed under a Magnetic Force Microscope (MFM) made by Bruker (Dimension Icon Nanoscope III) to measure a square region (size: 10 µm×10 µm) on the surface of the magnetic layer 43 with 512 pixels×512 pixels, thereby obtaining an MFM image. FIG. 6 illustrates one example of such an MFM image. After that, sizes of magnetic pattern lines along the width direction of the MT tape are measured at ten points randomly selected on the MFM image thus obtained, so as to obtain ten readings of the track width $W_A$ [nm] at the ten points. After that, the ten readings of the track width $W_A$ [nm] at the ten points are simply averaged (arithmetic averaged) to obtain the track width W.

Furthermore, at each of ten points randomly selected on the MFM image thus selected, a distance between bright sections or between dark sections [nm] along the longitudinal direction of the magnetic tape MT is measured to obtain ten readings of recording wavelength $\lambda_A$. After that, the ten readings of recording wavelength $\lambda_A$ are simply averaged (arithmetic average) to obtain an average recording wavelength $\lambda$ [nm]. After that, the average recording wavelength $\lambda$ [nm] is halved to obtain the minimum magnetic reversal interval L [nm].

For ensuring a high recording capacity, the magnetic layer 43 is configured that data can be recorded in such a way that the minimum magnetic reversal interval L is preferably 48 nm or less, more preferably 44 nm or less, or further more preferably 40 nm or less. The minimum magnetic reversal interval L has a lower limit of preferably 20 nm or more in consideration of the magnetic particle size.

The average thickness of the magnetic layer 43 has an upper limit of preferably 90 nm or less, more preferably 80 nm or less, more preferably 70 nm or less, and further more preferably 50 nm or less. If the upper limit of average thickness of the magnetic layer 43 is 90 nm or less, it may become possible to reduce an influence from a reversed magnetic field in a case where the recording head is a ring-type head, and therefore the electromagnetic conversion characteristics may be improved.

A lower limit of the average thickness of the magnetic layer 43 is preferably 35 nm or more. If the lower limit of the average thickness of the magnetic layer 43 is preferably 35 nm or more, it may become possible to ensure a sufficient output in a case where the reproducing head is an MR-type head, and therefore the electromagnetic conversion characteristics may be improved.

The average thickness of the magnetic layer 43 can be worked out as below. To begin with, the magnetic tape MT is processed to be thinner in a direction perpendicular to its main surface, thereby preparing a sample piece. A cross section of the sample piece is observed under a Transmission Electron Microscope (TEM). In the following, a device and conditions for the observation are listed.

Device: TEM (Hitachi, Ltd.; H9000NAR)
Acceleration Voltage: 300 kV
Magnification: ×100,000

After that, a TEM thus obtained is used to measure the thickness of the magnetic layer 43 at ten or more points located along the longitudinal direction of the magnetic tape MT to get ten or more readings. After that the readings are simply averaged (arithmetic average) to obtain an average thickness of the magnetic layer 43. Note that the points at which the readings are measured are randomly selected on the sample piece.

(Magnetic Powder)

The magnetic powder contains powder of nano particles containing ε iron oxide (hereinafter, referred to as "E iron oxide particles"). The ε iron oxide particles are hard magnetic particles that can have a high coercive force even in a form of fine particles. It is preferable that the ε iron oxide contained in the ε iron oxide particles have a crystalline orientation oriented preferentially in the thickness direction (vertical direction) of the magnetic tape MT.

The ε iron oxide particles are spherical or substantially spherical, or cubic or substantially cubic in shape.

Because of such a shape of the ε iron oxide particles, the use of the ε iron oxide particles as the magnetic particles may reduce a contact surface between the particles in the thickness direction of the magnetic tape MT compared with a case where the magnetic particles are barium ferrite particles having a hexagonal plate-like shape. This may make it possible to alleviate aggregation of the particles. Therefore, this may improve dispersibility of the magnetic powder, thereby making it possible to obtain better electromagnetic conversion characteristics (such as SNR).

Figure 7:
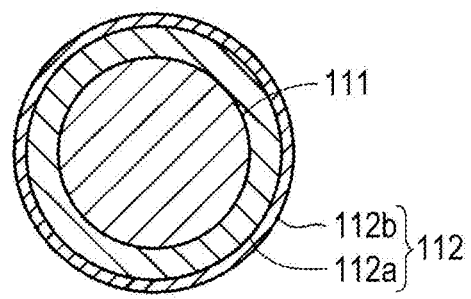
FIG. 7 is a sectional view illustrating one example of a configuration of magnetic particles.

The ε iron oxide particles have a core-and-shell-type structure. Specifically, the ε iron oxide particles have, as illustrated in FIG. 7, a core section 111, and a shell section 112, which has a two-layered structure provided around the core section 111. The shell section 112 with the two-layered structure has a first shell section 112a provided on the core section 111, and a second shell section 112b provided on the first shell section 112a. The core section 111 contains ε iron oxide. The ε iron oxide contained in the core section 111 is preferably such that its main phase is $εFe_2O_3$ crystalline, or more preferably that it is a single phase of $ε-Fe_2O_3$.

The first shell section 112a covers at least part of the core section 111. Specifically, the first shell section 112a may cover a part of the core section 111, or may cover the whole of the core section 111. For having sufficiently exchange-coupling between the core section 111 and the first shell section 112a in order to improve the magnetic characteristics, it is preferable that the first shell section 112a cover the whole of the core section 111.

The first shell section 112a is a so-called soft magnetic layer, and contains a soft magnetic material such as α-Fe, Ni—Fe alloy, or Fe—Si—Al alloy, for example. α-Fe may be obtained by reducing the ε iron oxide contained in the core section 111.

The second shell section 112b is an oxide layer serving as an anti-oxidation layer. The second shell section 112b contains α-iron oxide, aluminum oxide, or silicon oxide. The α-iron oxide includes at least one iron oxide among $Fe_3O_4$, $Fe_2O_3$, and FeO, for example. In a case where the first shell section 112a contains α-Fe (soft magnetic material), the α-iron oxide may be obtained by oxidizing the α-Fe contained in the first shell section 112a.

With the configuration where the ε iron oxide particles have the first shell section 112a as described above, it may become possible to ensure a coercive force Hc of the ε iron oxide particles (core-and-shell particles) as a whole to be adjusted to a coercive force Hc suitable for recording, while maintain a high coercive force Hc solely of the core section 111 for the sake of heat stability of the coercive force Hc as a whole. Moreover, with the configuration where the ε iron oxide particles have the second shell section 112b as described above, the ε iron oxide particles may be exposed to air before and during production of the magnetic tape MT, thereby causing rusting or the like on the surface of the particles so as to make it possible to alleviate deterioration of characteristics of the ε iron oxide particles. Therefore, this may make it possible to alleviate the deterioration of the characteristics of the magnetic tape MT.

The magnetic powder has an average particle size (average maximum particle size) of 22.5 nm or less, for example. The average particle size (average maximum particle size) of the magnetic powder is preferably 22 nm or less, more preferably not less than 8 nm but not more than 22 nm, further more preferably not less than 12 nm but not more than 22 nm, especially preferably not less than 12 nm but not more than 15 nm, or most preferably not less than 12 nm but not more than 14 nm. The magnetic tape MT is such that an actual magnetization area is ½ size of the recording wavelength. Therefore, it may become possible to obtain good electromagnetic conversion characteristics (for example, SNR) by setting the average particle size of the magnetic powder to be equal to or less than a half of a shortest recording wavelength. Therefore, with the configuration where the average particle size of the magnetic powder is 22 nm or less, it may become possible to give good electromagnetic conversion characteristics (for example, SNR) to a magnetic tape MT of a high recording density (for example, a magnetic tape MT configured such that a signal can be recorded thereon at a shortest recording wavelength of 44 nm or less). On the other hand, with the configuration where the average particle size of the magnetic powder is 8 nm or more, it may become possible to improve the dispersibility of the magnetic powder, thereby obtaining greater electromagnetic conversion characteristics (for example, SNR).

An average aspect ratio of the magnetic powder is preferably not less than 1.0 but not more than 3.0, more preferably not less than 1.0 but not more than 2.5, further more preferably not less than 1.0 but not more than 2.1, or especially preferably not less than 1.0 but not more than 1.8. With the average aspect ratio of the magnetic powder not less than 1.0 but not more than 3.0, it may become possible to alleviate aggregation of the magnetic powder. Furthermore, such an aspect ratio may make it possible to reduce resistance applied on the magnetic powder in vertically orienting the magnetic powder when forming the magnetic layer 43. Therefore, this may make it possible to improve vertical orientation of the magnetic powder.

The average particle size and the average aspect ratio of the magnetic powder can be worked out as below. To begin with, a magnetic tape MT to be measured is processed by the Focused Ion Beam (FIB) technique or the like to prepare a thin sample, and a section of the thin sample is observed and pictured by using a TEM. After that, on a TEM image thus pictured, fifty ε iron oxide particles are randomly selected to measure a long-axis length DL and a short-axis length DS of each of the fifty ε iron oxide particles, where the long-axis length DL is the longest one of distances between pairs of parallel lines drawn at any angles tangentially with respect to a contour of an ε iron oxide particle (that is, the long-axis length DL is so called Feret's diameter), and the short-axis length DS is the longest one of lengths of an ε iron oxide particle in a direction perpendicular to the long axis of the ε iron oxide particle.

After that, readings of the long-axis lengths DL of the fifty ε iron oxide particles thus measured are simply averaged (arithmetic average) to obtain an average long-axis length DLave. The average long-axis length DLave thus obtained is taken as the average particle size of the magnetic powder. Furthermore, readings of short-axis lengths DS of the fifty ε iron oxide particles thus measured are simply averaged (arithmetic average) to obtain an average short-axis length DSave. From the average long-axis length DLave and the average short-axis length DSave, the average aspect ratio (DLave/DSave) of the ε iron oxide particles is worked out.

An average particle volume of the magnetic powder is preferably 5600 $nm^3$ or less, more preferably not less than 250 $nm^3$ but not more than 5600 $nm^3$, further more preferably not less than 900 $nm^3$ but not more than 5600 $nm^3$, especially preferably not less than 900 $nm^3$ but not more than 1800 nm³, or most preferably not less than 900 nm³ but not more than 1500 nm³. In general, noises from the magnetic tape MT are inversely proportional to a square root of the number of the particles (that is, proportional to a square root of particle volume).

Therefore, a smaller particle volume may facilitate good electromagnetic conversion characteristics (for example, SNR). Thus, with the configuration where the average particle volume of the magnetic powder is 5600 nm³ or less, it may become possible to obtain good electromagnetic conversion characteristics (for example, SNR), as in the configuration where the average particle size of the magnetic powder is 22 nm or less. On the other hand, with the configuration where the average particle volume of the magnetic powder is 250 nm³ or more, an effect similar to that obtained with the configuration where the average particle size of the magnetic powder is 8 nm or more.

In the configuration where the ε iron oxide particles are spherical or substantially spherical, the average particle volume of the magnetic powder can be worked out as below. To begin with, as in the method of working out the average particle size of the magnetic powder as described above, the average long-axis length DLave is worked out. After that, the average particle volume V of the magnetic powder is worked out by the following equation:

$$V = (\pi/6) \times DLave^3$$

In the configuration where the ε iron oxide particles are cubic or substantially cubic, the average particle volume can be worked out as below. To being with, a magnetic tape MT to be measured is processed by the FIB technique or the like to prepare a thin sample, and a section of the thin sample is observed and pictured by using a TEM. After that, on a TEM image thus pictured, fifty ε iron oxide particles having the surfaces parallel to the TEM cross sections are randomly selected to measure a side length L of one side of each of the fifty ε iron oxide particles. After that, readings of the side lengths L of one of the fifty ε iron oxide particles thus measured are simply averaged (arithmetic average) to obtain an average side length Lave.

$$V = Lave^3$$

(Bonding Agent)

Examples of the bonding agent include thermoplastic resins, thermosetting resins, reactive resins, and the like. Examples of the thermoplastic resin include vinyl chloride, vinyl acetate, vinyl chloride-vinyl acetate copolymer, vinyl chloride-vinylidene chloride copolymer, vinyl chloride-acrylonitrile copolymer, acrylic ester-acrylonitrile copolymer, acrylic ester-vinyl chloride-vinylidene chloride copolymer, acrylic ester-acrylonitrile copolymer, acrylic ester-vinylidene chloride copolymer, methacrylic ester-vinylidene chloride copolymer, methacrylic ester-vinyl chloride copolymer, methacrylic ester-ethylene copolymer, polyvinyl fluoride, vinylidene chloride-acrylonitrile copolymer, acrylonitrile-butadiene copolymer, polyamide resin, polyvinyl butyral, cellulose derivatives (cellulose acetate butyrate, cellulose diacetate, cellulose triacetate, cellulose propionate, nitrocellulose), styrene butadiene copolymer, polyurethane resin, polyester resin, amino resin, synthetic rubber, and the like.

Examples of the thermosetting resin include phenol resin, epoxy resin, polyurethane curing resin, urea resin, melanin resin, alkyd resin, silicone resin, polyamine resin, urea formaldehyde, and the like.

For all of the bonding agents above, in order to improve the dispersibility of the magnetic powder, a polar functional group may be introduced in the bonding agents, such as —SO₃M, —OSO₃M, —COOM, P=O(OM)₂ (where M is a hydrogen atom or an alkali metal such as lithium, potassium, sodium, or the like), a side-chain type amine represented by —NR1R2, —NR1R2R3⁺X⁻, a main-chain type amine represented by >NR1R2⁺X⁻ (where R1, R2, and R3 are independently a hydrogen atom or a hydrocarbon group, and X— is a halogen ion such a fluorine, chlorine, bromine, iodine, or the like, an inorganic ion, or an organic ion), and —OH, —SH, —CN, an epoxy group, and the like. The polar functional group may be introduced in the bonding agents preferably in an amount of $10^{-1}$ to $10^{-8}$ mol/g, or by $10^{-2}$ to $10^{-6}$ mol/g.

(Lubricant)

Examples of the lubricant include $C_{10}$ to $C_{24}$ monobasic fatty acids, esters based on any of monovalent to hexavalent $C_2$ to $C_{12}$ alcohols, mixed esters of any combinations of these esters, difatty acid esters, trifatty acid esters, and the like. Specific examples of the lubricant include lauric acid, myristic acid, palmitic acid, stearic acid, behenic acid, oleic acid, linolic acid, linolenic acid, elaidic acid, butyl stearate, pentyl stearate, heptyl stearate, octyl stearate, isooctyl stearate, octyl myristate, and the like.

(Anti-Static Agent)

Examples of the anti-static agent include carbon black, natural surfactants, non-ionic surfactants, cationic surfactants, and the like.

(Abrading Agent)

Examples of the abrading agent include α-alumina with 90% or more transformation ratio, β-alumina, γ-alumina, silicon carbide, chrome oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle-like shaped α-iron oxide prepared from magnetic iron oxide by dehydration and annealing, any one of these surface-treated with aluminum and/or silica as needed, and the like.

(Curing Agent)

Examples of the curing agent include polyisocyanate and the like. Examples of polyisocyanate include aromatic polyisocyanates such as an addition compound of tolylene diisocyanate (TDI) with an active hydrogen compound, and aliphatic polyisocyanates such as an addition compound of hexamethylene diisocyanate (HMDI) with an active hydrogen compound. It is preferable that the polyisocyanate have a weight average molecular weight in a range of 100 to 3000.

(Anti-Rusting Agent)

Examples of the anti-rusting agent include phenols, naphthol, quinones, nitrogen-containing heterocyclic compounds, oxygen-containing heterocyclic compounds, sulfur-containing heterocyclic compounds, and the like.

(Non-Magnetic Reinforcing Particles)

Examples of the non-magnetic reinforcing particles include aluminum oxide (α-, β-, or γ-alumina), chrome oxide, silicon oxide, diamond, garnet, emery, boron nitride, titanium carbide, silicon carbide, titanium carbide, titanium oxide (rutile-type or anatase-type titanium oxide), and the like.

(Underlayer)

The underlayer 42 is a non-magnetic layer including a non-magnetic powder and the bonding agent. The underlayer 42 may further contain at least one additive among a lubricant, an anti-static agent, a curing agent, an anti-rusting agent, and the like, if necessary.

An average thickness of the underlayer 42 is preferably not less than 0.3 µm but not more than 2.0 µm, or more preferably not less than 0.5 µm but not more than 1.4 µm. Note that the average thickness of the underlayer 42 can be worked out by a method similar to that for the average thickness of the magnetic layer 43, provided that the magnification of the TEM image is adjusted as appropriate according to the thickness of the underlayer 42. With the configuration where the average thickness of the underlayer 42 is 2.0 µm or less, the magnetic tape MT may become more stretchable under an external force application thereon, thereby facilitating adjustment of the width of the magnetic tape MT by tension control.

(Non-Magnetic Powder)

The non-magnetic powder contains at least one of inorganic particle powder or organic particle powder, for example. Furthermore, the non-magnetic powder may contain carbon powder such as carbon black. Note that, one kind of the non-magnetic powder may be used solely or two or more kinds of the non-magnetic powder may be used in combination. The inorganic particles may include a metal, a metal oxide, a metal carbonate, a metal sulfate, a metal nitride, a metal carbide, a metal sulfide, or the like. In terms of its shape, the non-magnetic powder may be needle-like, spherical, cubic, or plate-like, or may have the other shape of various kinds, for example, but is not limited to these shapes.

(Bonding Agent)

The bonding agent may be similar to a bonding agent as described above for the magnetic layer 43.

(Additive)

A lubricant, an anti-static agent, a curing agent, and an anti-rusting agent are respectively similar to those as described above for the magnetic layer 43.

(Back Layer)

The back layer 44 includes a bonding agent and non-magnetic powder. The back layer 44 may further contain at least one additive among a lubricant, an anti-static agent, a curing agent, an anti-rusting agent, and the like, if necessary. The bonding agent and the non-magnetic powder are similar to those as described above for the underlayer 42.

An average particle size of the non-magnetic powder is preferably not less than 10 nm but not more than 150 nm, or more preferably not less than 15 nm but not more than 110 nm. The average particle size of the non-magnetic powder can be worked out by a method similar to that as described above for the average particle size of the magnetic powder. The non-magnetic powder may include non-magnetic powder of two or more particle size distributions.

An upper limit of an average thickness of the back layer 44 is preferably 0.6 µm or less. With the configuration where the average thickness of the back layer 44 is 0.6 µm or less, it may become possible to keep thick thicknesses of the underlayer 42 and the substrate 41 even if the average thickness of the magnetic tape MT is 5.6 µm or less, and therefore it may become possible to keep a running stability of the magnetic tape MT inside the recording and reproducing device 50. The average thickness of the back layer 44 is not particularly limited in terms of its lower limit, but can be 0.2 µm or more, for example.

The average thickness of the back layer 44 can be worked out as below. To begin with, a magnetic tape MT of ½ inches in width is prepared and cut to 250 mm in length, so as to prepare a sample. After that, the thickness of the sample is measured at five or more measuring points by using a laser hologauge (Mitsutoyo) as a measuring device, and measurements thus obtained are simply averaged (arithmetic average) to work out an average thickness $t_T$ [µm] of the magnetic tape MT. Note that the measuring points are selected randomly on the sample. After that, the back layer 44 of the sample is removed with a solvent such as methylethylketone (MEK) or a diluted hydrochloric acid. After that, the thickness of the sample was measured again at five or more measuring points by using the laser hologauge, and measurements thus obtained are simply averaged (arithmetic average) to work out an average thickness $t_b$ [µm] of the magnetic tape MT from which the back layer 44 has been removed. Note that the measuring points are selected randomly on the sample. After that, an average thickness $t_b$[µm] of the back layer 44 is worked out from the following equation:

$$t_b\,[\mu m] = t_T\,[\mu m] - t_b\,[\mu m]$$

(Average Thickness of Magnetic Tape)

An upper limit of an average thickness of the magnetic tape MT (average entire thickness) is preferably 5.6 µm or less, more preferably 5.0 µm or less, further more preferably 4.6 µm or less, or especially preferably 4.4 µm or less. With the configuration where the average thickness of the magnetic tape MT is 5.6 µm or less, it may become possible to attain a greater recording capacity recordable in one data cartridge than general magnetic tapes. A lower limit of the average thickness of the magnetic tape MT is not particularly limited, but can be 3.5 µm or more.

The average thickness of the magnetic tape MT can be worked out by a method as described above for working out the average thickness of the back layer 44.

(Specs Regarding Width Change of Magnetic Tape)

The magnetic tape MT is such that $w_{max}$ and $w_{min}$ satisfy the following relational expression, where $w_{max}$ and $w_{min}$ are respectively maximum and minimum of average values of the width of the magnetic tape MT measured under four environments where temperature and relative humidity are (10° C., 10%), (10° C., 80%), (29° C., 80%), and (45° C., 10%): $(w_{max} - w_{min})/w_{min} \leq 400$ [ppm]

With the configuration where $w_{max}$ and $w_{min}$ satisfy the relational expression (1), it may become possible to alleviate off-track that would possibly occur on a magnetic tape MT with a data track width W of 1500 nm or less.

Referring FIG. 8, a measuring device 210 for use in measuring the width of the magnetic tape MT will be described. The measuring device 210 includes a seating 211, a supporting column 212, a light emitter 213, a light receptor 214, a supporting plate 215, five supporting members $216_1$ to $216_5$, and an immobilizing section 217.

The seating 211 has a rectangular plate-like shape. At a center of the seating 211, the light receptor 214 is provided. The supporting column 212 stands at a position off the center of the seating 211 toward one long side of the seating 211 and adjacent to the light receptor 214.

At a position off the center of the seating 211 toward one short side of the seating 211, the immobilizing section 217 is provided.

At a tip of the supporting column 212, the light emitter 213 is supported. The light emitter 213 and the light receptor 214 face each other. For measuring, the sample 10S supported by the supporting members $216_1$ to $216_5$, is placed between the light emitter 213 and the light receptor 214 facing each other. The light emitter 213 and the light receptor 214 are connected to a personal computer (PC) (not illustrated). Under control of the PC, the width of the sample 10S supported by the supporting members $216_1$ to $216_5$ is measured and a result of the measurement is outputted to the PC.

The light emitter 213 and the light receptor 214 are incorporated with a digital size measuring device (digital micrometer LS-7000 from Keyence Corporation). Onto a sample 10S supported by the supporting members $216_1$ to $216_5$, the light emitter 213 emits light parallel to a width direction of the sample 10S. The light receptor 214 measures a light amount not shielded by the sample 10S, thereby working out the width of the magnetic tape MT.

At about a half of a height of the supporting column 212, the supporting plate 215 having a long and narrow rectangular shape is attached. The supporting plate 215 is supported such that long sides of the supporting plate 215 are parallel to a main surface of the seating 211.

One of the main surfaces of the supporting plate 215 supports the five supporting members $216_1$ to $216_5$ thereon. The supporting members $216_1$ to $216_5$ are cylinder in shape and configured to support a back surface of the sample 10S (magnetic tape MT). The five supporting members $216_1$ to $216_5$ are made from stainless steel SUS 304 and has a surface roughness Rz (maximum height of roughness) is in a range of 0.15 μm to 0.3 μm.

Figure 8:
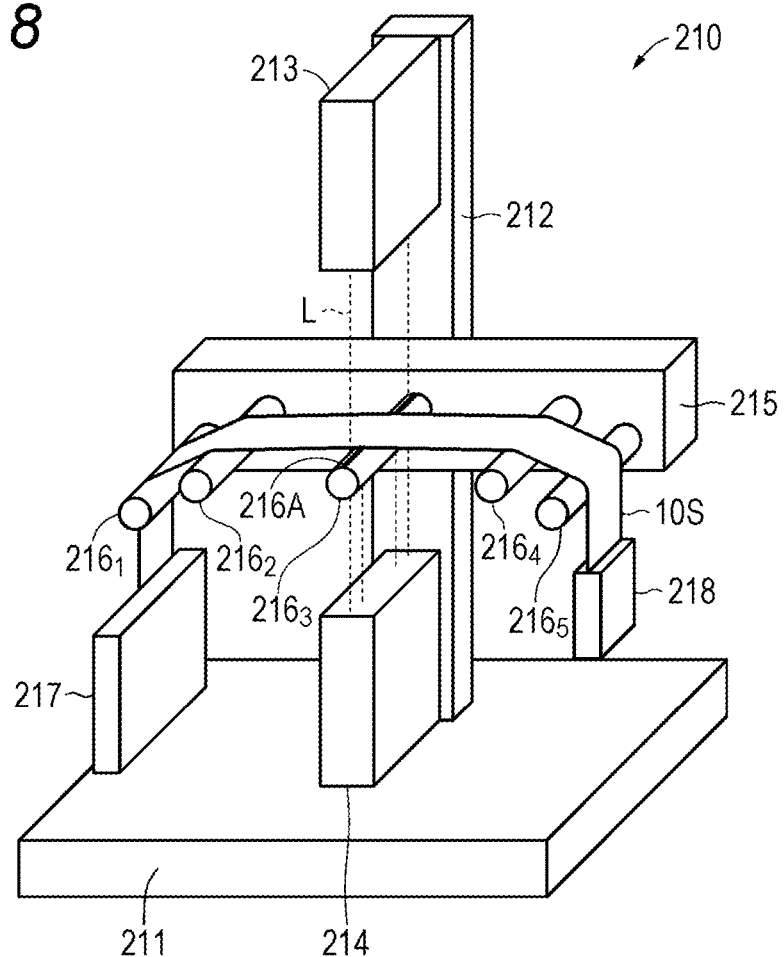
FIG. 8 is a perspective view illustrating a configuration of a measuring device.

Here, positions of the five supporting members $216_1$ to $216_5$ are described referring to FIG. 8. As illustrated in FIG. 8, the sample 10S are hung on the five supporting members $216_1$ to $216_5$. In the following, the five supporting members $216_1$ to $216_5$ are referred to as a first supporting member $216_1$, a second supporting member $216_2$, a third supporting member $216_3$ (having a slit 216A), a fourth supporting member $216_4$, and a fifth supporting member $216_5$ (closest to a weight 233) in the order of nearest to farthest from the immobilizing section 217.

All of the five first to fifth supporting members $216_1$ to $216_5$ are 7 mm in diameter. A distance d1 between the first supporting member $216_1$ and the second supporting member $216_2$ (specifically, a distance between central axes of these supporting members) is 20 mm. A distance d2 between the second supporting member $216_2$ and the third supporting member $216_3$ is 30 mm. A distance d3 between the third supporting member $216_3$ and the fourth supporting member $216_4$ is 30 mm. A distance d4 between the fourth supporting member $216_4$ and the fifth supporting member $216_5$ is 20 mm.

Furthermore, the second supporting member $216_2$, the third supporting member $216_3$, and the fourth supporting member $216_4$ are positioned so that a portion of the sample 10S hung from the second supporting member $216_2$, the third supporting member $216_3$, and the fourth supporting member $216_4$ forms a flat surface substantially perpendicular to the direction of gravitational force. Furthermore, the first supporting member $216_1$ and the second supporting member $216_2$ are positioned so that a portion of the sample 10S between the first supporting member $216_1$ and the second supporting member $216_2$ forms an angle of θ1=30° with respect to the flat surface substantially perpendicular to the direction of gravitational force. Furthermore, the fourth supporting member $216_4$ and the fifth supporting member $216_5$ are positioned so that a portion of the sample 10S between the fourth supporting member $216_4$ and the fifth supporting member $216_5$ forms an angle of θ2=30° with respect to the flat surface substantially perpendicular to the direction of gravitational force. Furthermore, of the five first to fifth supporting members $216_1$ to $216_5$, the third supporting member $216_3$ is fixed not to be rotatable, but the rest of four first, second, fourth, and fifth supporting members $216_1$, $216_2$, $216_4$, and $216_5$ are all rotatable.

Of the first to fifth supporting members $216_1$ to $216_5$, the third supporting member $216_3$, which is positioned between the light emitter 213 and the light receptor 214, and substantially centered between the immobilizing section 217 and a portion to which a load is applied, has the slit 216A, so that light L is emitted from the light emitter 213 to the light receptor 214 through the slit 216A. The slit 216A has a slit width of 1 mm, so that the light L can travel through the slit 216A without being shielded by a frame of the slit 216A.

The maximum $w_{max}$ and the minimum $w_{min}$ can be worked out as below by using the measuring device 210 with the configuration as described above. To being with, a magnetic tape MT of ½ inches in width is prepared. From the magnetic tape MT, three tape samples (of 1 m in length) in total are obtained from three different positions with 400 m intervals along the longitudinal direction (running direction), so as to prepare three samples 10S.

After that, the width of the three samples 10S thus prepared is measured as below. To begin with, a sample 10S is set on the measuring device 210. Specifically, one end of the long sample 10S is immobilized by the immobilizing section 217. After that, the sample 10S is hung on the five supporting members $216_1$ to $216_5$, which are substantially cylindrical and bar-like in shape.

Here, the sample 10S is hung on the five supporting members $216_1$ to $216_5$ in such a way that the back surface of the sample 10S is in contact with the five supporting members $216_1$ to $216_5$.

After that, the measuring device 210 is placed in a chamber (a general thermostat chamber) with a controlled environment (10° C., 10%) therein. After that, a weight 218 for applying a load of 0.2 N is attached to another end of the sample 10S. After that, the sample 10S is kept in the environment for 2 hours or longer in order to accommodate the magnetic tape MT to the environment.

After leaving the sample 10S in the environment for 2 hours or longer, the width of the sample 10S is measured by using the light emitter 213 and the light receptor 214. Specifically, the light L is emitted from the light emitter 213 toward the light receptor 214 with the load of 0.2 N being applied to the sample 10S by the weight 218, in order to measure the width of the sample 10S to which the load is applied along the longitudinal direction of the sample 10S. The measurement of the width is carried out with the sample 10S not curled.

After that, the widths of the three samples 10S thus measured are simply averaged (arithmetic average) to obtain an average width w of the magnetic tape MT under the environment (10° C., 10%).

After that, average widths w of the magnetic tape MT under environments (10° C., 80%), (29° C., 80%), and (45° C., 10%) are worked out in the same manner as in working out the average width w of the magnetic tape MT under the environment (10° C., 10%). Then, from among the average widths w of the magnetic tape MT under the four environments, the maximum $w_{max}$ and minimum $w_{min}$ are selected.

(Coercive Force Hc)

An upper limit of the coercive force Hc of the magnetic layer 43 in the longitudinal direction of the magnetic tape MT is preferably 2000 Oe or less, more preferably 1900 Oe or less, or further more preferably 1800 Oe or less. If the coercive force Hc of the magnetic layer 43 in the longitudinal direction of the magnetic tape MT is 2000 Oe or less, it may become possible to attain sufficient electromagnetic conversion characteristics even in case of high recording density.

A lower limit of the coercive force Hc of the magnetic layer 43 measured in the longitudinal direction of the magnetic tape MT is preferably 1000 Oe or more. If the coercive force Hc of the magnetic layer 43 measured in the longitudinal direction of the magnetic tape MT is 1000 Oe or more, it may become possible to reduce degauss that would be caused by magnetic flux leakage from the recording head.

The coercive force Hc can be worked out as below. To begin with, a measurement sample is cut out from a long magnetic tape MT, and is measured by using a Vibrating Sample Magnetometer (VSM) to measure an M-H loop of the entire measurement sample along the longitudinal direction of the measurement sample (the running direction of the magnetic tape MT). After that, the layers having made by application (such as the underlayer 42, the magnetic layer 43, the back layer 44, and the like) are wiped off with acetone, ethanol, or the like, so as to prepare a sample on which only the substrate 41 remains, as a control for background adjustment. After that, using a VSM, an M-H loop of the sample of the substrate 41 is measured along the longitudinal direction of the substrate 41 (the running direction of the magnetic tape MT). After that, the M-H loop of the substrate 41 is subtracted from the M-H loop of the entire measurement sample, so as to calculate out a background-adjusted M-H loop. From the M-H loop thus obtained, the coercive force Hc is worked out. Note that these M-H loops are measured at 25° C. without "demagnetizing field correction" in measuring the M-H loops along the longitudinal direction of the magnetic tape MT. Furthermore, the M-H loop measurement may be carried out by measuring a stack of samples according to sensitivity of the VSM to use.

(Squareness Ratio)

A squareness ratio S1 of the magnetic layer 43 in a vertical direction (thickness direction) of the magnetic tape MT is preferably 65% or more, more preferably 70% or more, further more preferably 75% or more, especially preferably 80% or more, or most preferably 85% or more. With the configuration where the squareness ratio S1 is 65% or more, it may become possible to ensure sufficient vertical orientation of the magnetic powder, thereby attaining more excellent electromagnetic conversion characteristics (for example, SNR).

The squareness ratio S1 can be worked out as below. To begin with, a measurement sample is cut out from a long magnetic tape MT, and is measured by using the VSM to measure an M-H loop of the entire measurement sample along the vertical direction (the thickness direction) of the magnetic tape MT. After that the layers having made by application (such as the underlayer 42, the magnetic layer 43, the back layer 44, and the like) are wiped off with acetone, ethanol, or the like, so as to prepare a sample on which only the substrate 41 remains, as a control for background adjustment. After that, using a VSM, an M-H loop of the sample of the substrate 41 corresponding to the vertical direction of the substrate 41 (the vertical direction of the magnetic tape MT) is measured. After that, the M-H loop of the substrate 41 is subtracted from the M-H loop of the entire measurement sample, so as to calculate out a background-adjusted M-H loop. The squareness ratio S1 (%) is calculated by substituting the saturated magnetization Ms (emu) and the residual magnetization Mr (emu) of the obtained M-H loop into the following equation. Note that these M-H loops are measured at 25° C. without "demagnetizing field correction" in measuring the M-H loops along the vertical direction of the magnetic tape MT. Furthermore, the M-H loop measurement may be carried out by measuring a stack of samples according to sensitivity of the VSM to use.

Squareness ratio $Si(\%) = (Mr/Ms) \times 100$

A squareness ratio S2 of the magnetic layer 43 in a longitudinal direction (running direction) of the magnetic tape MT is preferably 35% or less, more preferably 30% or less, further more preferably 25% or less, especially preferably 20% or less, or most preferably 15% or less. With the configuration where the squareness ratio S2 is 35% or less, it may become possible to ensure sufficient vertical orientation of the magnetic powder, thereby attaining more excellent electromagnetic conversion characteristics (for example, SNR).

The squareness ratio S2 can be worked out in a similar manner to the squareness ratio S1, except that the M-H loops are measured in the longitudinal direction (running direction) of the magnetic tape MT and the substrate 41.

(Hc2/Hc1)

A ratio Hc2/Hc1, where Hc1 is the coercive force Hc1 of the magnetic layer 43 in the vertical direction and Hc2 is the coercive force Hc2 of the magnetic layer 43 in the longitudinal direction, is such that Hc2/Hc1≤0.8, preferably Hc2/Hc1≤0.75, more preferably Hc2/Hc1≤0.7, further more preferably Hc2/Hc1≤0.65, or especially preferably Hc2/Hc1≤0.6. With the configuration where the coercive forces Hc1 and Hc2 satisfy Hc2/Hc1≤0.8, it may become possible to improve the vertical orientation of the magnetic powder. Therefore, it may become possible to reduce magnetization transition width and attain high output in signal reproduction, thereby improving the electromagnetic conversion characteristics (for example, SNR). Note that, as described above, a smaller Hc2 may make it possible to attain greater sensitivity of magnetization to the vertical magnetic field caused by the recording head, thereby making it possible to form good recording patterns.

In a case where ratio Hc2/Hc1 is Hc2/Hc1≤0.8, a configuration where the average thickness of the magnetic layer 43 is 90 nm or less is especially effective. In a case where the average thickness of the magnetic layer 43 exceeds 90 nm, a lower region under the magnetic layer 43 (the region associated with the underlayer 42) would be possibly magnified in the longitudinal direction if the recording head is a ring-type head. This would possibly hinder uniform magnification of the magnetic layer 43 in the thickness direction. Thus, in such a case, there would be possibility that the electromagnetic conversion characteristics (for example, SNR) would not be improved even if ratio Hc2/Hc1 is set to Hc2/Hc1≤0.8 (that is, even if the vertical orientation of the magnetic powder is improved).

A lower limit of Hc2/Hc1 is not particularly limited, but can be 0.5≤Hc2/Hc1, for example. Note that Hc2/Hc1 indicates a degree of vertical orientation of the magnetic powder, and the smaller Hc2/Hc1, the greater vertical orientation of the magnetic powder.

The coercive force Hc1 of the magnetic layer 43 in the vertical direction can be worked out from a background-adjusted M-H loop obtained in a similar manner as in working out the squareness ratio S1. The coercive force Hc2 of the magnetic layer 43 in the longitudinal direction can be worked out by the method as described above.

(SFD)

Figure 9:
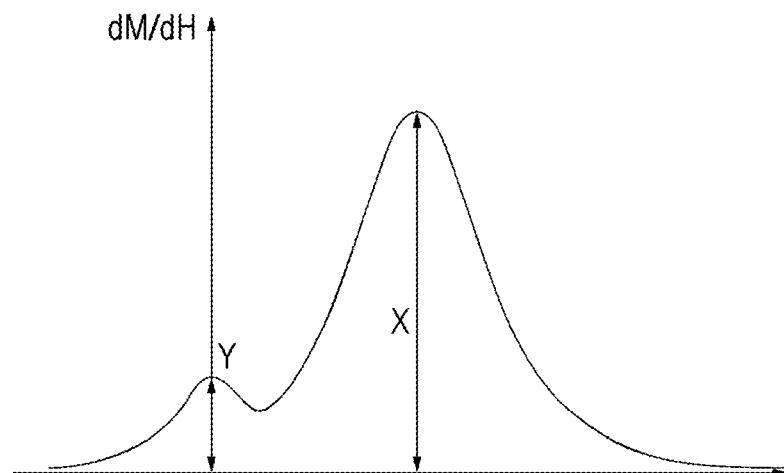
FIG. 9 is a graph illustrating one example of an SFD curve.

A Switching Field Distribution (SFD) curve of the magnetic tape MT is such that a peak ratio X/Y, where X is a main peak height and Y is a sub peak height in a vicinity of a magnetic field of zero, is preferably 3.0 or more, more preferably 5.0 or more, further more preferably 7.0 or more, especially preferably 10.0, or most preferably 20.0 or more (see FIG. 9). With the configuration where the peak ratio X/Y is 3.0 or more, it may become possible to reduce a case where the magnetic powder contains, apart from the ε iron oxide particles actually contributing to the recording, a large amount of low-coercive force content (such as soft magnetic particles or superparamagnetic particles) inherent to the ε iron oxide particles. Therefore, it may become possible to reduce magnetization signal deterioration in which the magnetization signals recorded on adjacent tracks are deteriorated by magnetic field leakage from the recording head. This may make it possible to obtain more excellent electromagnetic conversion characteristics (for example, SNR). An upper limit of the peak ratio X/Y is not particularly limited but can be 100 or less, for example.

The peak ratio X/Y can be worked out as below.

Furthermore, a background-adjusted M-H loop is obtained in a similar manner to measurement of the squareness ratio S1 as described above. After that, from the M-H loop thus obtained, an SFD curve is calculated out. The calculation of the SFD curve may be carried out by using a program attached to the measuring device, or another program. The peak ratio X/Y is calculated in such a manner that "Y" is an absolute value of a point on the Y axis (dM/dH) at which the SFD curve thus calculated out crosses the Y axis, and "X" is the height of the so-called main peak observed in a vicinity of the coercive force Hc on the M-H loop. Note that the M-H loop measurement is carried out at 25° C. in a similar manner to measurement of the coercive force Hc without "demagnetizing field correction" in measuring the M-H loops along the thickness direction (vertical direction) of the magnetic tape MT. Furthermore, the M-H loop measurement may be carried out by measuring a stack of samples according to sensitivity of the VSM to use.

(Activation Volume $V_{act}$)

An activation volume $V_{act}$ is preferably 8000 nm$^3$ or less, more preferably 6000 nm$^3$ or less, further more preferably 5000 nm$^3$ or less, especially preferably 4000 nm$^3$ or less, or most preferably 3000 nm$^3$ or less. With the configuration where the activation volume $V_{act}$ is 8000 nm$^3$ or less, it may make it possible to attain good dispersion of the magnetic powder, thereby leading to sharp bit inversion regions. Therefore, it may become possible to reduce magnetization signal deterioration in which the magnetization signals recorded on adjacent tracks are deteriorated by magnetic field leakage from the recording head. This may make it possible to obtain more excellent electromagnetic conversion characteristics (for example, SNR).

The activation volume $V_{act}$ can be worked out by an equation as below, which is created by Street & Woolley:

$$V_{act}(nm^3)=kB \times T \times X_{irr}/(\mu_0 \times Ms \times S)$$

(where kB is Boltzmann constant (1.38×10$^{-23}$ J/K), T is temperature (K), $X_{irr}$ is irreversible magnetic susceptibility, μ0 is space permeability, S is magnetic viscosity coefficient, and Ms is saturated magnetization (emu/cm$^3$).)

The irreversible magnetic susceptibility $X_{irr}$, the saturated magnetization Ms, and the magnetic viscosity coefficient S in the equation can be worked out as below by using VSM. Note that the VSM measurement is carried out in the thickness direction (vertical direction) of the magnetic tape MT. Furthermore, the VSM measurement is carried out to measure, at 25° C., a measurement sample cut out from the long magnetic tape MT. The VSM measurement is carried out without "demagnetizing field correction" in measuring the M-H loops along the thickness direction (vertical direction) of the magnetic tape MT.

(Irreversible Magnetic Susceptibility $X_{irr}$)

The irreversible magnetic susceptibility $X_{irr}$ is defined as a gradient that a residual magnetization curve (DCD curve) takes in the vicinity of residual coercive force Hr. To begin with, a magnetic field of −1193 kA/m (15 kOe) is applied onto a magnetic tape MT entirely, and the magnetic field is returned to zero, thereby creating a residual magnetization state. After that, a magnetic field of about 15.9 kA/m (200 Oe) is applied thereon in an opposite direction and the magnetic field is returned to zero again to measure a residual magnetization amount. After that, similarly, this procedure is repeated by applying magnetic field application larger than previous ones by 15.9 kA/m and returning the magnetic field to zero, and the residual magnetization amounts thus measured are plotted against the magnetic field application so as to obtain a DCD curve. From the DCD curve thus obtained, a point at which the magnetization amount is zero is taken as the residual coercive force Hr. The DCD curve is differentiated to obtain gradients of the DCD curve for each magnetic field. Among the gradients of the DCD curve, the gradient in the vicinity of the residual coercive force Hr is $X_{irr}$.

(Saturated Magnetization Ms)

To begin with, a background-adjusted M-H loop is obtained by a similar manner as measuring the squareness ratio S1. After that, from a value of saturated magnetization Ms (emu) of the M-H loop thus obtained and the volume (cm$^3$) of the magnetic layer 43 in the measurement sample, Ms (emu/cm$^3$) is calculated out. Note that the volume of the magnetic layer 43 is worked out by multiplying an area of the measurement sample by the average thickness of the magnetic layer 43. How to calculate out the average thickness of the magnetic layer 43 necessary for calculating out the volume of the magnetic layer 43 is described above.

(Magnetic Viscosity Coefficient S)

To begin with, a magnetic field of −1193 kA/m (15 kOe) is applied onto a magnetic tape MT (measurement sample) entirely, and the magnetic field is returned to zero, thereby creating a residual magnetization state. After that, in an opposite direction, a magnetic field equal to the value of the residual coercive force Hr thus obtained from the DCD curve is applied on the magnetic tape MT. While keeping the magnetic field for 1000 sec, a magnetization amount is measured continuously with constant time interval. By applying a relationship between time t and the magnetization amount M(t) thus obtained, the magnetic viscosity coefficient S is calculated out from the following equation:

$$M(t)=M0+S \times \ln(t)$$

(where M(t) is the magnetization amount at time t, M0 is an initial magnetization amount, S is magnetic viscosity coefficient, and ln(t) is logarithm natural of time).

(Size Change Amount Δw)

A size change amount Δw [ppm/N] of the magnetic tape MT in the width direction against a tension change in the longitudinal direction of the magnetic tape MT is such that preferably 650 ppm/N≤Δw, more preferably 700 ppm/N≤Δw, further more preferably 750 ppm/N≤Δw, or especially preferably 800 ppm/N≤Δw. If the size change amount Δw is such that 650 ppm/N≤Δw, it may be possible to more efficiently reduce the change of the width of the magnetic tape MT by adjusting the tension in the longitudinal direction of the magnetic tape MT by the recording and reproducing device 50. An upper limit of the size change amount Δw is not particularly limited, but can be such that Δw≤1700000 ppm/N, preferably Δw≤20000 ppm/N, more preferably Δw≤8000 ppm/N, further more preferably Δw≤5000 ppm/N, Δw≤4000 ppm/N, Δw≤3000 ppm/N, or Δw≤2000 ppm/N.

The size change amount Δw can be set to a predetermined value by selecting how to configure the substrate 41.

For example, the size change amount Δw can be set to a predetermined value by selecting at least one of the thickness or the materials of the substrate 41.

Furthermore, the size change amount Δw may be set to a predetermined value by adjusting strengths of stretching the substrate 41 in the width direction and the longitudinal direction. For example, the size change amount Δw is decreased by more intensively stretching in the width direction of the substrate 41, whereas the size change amount Δw is increased by more intensively stretching in the longitudinal direction of the substrate 41.

The size change amount Δw can be worked out as below. To begin with, a magnetic tape MT of ½ inches in width is prepared, and cut into a length of 250 mm, so as to obtain a sample 10S. After that, the width of the sample 10S is measured while loads of 0.2 N, 0.6N, and 1.0N are applied onto the sample 10S in the longitudinal direction in this order, so as to measure the width of the sample 10S under the loads of 0.2 N, 0.6 N, and 1.0 N. After that, the size change amount Δw is worked out from the following equation. Note that the measurement under the load of 0.6 N is for confirming whether the measurements are carried out without abnormality (especially to confirm whether readings of the three measurements are linearly plotted), and therefore is not to be applied to the following equation.

$$\Delta w[\text{ppm/N}] = \frac{D(0.2\text{N})[\text{mm}] - D(1.0N)[\text{mm}]}{D(0.2\text{N})[\text{mm}]} \times \frac{1{,}000{,}000}{(1.0[N]) - (0.2[\text{N}])} \quad [\text{Math. 1}]$$

(where D(0.2N) and D(1.0N) are widths of the sample 10S under the loads of 0.2 N and 1.0 N in the longitudinal direction of the sample 10S, respectively.) The width of the sample 10S under the loads can be measured as below. To begin with, the sample 10S thus obtained is set on the measuring device 210 in a similar manner as in working out the maximum $w_{max}$ and the minimum $w_{min}$ as described above. After that, the measuring device 210 is placed in a chamber with a constant environment with temperature 25° C. and relative humidity 50%) therein. After that, the weight 233 for applying a load of 0.2 N is attached to another end of the sample 10S. After that, the sample 10S is kept in the environment for 2 hours or longer in order to accommodate the magnetic tape MT to the environment. After leaving the sample 10S in the environment for 2 hours or longer, the width of the sample 10S is measured. After that, the weight for applying the load of 0.2 N is replaced with a weight for applying a load of 0.6 N, and the width of the sample 10S is measured again 5 min after the replacement. After that, the weight is replaced again with a weight for applying a load of 1.0 N, and the width of the sample 10S is measured again 5 min after the replacement.

(Temperature Coefficient of Expansion α)

A temperature coefficient α of expansion of the magnetic tape MT is preferably such that 6 [ppm/° C.] 8 [ppm/° C.]. With the configuration where the temperature coefficient α is within the range, it may become possible to further reduce the width change of the magnetic tape MT by adjusting the tension of the magnetic tape MT in the longitudinal direction by the recording and reproducing device 50.

The temperature coefficient α can be worked out as below. To begin with, a sample 10S is prepared in a similar manner as in measuring the size change amount Δw, and set on the measuring device 210 in a similar manner as in measuring the size change amount Δw. After that, the measuring device 210 is placed in a chamber with a constant environment with temperature 29° C. and relative humidity 24%. After that, a load of 0.2 N is applied in the longitudinal direction of the sample 10S so that the sample 10S is accommodated to the environment. After that, the width of the sample 10S is measured at different temperatures 45° C., 29° C., and 10° C. changed in this order, while keeping the relative humidity 24%. The temperature coefficient α is worked out by the following equation on the basis of the widths of the sample 10S at 45° C. and 10° C. Note that the measurement of the width of the sample 10S at temperature 29° C. confirming whether the measurements are carried out without abnormality (especially to confirm whether readings of the three measurements are linearly plotted), and therefore is not to be applied to the following equation.

$$\alpha[\text{ppm/° C.}] = \frac{D(45° \text{ C.})[\text{mm}] - D(10° \text{ C.})[\text{mm}]}{D(10° \text{ C.})[\text{mm}]} \times \frac{1{,}000{,}000}{(45° [\text{C.}]) - (10° [\text{C.}])} \quad [\text{Math. 2}]$$

(where D (45° C.) and D (10° C.) are the widths of the sample 10S at 45° C. and 10° C., respectively.)

(Humidity Coefficient of Expansion β)

A humidity coefficient β of expansion of the magnetic tape MT is preferably such that β≤5 [ppm/% RH]. With the configuration where the humidity coefficient β is within the range, it may become possible to further reduce the width change of the magnetic tape MT by adjusting the tension of the magnetic tape MT in the longitudinal direction by the recording and reproducing device 50.

The humidity coefficient β can be worked out as below. To begin with, a sample 10S is prepared in a similar manner as in measuring the size change amount 1 kw, and set on the measuring device 210 in a similar manner as in measuring the size change amount Δw. After that, the measuring device 210 is placed in a chamber with a constant environment with temperature 29° C. and relative humidity 24%. After that, a load of 0.2 N is applied in the longitudinal direction of the sample 10S so that the sample 10S is accommodated to the environment. After that, the width of the sample 10S is measured at different relative humidity 80%, 24%, and 10% changed in this order, while keeping the temperature 29° C. The humidity coefficient β is worked out by the following equation on the basis of the widths of the sample 10S at 80% and 10%. Note that the measurement of the width of the sample 10S at humidity 24% confirming whether the measurements are carried out without abnormality (especially to confirm whether readings of the three measurements are linearly plotted), and therefore is not to be applied to the following equation.

$$\beta[\text{ppm/\% RH}] = \frac{D(80\%)[\text{mm}] - D(10\%)[\text{mm}]}{D(10\%)[\text{mm}]} \times \frac{1{,}000{,}000}{(80[\%]) - (10[\%])} \quad [\text{Math. 3}]$$

(where D (80%) and D (10%) are the widths of the sample 10S at relative humidity 80% and 10%, respectively.)

(Poisson ratio ρ)

A Poisson ratio ρ of the magnetic tape MT is preferably such that $0.3 \leq \rho$. With the configuration where the Poisson ratio ρ is within the range, it may become possible to further reduce the width change of the magnetic tape MT by adjusting the tension of the magnetic tape MT in the longitudinal direction by the recording and reproducing device 50.

The Poisson ratio ρ can be worked out as below. To begin with, a magnetic tape MT of ½ inches in width is prepared and cut to a length of 150 mm in order to prepare a sample. To a center portion of the sample, a mark of a size of 6 mm×6 mm is marked. After that, each ends of the sample in the longitudinal direction are chucked in such a way that a distance between chucks is 100 mm. After that, under application of an initial load of 2 N on the sample, a length of the mark in the longitudinal direction of the sample is measured as an initial length, and a width of the mark in the width direction of the sample is measured as an initial width. After that, the sample is pulled at a tension rate of 0.5 mm/min by a multi-purpose tensile testing device of Instron type, and size change amounts of the length and width of the mark respectively in the longitudinal direction and the width direction of the sample are measured by an image sensor (Keyence Corporation). After that, the Poisson ratio ρ is worked out from the following equation:

$$\rho = \frac{\left\{\frac{\text{(Size change amounts of width of mark [mm])}}{\text{(Initial width [mm])}}\right\}}{\left\{\frac{\text{(Size change amounts of length of mark [mm])}}{\text{(Initial length [mm])}}\right\}} \quad [\text{Math. 4}]$$

(Elastic Limit $\sigma_{MD}$ in Longitudinal Direction)

An elastic limit $\sigma_{MD}$ in the longitudinal direction of the magnetic tape MT is preferably such that $0.8 \text{ [N]} \leq \sigma_{MD}$ With the configuration where the elastic limit $\sigma_{MD}$ is within the range, it may become possible to further reduce the width change of the magnetic tape MT by adjusting the tension of the magnetic tape MT in the longitudinal direction by the recording and reproducing device 50. Furthermore, it may become easier to control the recording and reproducing device 50. An upper limit of the elastic limit $\sigma_{MD}$ in the longitudinal direction of the magnetic tape MT is not particularly limited but can be $\sigma_{MD} \leq 5.0$ [N], for example. It is preferable that the elastic limit $\sigma_{MD}$ be not dependent on the tension rate V used for the elastic limit measurement. If the elastic limit $\sigma_{MD}$ is not dependent on the tension rate V, it may become possible to effectively reduce the width change of the magnetic tape MT regardless of the running speed of the magnetic tape MT in the recording and reproducing device 50, a tension adjusting speed of the recording and reproducing device 50, and a responding property thereof. The elastic limit $\sigma_{MD}$ is set, for example, to a predetermined value by selecting curing conditions of the underlayer 42, the magnetic layer 43, and the back layer 44, and selecting the materials of the substrate 41. For example, if the curing of coating materials for forming the underlayer, the magnetic layer, or the back layer was carried out for longer time or at a higher temperature, a reaction between the bonding agent and the curing agent contained in those materials might be facilitated. This may improve elastic characteristics, thereby increasing the elastic limit $\sigma_{MD}$.

The elastic limit σMD can be worked out as below. To begin with, a magnetic tape MT of ½ inches in width is prepared and cut to a length of 150 mm in order to prepare a sample. Both ends of the sample in the longitudinal direction are chucked to the multi-purpose tensile testing device in such a manner that λ0=100 mm where λ0 is a chuck distance between the chucks. After that, while the sample is pulled at a tension rate of 0.5 mm/min, a load σ (N) is measured continuously against the chuck distance λ (mm). After that, using the data of λ (mm) and σ (N), the relationship between Δλ(%) and σ (N) is graphed, where Δλ (%) is obtained by the following equation:

$$\Delta\lambda(\%) = ((\lambda \times \lambda 0)/\lambda 0) \times 100$$

After that, a region where the plotted curve is straight in a region σ≥0.2 N is worked out from the graph, and a maximum load σ in the region thus worked out is taken as the elastic limit $\sigma_{MD}$ (N).

(Interlayer Friction Coefficient μ)

An interlayer friction coefficient β between a magnetic surface and a back surface is such that $0.20 \leq \mu \leq 0.80$. With the configuration where the interlayer friction coefficient μ is within the range, it may become possible to reduce occurrence of reeling slippage when the magnetic tape MT is reeled around a reel (such as a reel 13 in FIG. 2). More specifically, if the interlayer friction coefficient μ is such that μ<0.20, it would possibly extremely lower interlayer friction between a magnetic surface of an outermost portion of the magnetic tape MT reeled on a cartridge reel and a back surface of the magnetic tape MT to be reeled around the magnetic surface of the outermost portion of the magnetic tape MT reeled on the cartridge reel. This would make it easier for the portion of the magnetic tape MT to be reeled to slip from the magnetic surface of the outermost portion of the magnetic tape MT having been reeled. Therefore, this would possibly cause slippage in reeling the magnetic tape MT. On the other hand, if the interlayer frication coefficient μ is such that 0.80<μ, this would possibly cause an extremely high interlayer friction between a back surface of the magnetic tape MT to be reeled out right now from the outermost portion reeled on a drive-side reel and a magnetic surface of the portion of the magnetic tape MT still reeled around the drive-side reel and being right under that portion to be reeled out right now. This would possibly lead to a situation where the back surface and the magnetic surface stick together. Therefore, this would possibly lead to unstable operation of the magnetic tape MT to be fed to the cartridge reel, thereby causing slippage in reeling the magnetic tape MT.

The interlayer friction coefficient μ can be worked out as below. To begin with, a magnetic tape MT of ½ inches in width is reeled around a cylinder of 1 inch in diameter in such a manner that the back surface of the magnetic tape MT faces outside. After the magnetic tape MT is immobilized, another magnetic tape MT of ½ inches in width is brought into contact with the magnetic tape in such a manner that the magnetic surface of the another magnetic tape MT contacts the back surface of the magnetic tape MT at an included angle of θ(°)=180°+1° to 180°–10°. After that, one end of the another magnetic tape is connected with a movable strain gauge, and a tension of T0=0.6 (N) is applied on another end of the another magnetic tape. The movable strain gauge is moved back and forth 8 times at 0.5 mm/s, and readings of the strain gauge T1 (N) to T8 (N) are measured every time the strain gauge is moved forth. An average of T4 to T8 is taken as $T_{ave}$ (N). After that, the interlayer friction coefficient µ is worked out from the following equation:

$$\mu = \frac{1}{\theta[°] \times (\pi/180)} \times \log_e\left(\frac{T_{ave}\ [N]}{T_0\ [N]}\right) \quad \text{[Math. 5]}$$

(Surface Roughness $R_b$ of Back Surface)

Surface roughness $R_b$ of the back surface (surface roughness of the back layer 44) is preferably such that $R_b \leq 6.0$ [nm]. If the surface roughness $R_b$ of the back surface is within the range, it may become possible to improve the electromagnetic conversion characteristics. The surface roughness $R_b$ of the back surface can be worked out as below. To begin with a magnetic tape MT of ½ inches in width is prepared and adhered to a slide glass with the back surface faced up, thereby preparing a test piece. After that, surface roughness of the back surface of the test piece is measured by a non-contact roughness meter using optical interferometry as below. Device: non-contact roughness meter using optical interferometry (Mitsubishi Chemical Systems, Inc.; Non-contact surface/layer cross-section profiler system VertScan R5500GL-M100-AC)

Object Lens: ×20 (about 237 µm×178 µm viewing field)
Resolution: 640 points×480 points
Measurement Mode: Phase
Wavelength Filter: 520 nm
Surface Correction: corrected by second-order polynomial approximation surface The surface roughness is measured at five or more points in the longitudinal direction as described above. From surface profiles obtained respectively at the points, arithmetic average roughness Sa (nm) of each point is automatically calculated out, and averaged to obtain surface roughness $R_b$ (nm) of the back surface.

(Young's Modulus of the Magnetic Tape in the longitudinal direction)

Young's modulus of the magnetic tape MT in the longitudinal direction is preferably less than 8.0 GPa, more preferably 7.9 GPa or less, further more preferably 7.5 GPa or less, or especially preferably 7.1 GPa or less. If the Young's modulus of the magnetic tape MT in the longitudinal direction is less than 8.0 GPa, the magnetic tape MT may be capable of being stretched by external force, thereby making it easier to adjust the width of the magnetic tape MT by the tension control. Therefore, this may make it possible to more appropriately suppress off-track, thereby making it possible to more accurately reproduce data recorded on the magnetic tape MT.

The Young's modulus of the magnetic tape MT in the longitudinal direction is a value indicating how difficult to stretch the magnetic tape MT in the longitudinal direction by external force. With a greater Young's modulus, the magnetic tape MT is more difficult to stretch in the longitudinal direction by the external force. With a smaller Young's modulus, the magnetic tape MT is easier to stretch in the longitudinal direction by the external force.

Note that the Young's modulus of the magnetic tape MT in the longitudinal direction is not only a value regarding the longitudinal direction of the magnetic tape MT but also a value relating to how difficult to stretch the magnetic tape MT in the width direction. That is, with a greater Young's modulus, the magnetic tape MT is more difficult to stretch in the width direction by the external force, while, with a smaller Young's modulus, the magnetic tape MT is easier to stretch in the width direction by the external force. Therefore, in view of the tension control, a smaller Young's modulus of the magnetic tape MT in the longitudinal direction is more advantageous.

The Young's modulus of the magnetic tape MT in the longitudinal direction can be measured by using a tensile testing device (Shimadzu Corp., AG-100D). The magnetic tape MT is cut to a length of 180 mm to prepare a measurement sample. The measurement sample is attached to a jig for fixing the width (½ inches) of the measurement sample, the jig being attached to the tensile testing device. In this way, the measurement sample is fixed at an upper end and a lower end distanced by 100 mm. After the measurement sample is chucked, a stress is gradually applied on the measurement sample in directions in which the measurement sample are pulled, at a tension rate of 0.1 mm/min. From a stress change and stretching amounts of the measurement sample in pulling the measurement sample, the Young's modulus is calculated out by using the following equation.

$$E = (\Delta N/S)/(\Delta x/L) \times 10^{-3}$$

ΔN: Stress change (N)
S: Cross-section area of test piece (mm²)
Δx: Stretching amount (mm)
L: Jig holding distance (mm)

The stress applied is ranged from 0.5 N to 1.0 N, and the stress change (ΔN) and the stretching amount (ax) observed under the stress application thus changed gradually from 0.5 N to 1.0 N are used in the calculation.

(Young's Modulus of Substrate 41 in Longitudinal Direction)

Young's modulus of the substrate 41 in the longitudinal direction is preferably less than 7.5 GPa, more preferably 7.4 GPa or less, further more preferably 7.0 GPa or less, or especially preferably 6.6 GPa or less.

If the Young's modulus of the substrate 41 in the longitudinal direction is less than 7.5 GPa, the magnetic tape MT may be capable of being stretched by external force, thereby making it easier to adjust the width of the magnetic tape MT by the tension control. Therefore, this may make it possible to more appropriately suppress off-track, thereby making it possible to more accurately reproduce data recorded on the magnetic tape MT.

The Young's modulus of the substrate 41 in the longitudinal direction can be worked out as below. To begin with, the underlayer 42, the magnetic layer 43, and the back layer 44 are removed from the magnetic tape MT, so as to prepare a sample in which the substrate 41 is remained. Using the sample of substrate 41, the Young's modulus of the substrate 41 in the longitudinal direction is worked out in a similar manner as in working out the Young's modulus of the magnetic tape MT in the longitudinal direction.

The thickness of the substrate 41 accounts for more than half of the entire thickness of the magnetic tape MT. Therefore, the Young's modulus of the substrate 41 in the longitudinal direction relates to how difficult to stretch the magnetic tape MT by external force. With a greater Young's modulus of the substrate 41 in the longitudinal direction, the magnetic tape MT is more difficult to stretch in the width direction by external force, while, with a smaller Young's modulus of the substrate 41 in the longitudinal direction, the magnetic tape MT is easier to stretch in the width direction by external force.

Note that the Young's modulus of the substrate 41 in the longitudinal direction is not only a value regarding the longitudinal direction of the magnetic tape MT but also a value relating to how difficult to stretch the magnetic tape MT in the width direction. That is, with a greater Young's modulus, the magnetic tape MT is more difficult to stretch in the width direction by the external force, while, with a smaller Young's modulus, the magnetic tape MT is easier to stretch in the width direction by the external force. Therefore, in view of the tension control, a smaller Young's modulus of the substrate 41 in the longitudinal direction is more advantageous.

(BET Specific Surface Area)

A lower limit of a BET specific surface area of the entire magnetic tape MT from which the lubricant has been removed is 3.5 $m^2$/mg or more, preferably 4 $m^2$/mg or more, more preferably 4.5 $m^2$/mg or more, or further more preferably 5 $m^2$/mg or more. With the configuration where the lower limit of the BET specific surface area is 3.5 $m^2$/mg or more, it may become possible to alleviate a decrease of an amount of the lubricant to be supplied between the surface of the magnetic layer 43 and the magnetic head, even after repeatedly performed recording or reproducing (that is, repeatedly performed running the magnetic head in contact with the surface of the magnetic tape MT). Therefore, this may make it possible to suppress an increase of dynamic friction coefficient.

An upper limit of the BET specific surface area of the magnetic tape MT from which the lubricant has been removed is preferably 7 $m^2$/mg or less, more preferably 6 $m^2$/mg or less, or further more preferably 5.5 $m^2$/mg or less. With the configuration where the upper limit of the BET specific surface area is 7 $m^2$/mg or less, it may become possible to provide a sufficient amount of the lubricant without depletion even after performing the running multiple times. Therefore, this may make it possible to suppress an increase of dynamic friction coefficient.

An average pore diameter of the entire magnetic tape MT, which is worked out by the BJH technique, is not less than 6 nm but not more than 11 nm, or preferably not less than 7 nm but not more than 10 nm, or more preferably not less than 7.5 nm but not more than 10 nm. In the configuration where the average pore diameter is not less than 6 nm but not more than 11 nm, it may become possible to improve the effect of the suppression of the increase of the dynamic friction coefficient.

The BET specific surface area and pore distribution (pore volume, pore diameter in a maximum pore volume in attaching and detaching) can be worked out as below. To begin with, the magnetic tape MT is washed with hexane for 24 hours and cut into a size of 0.1265 $m^2$ in area, thereby preparing a measurement sample. After that, the BET specific surface area is measured by using a specific surface area/pore distribution measuring device. Furthermore, by the BJH technique, the pore distribution (pore volume, pore diameter in a maximum pore volume in attaching and detaching) is measured. In the following, the measuring device and measurement conditions are listed.

Measuring Device: 3FLEX made by Micromeritics Instrument Corp.

Measurement adsorption material: $N_2$ gas

Measurement Pressure Range (p/p0): 0 to 0.995

(Arithmetic Average Roughness Ra)

An arithmetic average roughness Ra of the magnetic surface is preferably 2.5 nm or less, or more preferably 2.0 nm or less. If Ra is 2.5 nm or less, it may become possible to attain more excellent electromagnetic conversion characteristics (for example, SNR).

The arithmetic average roughness Ra can be worked out as below. To begin with, the magnetic surface (the side on which the magnetic layer 43 is provided) is observed by using an Atomic Force Microscope (AFM) (made by Bruker, Dimension Icon), so as to obtain a cross-section profile.

After that, from the cross-section profile thus obtained, the arithmetic average roughness Ra is worked out by a method according to JIS B0601:2001.

[Manufacturing Method of Magnetic Tape]

In the following, a method for manufacturing the magnetic tape MT configured as described above. The non-magnetic powder and the bonding agent, and the like are mixed and dispersed in a solvent. In this way, a coating material for forming the underlayer is prepared. The magnetic powder and the bonding agent, and the like are mixed and dispersed in a solvent. In this way, a coating material for forming the magnetic layer is prepared. For preparing the coating materials for the underlayer and the magnetic layer, the following solvents, dispersing devices, and mixing devices can be used, for example.

Examples of the solvent for use in preparing the coating materials include ketone-type solvents such as acetone, methylethylketone, methylisobutylketone, and cyclohexanone, alcohol-type solvents such as methanol, ethanol, and propanol, ester-type solvents such as methyl acetate, ethyl acetate, butyl acetate, propyl acetate, ethyl lactate, and ethylene glycol acetate, ether-type solvents such as diethylene glycol dimethyl ether, 2-ethoxy ethanol, tetrahydrofuran, and dioxane, aromatic hydrocarbon-type solvents such as benzene, toluene, and xylene, and halogen hydrocarbon-type solvents such as methylene chloride, ethylene chloride, carbon tetrachloride, chloroform, and chlorobenzene, and the like. These solvents may be used solely or be mixed and used in combination.

The mixing device for preparing the coating materials may include, for example, a mixing and kneading device such as a continuous two-screwed extruder, a continuous two-screwed extruder capable of performing multi-staged dilution, a kneader, a pressure kneader, a roll kneader, or the like, but not limited to these. Moreover, the dispersing device for preparing the coating material may include, for example, a roll mill, a ball mill, a horizontal sand mill, a vertical sand mill, a spike mill, a pin mill, a tower mill, a pearl mill (such as "DCP mill" made by Eirich), a homogenizer, a supersonic dispersing device, or the like, but is not limited to these.

After that, the coating material for forming the underlayer is applied and dried on one of the main surfaces of the substrate 41, so as to form the underlayer 42. After that, the coating material for forming the magnetic layer is applied and dried on the underlayer 42, so as to form the magnetic layer 43 on the underlayer 42. Note that the drying is performed such that the magnetic powder is oriented in the thickness direction of the substrate 41 by a magnetic field by using, for example, solenoidal coil during the drying.

As an alternative, drying may be performed such that the magnetic powder is oriented in the running direction (longitudinal direction) of the substrate 41 and thereafter oriented in the thickness direction of the substrate 41 by a magnetic field by using, for example, solenoidal coil during the drying. By orienting the magnetic powder in the longitudinal direction before orienting the magnetic powder in the thickness direction, it may become possible to further improve the vertical orientation (that is, the squareness ratio S1) of the magnetic powder. After the magnetic layer 43 is formed, the back layer 44 is formed on the other one of the main surfaces of the substrate 41. In this way, the magnetic tape MT can be prepared.

The squareness ratios S1 and S2 are set to predetermined values by, for example, adjusting the strength of the magnetic field applied on the coating material for forming the magnetic layer, solid concentration in the coating material for forming the magnetic layer, and drying conditions (drying temperature and drying time) of the coating material for forming the magnetic layer. The strength of the magnetic field applied on the coating material for forming the magnetic layer is preferably larger than the coercive force of the magnetic powder by not less than 2 times but not more than 3 times. In order to further increase the squareness ratio S1 (that is, to further lower the squareness ratio S2), it is preferable that the magnetic powder be more dispersed in the coating material for forming the magnetic layer. Furthermore, in order to further increase the squareness ratio S1, it is effective to magnify the magnetic powder before the coating material for forming the magnetic layer is introduced into an orientating device for orienting the magnetic powder by the magnetic field. The methods of adjusting the squareness ratios S1 and S2 may be used solely or two or more of them may be used in combination.

After that, the magnetic tape MT thus obtained is reeled around a large-diameter core, and cured. After that, the magnetic tape MT is subjected to calendaring and cut into a predetermined width (for example ½-inch width). In this way, a narrow and long magnetic tape MT as desired can be obtained.

[Configuration of Recording and Reproducing Device]

The recording and reproducing device 50 is configured to perform recording and reproducing of the magnetic tape MT configured as above. The recording and reproducing device 50 has a configuration capable of adjusting the tension applied on the magnetic tape MT in the longitudinal direction. Furthermore, the recording and reproducing device 50 includes a configuration capable of loading a cartridge 10 therein. Here, for the sake of easy explanation, a case where the recording and reproducing device 50 has a configuration capable of loading one cartridge 10 therein will be described, but the recording and reproducing device 50 may have a configuration capable of loading a plurality of cartridges 10 therein.

The recording and reproducing device 50 is connected via a network 70 to an information processing device such as a server 71, a personal computer (hereinafter, referred to as "PC") 72, and is configured to be capable of recording on the cartridge 10 data supplied from such an information processing device. Furthermore, the recording and reproducing device 50 is configured to, in response to a request from such an information processing device, reproduce data from the cartridge 10 and supply the data to such an information processing device. A shortest recording wavelength of the recording and reproducing device 50 is preferably 96 nm or less, more preferably 88 nm or less, or further more preferably 80 nm or less.

The recording and reproducing device 50 includes, as illustrated in FIG. 1, a spindle 51, a reel 52 of the recording and reproducing device 50, a spindle driving device 53, a reel driving device 54, a plurality of guide rollers 55, a head unit 56, a reader writer 57 serving as a communication unit, a communication interface (hereinafter, referred to as I/F) 58, and a control device 59.

The spindle 51 is configured to be attachable to the cartridge 10. The magnetic tape MT is such that a servo pattern of two diagonal lines (like a hanoji character of Japanese Katakana character) is recorded in advance for a servo signal. The reel 52 is configured to be capable of holding one end (leader pin 20) of the magnetic tape MT pulled out from the cartridge 10 via a tape loading mechanism (not illustrated).

The spindle driving device 53 is configured to rotate the spindle 51 according to a command from the control device 59. The reel driving device 54 is configured to rotate the reel 52 according to a command from the control device 59. The plurality of guide rollers 55 is configured to guide the running of the magnetic tape MT in such a manner that a tape pass formed between the cartridge 10 and the reel 52 has a predetermined relative positional relationship with the head unit 56.

For recording data onto the magnetic tape MT or for reproducing data from the magnetic tape MT, the spindle driving device 53 and the reel driving device 54 rotate the spindle 51 and the reel 52, respectively, so as to cause the magnetic tape MT to run. The running of the magnetic tape MT is bidirectional and can run in a forwarding direction (a direction of running from the cartridge 10 to the reel 52) and in a reverse direction (a direction of running from the reel 52 to the cartridge 10).

In the present embodiment, the tension of the magnetic tape MT in the longitudinal direction can be adjusted in recording or reproducing data by controlling the rotation of the spindle 51 by the spindle driving device 53 or by controlling the rotation of the reel 52 by the reel driving device 54. Note that the tension adjustment of the magnetic tape MT may be carried out by controlling movement of the guide rollers 55, instead of or in addition to the control of the rotations of the spindle 51 and the reel 52.

The reader writer 57 is configured to be capable of writing first information and second information to the cartridge memory 11 according to a command from the control device 59. Furthermore, the reader writer 57 is configured to be capable of reading first information and second information from the cartridge memory 11 according to a command from the control device 59. As a method of communication between the reader writer 57 and the cartridge memory 11, ISO 14443 may be adopted, for example. The second information includes tension adjusting information. The tension adjusting information is one example of data recording state information.

The control device 59 includes, for example, a control unit, a storage unit, a communication unit, and the like. The control unit includes, for example, a central processing unit (CPU) or the like, and is configured to control various sections of the recording and reproducing device 50 according to a program stored in the storage unit. For example, in response to a request from an information processing device such as the server 71, the PC 72, or the like, the control device 59 causes the head unit 56 to record onto the magnetic tape MT a data signal supplied from the information processing device.

Furthermore, in response to a request from an information processing device such as the server 71, the PC 72, or the like, the control device 59 causes the head unit 56 to reproduce a data signal recorded on the magnetic tape MT so as to supply the data signal to the information processing device.

The storage unit includes a non-volatile memory for recording various data and various program therein and a volatile memory for use as a work area for the control unit. The various program may be read from a portable recording medium such as an optical disk or a portable storage device such as a semiconductor memory, or downloaded from a server device on a network.

For recording data onto the magnetic tape MT, or for reproducing data from the magnetic tape MT, the control device 59 reads, by the head unit 56, the servo signal recorded on two adjacent servo bands SB. On the basis of the servo signal read from the two servo bands SB, the control device 59 controls a position of the head unit 56 in such a way that the head unit 56 follows the servo pattern.

In performing data recording onto the magnetic tape MT, the control device 59 works out a distance d1 between the two adjacent servo bands SB (a distance in the width direction of the magnetic tape MT) from a reproduction waveform of the servo signal read from the two adjacent servo bands SB. The control device 59 causes the reader writer 57 to write onto the memory 36 the distance thus worked out.

In performing data reproduction from the magnetic tape MT, The control device 59 works out a distance d2 between the two adjacent servo bands SB (a distance in the width direction of the magnetic tape MT) from a reproduction waveform of the servo signal read from the two adjacent servo bands SB. In addition to this, the control device 59 causes the reader writer 57 to read out, from the memory 36, the distance d1 between the two adjacent servo bands SB, the distance d1 having been worked out at the time of the data recording on the magnetic tape MT. The control device 59 controls the rotations of the spindle driving device 53 and the reel driving device 54 and thereby adjust the tension of the magnetic tape MT in the longitudinal direction in such a way that difference Δd between the distance d1 and the distance d2 falls into a certain range, the distance d1 between the servo bands SB being measured at the time of data recording onto the magnetic tape MT, the distance d2 between the servo bands SB being measured at the time of data reproduction from the magnetic tape MT. The tension adjustment may be carried out by feedback control, for example.

The head unit 56 is configured to be capable of recording data onto the magnetic tape MT according to a command from the control device 59. Furthermore, the head unit 56 is configured to be capable of reproducing data from the magnetic tape MT according to a command from the control device 59. The head unit 56 includes, for example, two servo read heads and a plurality of data write/read heads, or the like.

The servo read heads are configured to be capable of reproducing the servo signal by reading, via a magneto resistive (MR) element, a magnetic field produced from the servo signal stored on the magnetic tape MT. The two servo read heads are distanced from each other in the width direction by a distance substantially equal to the two adjacent servo bands SB.

The data write/read heads are positioned between the two servo read heads in such a manner that the data write/read heads are aligned with equal intervals therebetween in a direction from one of the servo read heads to the other of the servo read heads. The data write/read heads are configured to be capable of recoding data onto the magnetic tape MT by a magnetic field produced from a magnetic gap. Furthermore, the data write/read head is configured to be capable of reproducing data from the magnetic tape MT by reading, via the MR element or the like, a magnetic field produced from the data stored on the magnetic tape MT.

The communication I/F 58 is for communication with the information processing device such as the server 71 and the PC 72, and is configured to be connected to the network 70.

[Operations of Recording and Reproducing Device for Data Recording]

Figure 10:
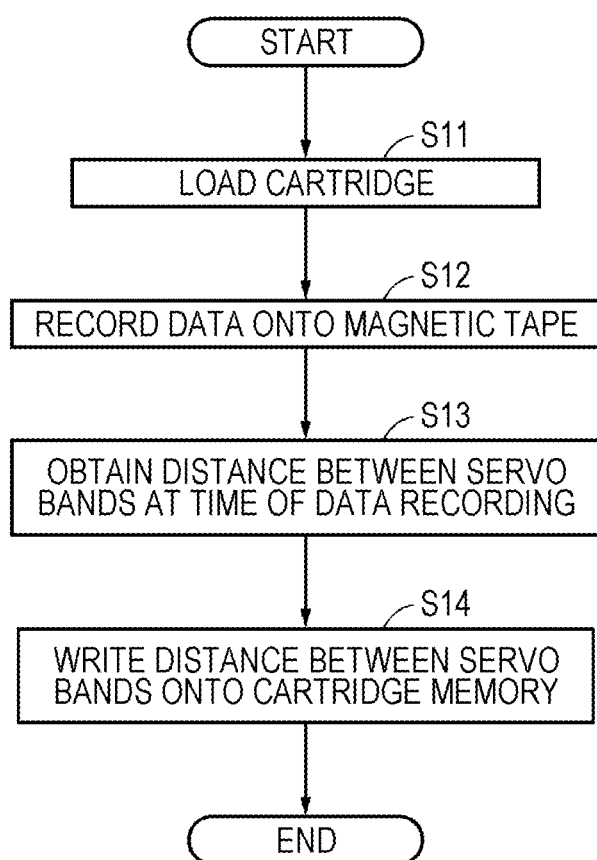
FIG. 10 is a flowchart for explaining one example of an operation of a recording and reproducing device in data recording.

In the following, referring to FIG. 10, one example of an operation of the recording and reproducing device 50 for data recording will be described.

To begin with, the control device 59 performs the loading of the cartridge 10 to the recording and reproducing device 50 (step S11). After that, the control device 59 controls the rotation of the spindle 51 and the reel 52 so as to cause the magnetic tape MT to run, while applying a predetermined tension on the magnetic tape MT in the longitudinal direction. Then, the control device 59 performs the servo signal reading via the servo read heads of the head unit 56, and data recording onto the magnetic tape MT via the data write/read heads of the head unit 56 (step S12).

In doing these operations, the head unit 56 records the data to the data band DB via the data write/read heads of the head unit 56, while tracing the two adjacent servo bands SB by using the two servo head heads of the head unit 56.

After that, the control device 59 works out, from the reproduction waveform of the servo signal read out via the servo read heads of the head unit 56, how much the distance d1 between the two adjacent servo bands SB is at the time of data recording (step S13). After that, the control device 59 causes the reader writer 57 to write onto the cartridge memory 11 the distance d1 between the two adjacent servo bands SB measured at the time of data recording (step S14). The control device 59 may perform this by continuously measuring the distance d1 between the servo bands SB and writing the distance d1 onto the cartridge memory 11 or by measuring the distance d1 between the servo bands SB with constant time intervals and writing the distance d1 onto the cartridge memory 11. In the case where the distance d1 between the servo bands SB is measured with constant time intervals and written onto the cartridge memory 11, it may become possible to reduce an information amount to be written on the memory 36.

[Operation of Recording and Reproducing Device for Data Reproduction]

Figure 11:
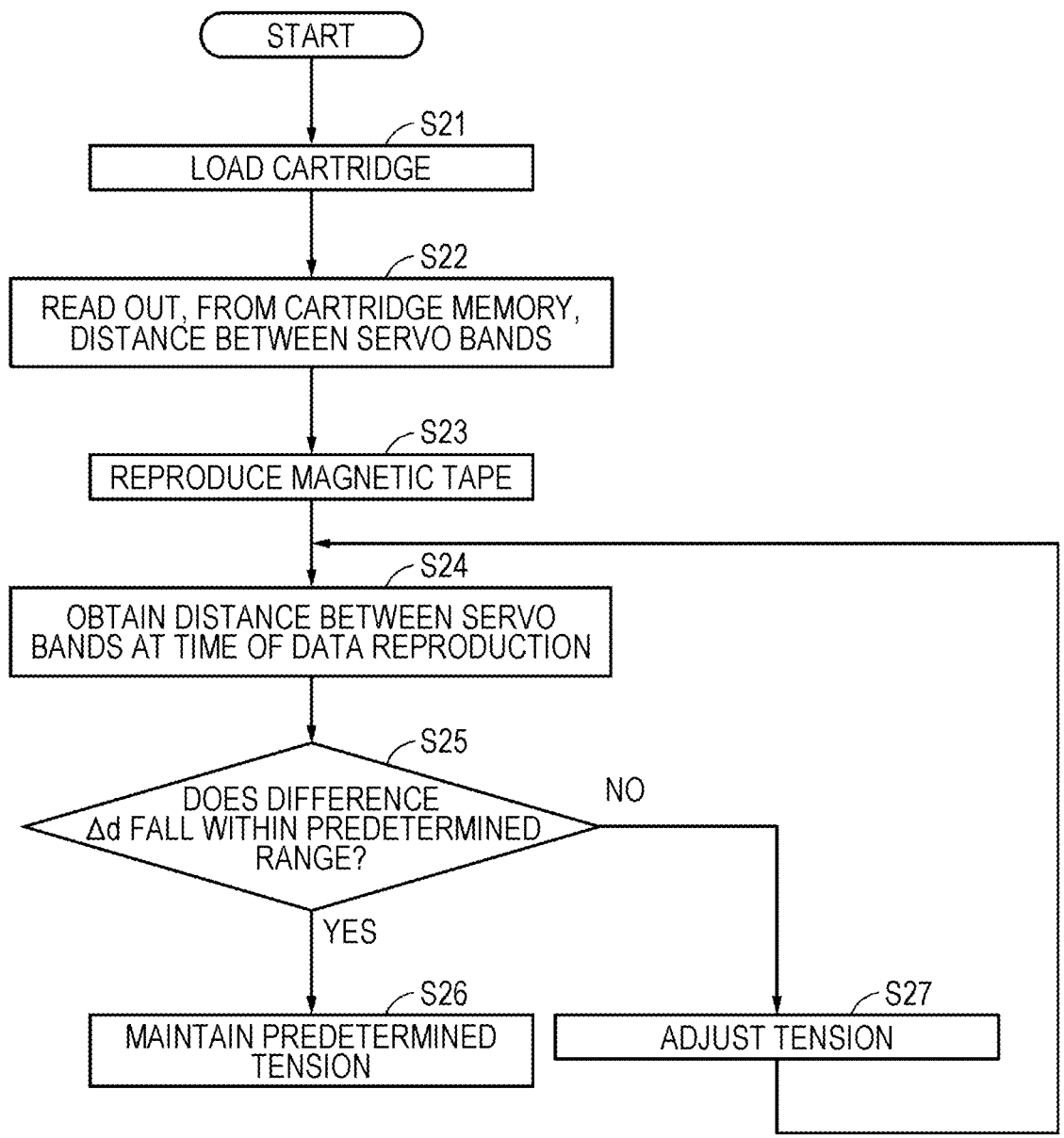
FIG. 11 is a flowchart for explaining one example of an operation of a recording and reproducing device in data reproduction.

In the following, referring to FIG. 11, one example of an operation of the recording and reproducing device 50 for data reproduction will be described.

The control device 59 performs the loading of the cartridge 10 to the recording and reproducing device 50 (step S21). Next, the control device 59 causes the reader writer 57 to read out, from the cartridge memory 11, the distance d1 between the servo bands SB, which are measured at recording (step S22).

After that, the control device 59 controls the rotations of the spindle 51 and reel 52 in order to cause the magnetic tape MT to run, while applying a predetermined tension on the magnetic tape MT in the longitudinal direction. Then, the control device 59 performs the reading of the servo signal via the servo read head of the head unit 56, and data reproduction from the magnetic tape MT via the data write/read head of the head unit 56 (step S23).

After that, the control device 59 works out, from the reproduction waveform of the servo signal read out via the servo read heads of the head unit 56, the distance d2 between the two adjacent servo bands SB measured at the time of data reproduction (step S24).

After that, the control device 59 judges whether or not the difference Δd between the distance d1 between the servo bands SB read out at step S22 and the distance d2 worked out at step S24 falls into a predetermined range (step S25).

If the control device 59 judges at step S25 that the difference Δd falls within the predetermined range, the control device 59 controls the rotations of the spindle 51 and reel 52 in such a manner that the predetermined tension is maintained (step S26).

If the control device 59 judges at step S25 that the difference Δd is not within the predetermined range, the control device 59 controls the rotations of the spindle 51 and reel 52 in such a way to reduce the difference Δd by adjusting the tension applied on the running magnetic tape MT, and returns the process to step S24 (step S27).

[Effects]

As described so far, the magnetic tape MT according to the first embodiment is configured such that the squareness ratio S1 of the magnetic layer 43 in the vertical direction is 65% or more. With this configuration, it may become possible to attain good electromagnetic conversion characteristics (for example SNR) even in a case where data is recorded on the magnetic tape MT with a data track width of 1500 nm or less.

Furthermore, the magnetic tape MT according to the first embodiment is such that $(w_{max}-w_{min})/W_{min} \leq 400$ [ppm], where $w_{max}$ and $w_{min}$ are the maximum and minimum values among the average values of the width of the magnetic tape MT measured under the four environments with the temperature and relative humidity of (10° C., 10%), (10° C., 80%), (29° C., 80%), and (45° C., 10%). With this configuration, it may become possible to reduce the width change of the magnetic tape MT even if the environmental temperature or relative humidity around the magnetic tape MT (cartridge 10) changes. Thus, this may make it possible to reduce off-track even in a case where data is recorded on the magnetic tape MT with a data track width of 1500 nm or less.

Furthermore, the magnetic tape MT according to the first embodiment is such that the substrate 41 contains polyester. With this configuration, it may become possible to attain a stable or substantially stable width of the magnetic tape MT in such a way that if the width of the magnetic tape MT, on which data is recorded with the data track width, changes according to a change in the environmental temperature or relative humidity around the magnetic tape MT (cartridge 10), the tension of the magnetic tape MT in the longitudinal direction is adjusted by the recording and reproducing device 50 when the magnetic tape MT is running. Thus, this may make it possible to further reduce off-track caused due to such a change in the environmental temperature and humidity.

2 Second Embodiment

[Configuration of Recording and Reproducing Device]

Figure 12:
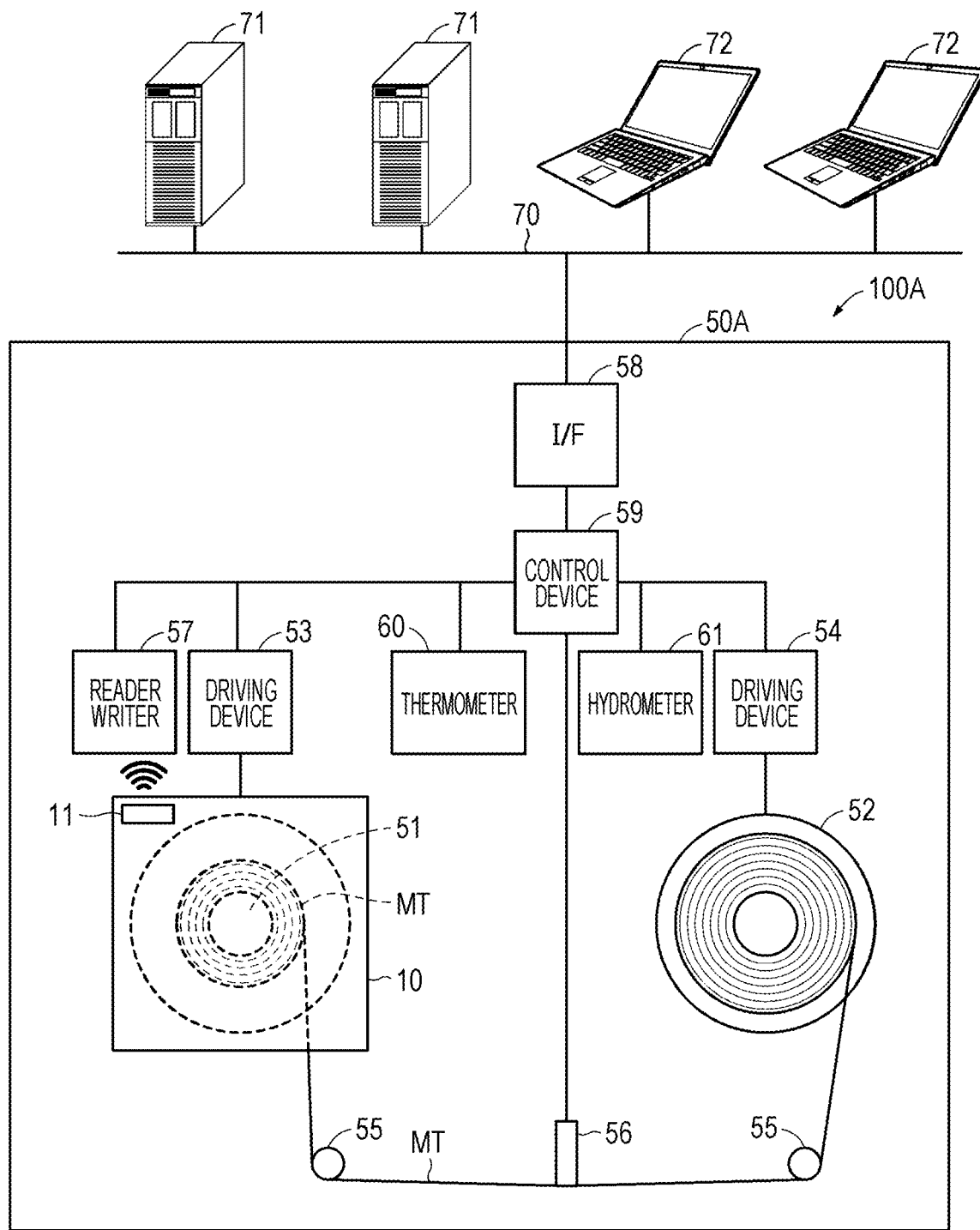
FIG. 12 is a schematic diagram illustrating one example of a configuration of a recording and reproducing system according to a second embodiment of the present disclosure.

FIG. 12 is a schematic diagram illustrating one example of a configuration of a recording and reproducing system 100A according to a second embodiment of the present disclosure. The recording and reproducing system 100A includes the cartridge 10 and a recording and reproducing device 50A.

The recording and reproducing device 50A further includes a thermometer 60 and a hygrometer 61. The thermometer 60 is configured to measure an environmental temperature around a magnetic tape MT (cartridge 10) and outputs reading to the control device 59. Furthermore, the hygrometer 61 is configured to measure environmental humidity round the magnetic tape MT (cartridge 10) and outputs reading to the control device 59.

At the time of recording data onto the magnetic tape MT, the control device 59 measure the environmental temperature Tm1 and humidity H1 around the magnetic tape MT (cartridge 10) by using the thermometer 60 and the hygrometer 61, and writes the readings of the measurement onto the cartridge memory 11 via a reader writer 57. The temperature Tm1 and humidity H1 are some examples of environmental information regarding surroundings of the magnetic tape MT.

On the basis of driving data of the spindle 51 and the reel 52, the control device 59 works out a tension Tn1 applied on the magnetic tape MT in the longitudinal direction at the time of data recording onto the magnetic tape MT, and writes the tension Tn1 on the cartridge memory 11 via the reader writer 57.

In performing data recording onto the magnetic tape MT, the control device 59 works out a distance d1 between the two adjacent servo bands SB from a reproduction waveform of the servo signal read from the two adjacent servo bands SB. After that, on the basis of the distance d1, the control device 59 works out width W1 that the magnetic tape MT had at the time of data recording, and writes the width W1 onto the memory 36 via the reader writer 57.

At the time of reproducing data from the magnetic tape MT, the control device 59 measures environmental temperature Tm2 and humidity H2 around the magnetic tape MT (cartridge 10) by using the thermometer 60 and the hygrometer 61.

On the basis of the driving data of the spindle 51 and the reel 52, the control device 59 works out a tension Tn2 applied on the magnetic tape MT in the longitudinal direction at the time of data reproduction from the magnetic tape MT.

From the reproduction waveform of the servo signal read out from the two adjacent servo bands SB at the time of the data reproduction from the magnetic tape MT, the control device 59 works out the distance d2 between the two adjacent servo bands SB. After that, on the basis of the distance d2, the control device 59 works out width W2 that the magnetic tape MT had at the time of data reproduction.

For reproducing the data from the magnetic tape MT, the control device 59 reads out, from the cartridge memory 11 via the reader writer 57, the temperature Tm1, the humidity H1, the tension Tn1, and the width W1 written on the cartridge memory 11 at the time of the data recording. After that, the control device 59 controls the tension to be applied on the magnetic tape MT, in such a way that the width W2 of the magnetic tape MT at the time of data reproduction will be equal to or substantially equal to the width W1 of the magnetic tape at the time of data recording, by using the temperature Tm1, the humidity H1, the tension Tn1, and the width W1 at the time of data recording and the temperature Tm2, the humidity H2, the tension Tn2, and the width W2 at the time of data reproduction.

The controller 35 of the cartridge memory 11 stores in the second storage area 36B of the memory 36 the temperature Tm1, the humidity H1, the tension Tn1, and the width W1 received via the antenna coil 31 from the recording and reproducing device 50A. In response to a request from the recording and reproducing device 50A, the controller 35 of the cartridge memory 11 reads out the temperature Tm1, the humidity H1, the tension Tn1, and the width W1 from memory 36, and sends the temperature Tm1, the humidity H1, the tension Tn1, and the width W1 via the antenna coil 31 to the recording and reproducing device 50A.

[Operations of Recording and Reproducing Device for Data Recording]

Figure 13:
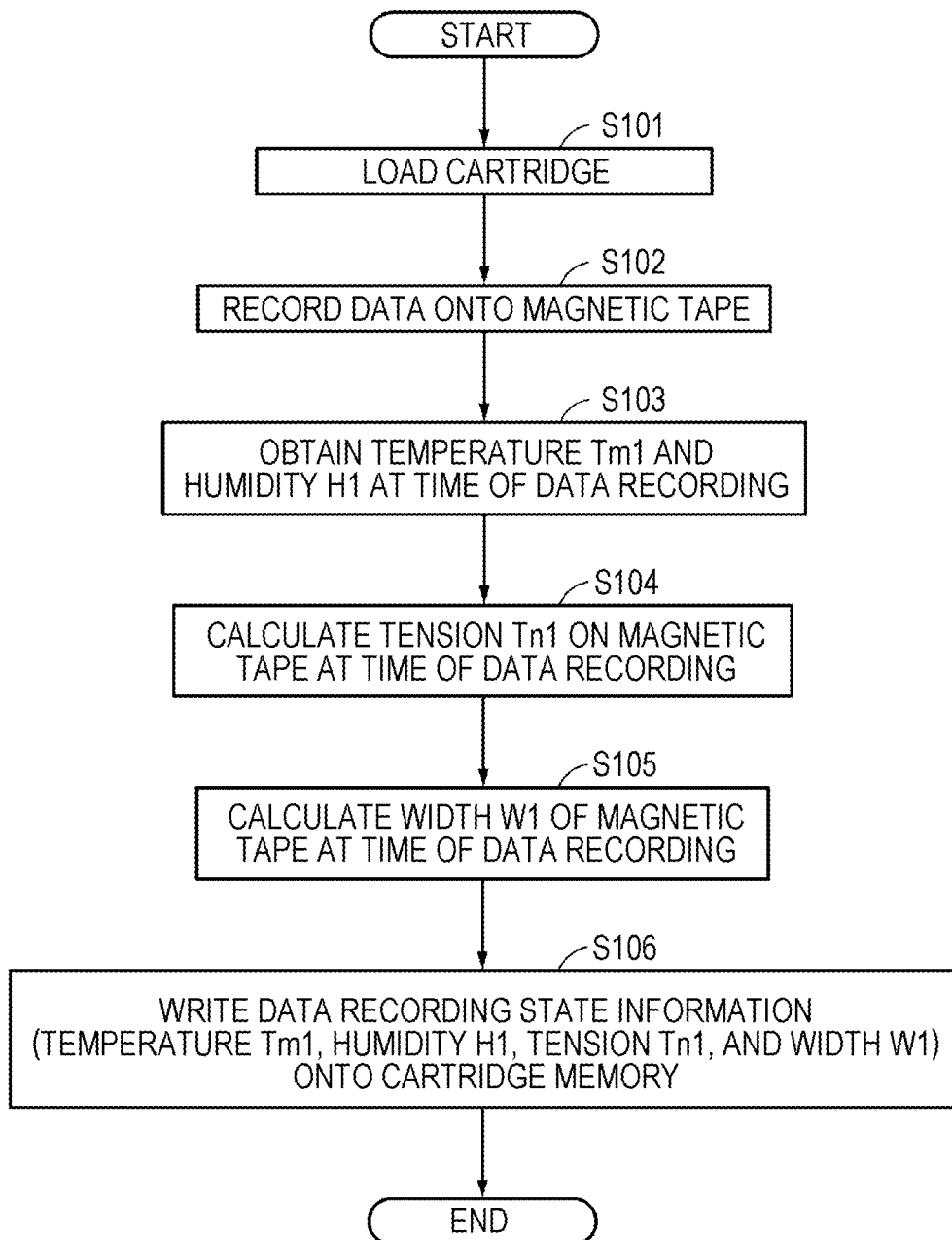
FIG. 13 is a flowchart for explaining one example of an operation of a recording and reproducing device in data recording.

In the following, referring to FIG. 13, one example of an operation of the recording and reproducing device 50A for data recording will be described.

To begin with, the control device 59 performs the loading of the cartridge 10 to the recording and reproducing device 50A (step S101). After that, the control device 59 controls the rotation of the spindle 51 and the reel 52 so as to cause the magnetic tape MT to run, while applying a predetermined tension on the magnetic tape MT in the longitudinal direction. Then, the control device 59 performs data recording onto the magnetic tape MT via the head unit 56 (step S102).

After that, the control device 59 obtains, from the thermometer 60 and the hygrometer 61, the environmental temperature Tm1 and humidity H1 around the magnetic tape MT measured at the time of data recording (environmental information) (step S103).

After that, on the basis of the driving data of the spindle 51 and the reel 52 at the time of data recording, the control device 59 calculates out the tension Tn1 applied on the magnetic tape MT in the longitudinal direction at the time of data recording (step S104).

After that, the control device 59 works out the distance d1 between the two adjacent servo bands SB from the reproduction waveform of the servo signal read out from the servo read heads of the head unit 56. After that, on the basis of the distance d1, the control device 59 calculates out the width W1 that the magnetic tape MT had at the time of data recording (step S105).

After that, the control device 59 causes the reader writer 57 to write the temperature Tm1, the humidity H1, the tension Tn1, and the width W1 of the magnetic tape MT onto the cartridge memory 11 as the data recording state information (step S106).

[Operations of Recording and Reproducing Device for Data Reproducing]

Figure 14:
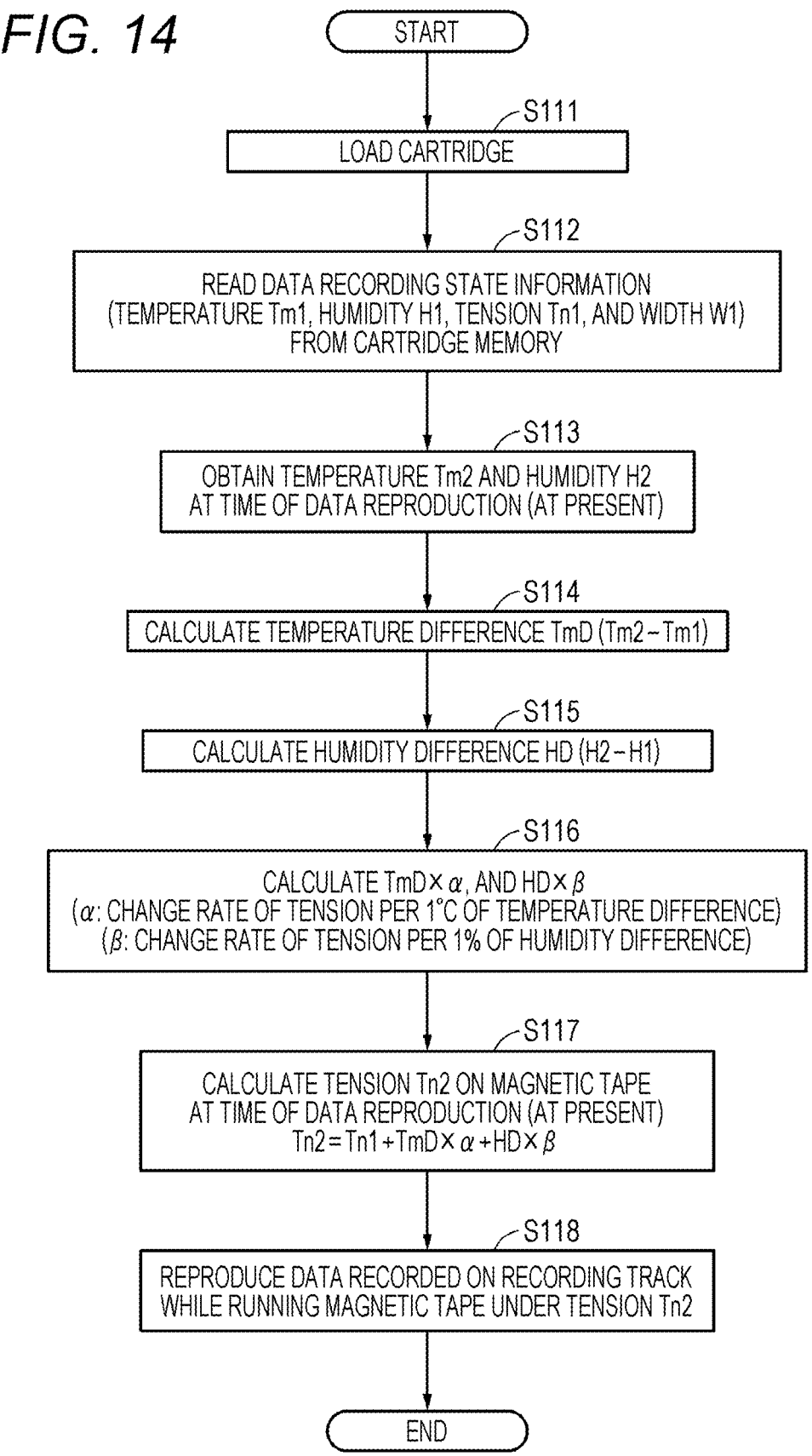
FIG. 14 is a flowchart for explaining one example of an operation of a recording and reproducing device in data reproduction.

In the following, referring to FIG. 14, one example of an operation of the recording and reproducing device 50A for data reproducing will be described.

The control device 59 performs the loading of the cartridge 10 onto the recording and reproducing device 50A (step S111). After that, by reading the cartridge memory 11 by using the reader writer 57, the control device 59 obtains the data recording state information (temperature Tm1, humidity H1, tension Tn1, and the width W1 of the magnetic tape MT) stored in the cartridge memory 11 (step S112). After that, the control device 59 obtains the information of the environmental temperature Tm2 and humidity H2 around the magnetic tape MT currently at the time of the data reproduction by the thermometer 60 and the hygrometer 61 (step S113).

After that, the control device 59 calculates out a temperature difference TmD between the temperature Tm1 at the time of data recording and the temperature Tm2 at the time of data reproduction (TmD=Tm2−Tm1) (step S114). Furthermore, the control device 59 calculates a humidity difference HD between the humidity H1 at the time of data recording and the humidity H2 at the time of data reproduction (HD=H2−H1) (step S115).

After that, the control device 59 multiplies the temperature difference TmD by a coefficient α (TmD−α), and multiplies the humidity difference HD by a coefficient β (HD×β) (step S116). The coefficient α is a value indicating how much the tension of the magnetic tape MT may need to be changed per 1° C. of the temperature difference from the tension Tn1 applied at the time of the data recording. The coefficient β is a value indicating how much the tension of the magnetic tape MT may need to be changed per 1% of the humidity difference from the tension Tn1 applied at the time of the data recording.

After that, the control device 59 adds the value of TmD×a and the value of HD×β to the tension Tn1 applied at the time of the data recording, thereby calculating out a tension Tn2 to be applied on the magnetic tape MT in the longitudinal direction at the time of data reproducing (at present) (step S117).

$$Tn2=Tn1+TmD \times \alpha + HD \times \beta$$

After determining the tension Tn2 to be applied on the magnetic tape MT at the time of data reproduction, the control device 59 controls the rotations of the spindle 51 and the reel 52 to create tension Tn2, and controls the running of the magnetic tape MT in such a manner that the magnetic tape MT runs under the tension Tn2. While reading the servo signal of the servo bands SB via the servo read heads of the head unit 56, the control device 59 reproduces the data from the data track Tk via the data write/read heads of the head unit 56 (step S118). Here, because the tension adjustment of the magnetic tape MT matches the width of the magnetic tape MT to the width that the magnetic tape MT had at the time of data recording, it may become possible to perform accurate positioning of the data write/read heads of the head unit 56 with respect to the data track Tk. This may make it possible to accurately reproduce the data from the magnetic tape MT even if the width of the magnetic tape MT changes due to some cause (such as temperature or humidity change).

Note that the value of the tension Tn2 to be applied on the magnetic tape MT at the time of data reproduction (at present) is increased if the temperature at the time of data reproduction is higher than the temperature at the time of data recording. Thus, if the temperature has increased since the data recording and caused the width of the magnetic tape MT to be wider than the width at the time of data recording, the width of the magnetic tape MT can be narrowed at the time of data reproduction to be equal to the width at the time of data recording. Conversely, the value of the tension Tn2 to be applied on the magnetic tape MT at the time of data reproduction (at present) is decreased if the temperature at the time of data reproduction is lower than the temperature at the time of data recording. Thus, if the temperature has decreased since the data recording and caused the width of the magnetic tape MT to be narrower than the width at the time of data recording, the width of the magnetic tape MT can be widened at the time of data reproduction to be equal to the width at the time of data recording. Further, the value of the tension Tn2 to be applied on the magnetic tape MT at the time of data reproduction (at present) is increased if the humidity at the time of data reproduction is higher than the humidity at the time of data recording. Thus, if the humidity has increased since the data recording and caused the width of the magnetic tape MT to be wider than the width at the time of data recording, the width of the magnetic tape MT is narrowed at the time of data reproduction to be equal to the width at the time of data recording.

Conversely, the value of the tension Tn2 to be applied on the magnetic tape MT at the time of data reproduction (at present) is decreased if the humidity at the time of data reproduction is lower than the humidity at the time of data recording. Thus, if the humidity has decreased since the data recording and caused the width of the magnetic tape MT to be narrower than the width at the time of data recording, the width of the magnetic tape MT can be widened at the time of data reproduction to be equal to the width at the time of data recording.

Here, the tension Tn2 to be applied on the magnetic tape MT at the time of data reproduction may be worked out by further using the information regarding the width W1 that the magnetic tape MT had at the time of data recording, in addition to the temperature Tm1, the humidity H1, and the tension Tn1 of the magnetic tape MT at the time of the data recording (or instead of the tension Tn1).

In this case, the control device 59 calculates out the temperature difference TmD (TmD=Tm2−Tm1) and the humidity difference HD (HD=H2−H1), as in the case described above. After that, the control device 59 multiplies the temperature difference TmD by a coefficient γ (TmD×γ), and multiplies the humidity difference HD by a coefficient δ (HD×δ) (step S116). Here, the coefficient γ is a value indicating how much the width of the magnetic tape MT will change per 1° C. of the temperature difference (a value indicating an expansion rate per unit length (width direction) against temperature). Furthermore, the coefficient δ is a value indicating how much the width of the magnetic tape MT will change per 1% of the humidity difference (a value indicating an expansion rate per unit length (width direction) against humidity).

After that, the control device 59 predicts width w2 of the magnetic tape MT presently at the time of data reproduction from the following equation on the basis of width W1 of the magnetic tape MT previously at the time of data recording:

$$W2=W1(1+TmD\times\gamma+HD2\times\delta)$$

After that, the control device 59 calculates out a difference WD between width w2 of the magnetic tape MT presently at the time of data reproduction and width W1 of the magnetic tape MT previously at the time of data recording (WD=W2−W1=W1 (TmD×γ+HD2×δ)).

Then, the control device 59 adds the value calculated by multiplying the width difference WD by a coefficient ε to the tension Tn1 that the magnetic tape MT had at the time of data recording, thereby calculating out the tension Tn2 of the magnetic tape MT at the time of data reproduction.

$$Tn2=Tn1+WD\times\varepsilon$$

Here, the coefficient ε is a value indicating how much tension may need to be applied on the magnetic tape MT in the longitudinal direction in order to change the width the magnetic tape MT by such a unit distance.

After determining the tension Tn2 to be applied on the magnetic tape MT at the time of data reproduction, the control device 59 controls the rotations of the spindle 51 and the reel 52 to create tension Tn2, and controls the running of the magnetic tape MT in such a manner that the magnetic tape MT runs under the tension Tn2. While reading the servo signal of the servo bands SB via the servo read heads of the head unit 56, the control device 59 reproduces the data from the data track Tk via the data write/read heads of the head unit 56.

Even in a case where the tension Tn2 is determined in such a method, it is possible to accurately reproduce the data from the magnetic tape MT even if the width of the magnetic tape MT changes due to some cause (such as temperature or humidity change).

[Effects]

As described so far, the second embodiment is configured such that the data recording state information of the magnetic tape MT is stored in the cartridge memory 11, so that the data recording state information can be used in reproducing the data in order to adjust the width of the magnetic tape MT as appropriate. Therefore, it may become possible to perform accurate reproduction of the data from the magnetic tape MT even if the width of the magnetic tape MT is changed due to some reason.

Furthermore, the present embodiment is configured such that the environmental temperature Tm1 and humidity H1 around the magnetic tape MT at the time of data recording (environmental information) is stored as the data recording state information. Therefore, it may become possible to appropriately deal with changes of the width of the magnetic tape MT and the width of the data track Tk, which changes are caused by changes in temperature and humidity.

<3 Modifications>
(Modification 1)

Figure 15:
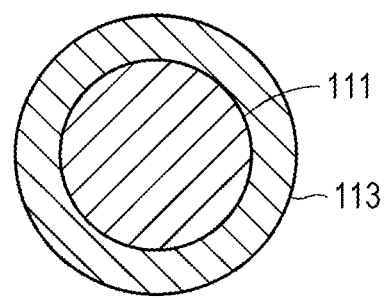
FIG. 15 is a sectional view illustrating one example of a configuration of magnetic particles in a modification.

While the first embodiment describes the configuration where the ε iron oxide particles have the shell section 112 having the two-layered structure, the ε iron oxide particles may have a shell section 113 having a single-layered structure, as illustrated in FIG. 15. In this case, the shell section 113 has a configuration similar to the first shell section 112a. However, in view of reducing the deterioration of the characteristics of the ε iron oxide particles, it is preferable that the ε iron oxide particles have a shell section 112 with a two-layered structure, as in the first embodiment.

(Modification 2)

While the first embodiment describes the configuration where the ε iron oxide particles has the core-and-shell structure, the ε iron oxide particles may include an additive instead of the core-and-shell structure, or may contain an additive in addition to the core-and-shell structure. In these cases, part of Fe in the ε iron oxide particles is substituted with the additive. Even if the ε iron oxide particles includes an additive, it may make it possible to adjust the coercive force Hc of the entire ε iron oxide particles to be a coercive force Hc suitable for recording, thereby improving easiness of recording. The additive may be a metal element other than Fe, which may be preferably a trivalent metal element, more preferably at least one of Al, Ga, or In, or further more preferably at least one of Al or Ga. Specifically, the ε iron oxide particles containing the additive is ε-$Fe_{2-x}M_xO_3$ crystal (where M is a metal element other than Fe, that may be preferably a trivalent metal element, more preferably at least one of Al, Ga, or In, or further more preferably at least one of Al or Ga, and x is 0<x<1, for example).

(Modification 3)

Instead of the ε iron oxide particles, the magnetic powder may contain powder of nano particles containing hexagonal ferrite (hereinafter, referred to as "hexagonal ferrite particles"). The hexagonal ferrite particles are hexagonal plate-like or substantially hexagonal plate-like in shape, for example. The hexagonal ferrite contains preferably at least one of Ba, Sr, Pb, or Ca, more preferably at least one of Ba or Sr. Specifically, the hexagonal ferrite may be barium ferrite or strontium ferrite. The barium ferrite may further contain at least one of Sr, Pb, or Ca, in addition to Ba. The strontium ferrite may further contain at least one of Ba, Pb, or Ca, in addition to Sr.

More specifically, hexagonal ferrite has an average composition represented by the general formula $MFe_{12}O_{19}$, where M is at least one metal of Ba, Sr, Pb, or Ca, for example, or preferably at least one metal of Ba or Sr. M may be a combination of Ba and one or more metals selected from the group consisting of Sr, Pb, and Ca. Furthermore, M may be a combination of Sr and one or more metals selected from the group consisting of Ba, Pb, and Ca. In the general formula, part of Fe may be substituted with another metal element.

In the case where the magnetic powder includes the hexagonal ferrite particles, the average particle size of the magnetic powder is preferably 30 nm or less, more preferably not less than 12 nm but not more than 25 nm, further more preferably not less than 15 nm but not more than 22 nm, especially preferably not less than 15 nm but not more than 20 nm, or most preferably not less than 15 nm but not more than 18 nm. With the configuration where the average particle size of the magnetic powder is 30 nm or less, it may become possible to give good electromagnetic conversion characteristics (for example, SNR) to a magnetic tape MT of a high recording density. On the other hand, if the average particle size of the magnetic powder is 12 nm or more, it may become possible to give the magnetic powder better dispersibility, thereby attaining better electromagnetic conversion characteristics (for example, SNR). In the configuration where the magnetic powder includes powder of the hexagonal ferrite particles, the average aspect ratio of the magnetic powder is similar to that in the first embodiment.

Note that the average particle size and average aspect ratio of the magnetic powder can be worked out as below. To being with, a magnetic tape MT to be measured is processed by the FIB technique or the like to prepare a thin sample, and a section of the thin sample is observed and pictured by using a TEM. After that, on a TEM image thus pictured, fifty of such particles oriented at angles of 75° or more with respect to a horizontal direction are randomly selected from the magnetic powder, and measured to find maximum plate thickness DA of the plate-like shape of the particles thus selected. After that, the readings of the maximum plate thickness DA of the fifty particles are simply averaged (arithmetic average) to work out an average maximum plate thickness DAave.

After that, the surface of the magnetic layer 43 of the magnetic tape MT is observed and pictured by TEM. After that, from the TEM image thus pictured, fifty particles of the magnetic powder are randomly selected and a maximum plate diameter DB of each of the particles is measured. Here, the maximum plate diameter DB is the longest one of distances between pairs of parallel lines drawn at any angles tangentially with respect to a contour of the particle (that is, the maximum plate diameter DB is so called Feret's diameter). After that, the readings of the maximum plate diameter DB of fifty particles of the magnetic powder thus measured are simply averaged (arithmetic average) to obtain an average maximum plate diameter DBave. The average maximum plate diameter DBave thus obtained is taken as the average particle size. After that, from the average maximum plate thickness DAave and average maximum plate diameter DBave, an average aspect ratio (DBave/DAave) of the magnetic powder is worked out.

In a case where the magnetic power includes the hexagonal ferrite particles, an average particle volume of the magnetic powder is preferably 5900 nm$^3$ or less, more preferably not less than 500 nm$^3$ but not more than 3400 nm$^3$, further more preferably not less than 1000 nm$^3$ but not more than 2500 nm$^3$, especially preferably not less than 1000 nm$^3$ but not more than 1800 nm$^3$, or most preferably not less than 1000 nm$^3$ but not more than 1500 nm$^3$. With the configuration where the average particle volume of the magnetic powder is 5900 nm$^3$ or less, an effect similar to that obtained with the configuration where the average particle size of the magnetic powder is 30 nm or less is obtained. On the other hand, with the configuration where the average particle volume of the magnetic powder is 500 nm$^3$ or more, an effect similar to that obtained with the configuration where the average particle size of the magnetic powder is 12 nm or more is obtained.

The average particle volume of the magnetic powder can be worked out as below. To begin with, as in the method of working out the average particle size of the magnetic powder as described above, the average maximum plate thickness DAave and average maximum plate diameter DBave are worked out. After that, the average particle volume V of the magnetic powder is worked out by the following equation:

$$V = 3\sqrt{3}/8 \times DAave \times DBave^2$$

(Modification 4)

Instead of the powder of the ε iron oxide particles, the magnetic powder may include powder of nano particles containing Co-containing spinel ferrite (hereinafter, referred to as "cobalt ferrite particles"). The cobalt ferrite particles may have preferably uniaxial anisotropy.

The cobalt ferrite particles are cubic or substantially cubic in shape, for example. The Co-containing spinel ferrite may further include at least one of Ni, Mn, Al, Cu, or Zn, in addition to Co.

The Co-containing spinel ferrite may have an average composition represented by the following equation (1), for example:

$$Co_xM_yFe_2O_z \quad (1)$$

(where M is at least one metal of Ni, Mn, Al, Cu, or Zn, for example, and x, y, and z are such values that $0.4 \leq x \leq 1.0$, $0 \leq y \leq 0.3$, $(x+y) \leq 1.0$, and $3 \leq z \leq 4$, and part of Fe may be substituted with another metal element). In the case where the magnetic powder includes the cobalt ferrite particles, the average particle size of the magnetic powder is preferably 25 nm or less, more preferably not less than 8 nm but not more than 23 nm, further more preferably not less than 8 nm but not more than 12 nm, or especially preferably not less than 8 nm but not more than 11 nm. With the configuration where the average particle size of the magnetic powder is 25 nm or less, it may become possible to give good electromagnetic conversion characteristics (for example, SNR) to a magnetic tape MT of a high recording density. On the other hand, with the configuration where the average particle size of the magnetic powder is 8 nm or more, it may become possible to improve the dispersibility of the magnetic powder, thereby obtaining greater electromagnetic conversion characteristics (for example, SNR). Furthermore, in the configuration where the magnetic powder includes powder of the cobalt ferrite particles, the average aspect ratio of the magnetic powder is similar to that in the first embodiment. Note that the average particle size and average aspect ratio of the magnetic powder can be worked out as the first embodiment described above.

An average particle volume of the magnetic powder is preferably 15000 nm$^3$ or less, more preferably not less than 500 nm$^3$ but not more than 12000 nm$^3$, especially preferably not less than 500 nm$^3$ but not more than 1800 nm$^3$, or most preferably not less than 500 nm$^3$ but not more than 1500 nm$^3$. With the configuration where the average particle volume of the magnetic powder is 15000 nm$^3$ or less, an effect similar to that obtained with the configuration where the average particle size of the magnetic powder is 25 nm or less is obtained. On the other hand, with the configuration where the average particle volume of the magnetic powder is 500 nm$^3$ or more, an effect similar to that obtained with the configuration where the average particle size of the magnetic powder is 8 nm or more is obtained. Note that the average particle volume was measured by a similar method of working out the average particle volume of the magnetic powder in the first embodiment (the method of working out the average particle volume in the case where s-iron oxide particles are cubic or substantially cubic).

(Modification 5)

The magnetic tape MT may be applicable to a library device. In this case, the library device has a configuration capable of adjusting the tension applied on the magnetic tape MT in the longitudinal direction, and may include a plurality of recording and reproducing devices each of which is a recording and reproducing device 50 of the first embodiment or a recording and reproducing device 50A of the second embodiment individually.

(Modification 6)

The servo writer may be configured to adjust the tension of the magnetic tape MT in the longitudinal direction at the time of recording the servo signal or at the like timing, in order to stabilize or substantially stabilize the width of the magnetic tape MT. In this case, the servo writer may be configured to include a detecting device for detecting the width of the magnetic tape MT, so that the servo writer may adjust the tension of the magnetic tape MT in the longitudinal direction on the basis of a result of the detection performed by the detecting device.

(Modification 7)

The magnetic tape MT is not limited to the magnetic tape for vertical recording, but may be a magnetic tape for horizontal recording. In this case, the magnetic powder may be needle-like magnetic powder such as metal magnetic powder.

(Modification 8)

While the first embodiment describes the case where the distance between the servo bands SB is used as the width-related information relating to the magnetic tape at the time of data recording, the width of the magnetic tape MT may be used.

In this case, at the time of data recording, the control device 59 calculates out width W1 of the magnetic tape MT from the distance d1 between the servo bands SB, and writes the width W1 onto the cartridge memory 11 via the reader writer 57.

At the time of data reproduction, the control device 59 reads out, from the cartridge memory 11, the width W1 that the magnetic tape MT had at the time of data recording, and calculates out width W2 of the magnetic tape MT at the time of data reproduction from the distance d2 between the servo bands SB at the time of data reproduction. After that, the control device 59 calculates out a difference ΔW between the width W1 of the magnetic tape MT at the time of data recording and the width W2 of the magnetic tape MT at the time of data reproduction, and determines whether or not the difference ΔW is within a predetermined range.

If the difference ΔW is within the predetermined range, the control device 59 controls the rotation driving of the spindle 51 and the reel 52 in such a manner that the predetermined tension is maintained. On the other hand, if the difference ΔW is not within the predetermined range, the control device 59 controls the rotation driving of the spindle 51 and the reel 52 to adjust the tension on the running magnetic tape MT in such a way to bring the difference ΔW into the predetermined range.

(Modification 9)

While the second embodiment describes the case where all of the temperatures Tm1 and Tm2, the humidity H1 and H2, the tensions Tn1 and Tn2, and the widths W1 and W2 are used as the data recording state information, the data recording sate information may be any one (or a combination of any two or three) of the temperatures Tm1 and Tm2, the humidity H1 and H2, the tensions Tn1 and Tn2, and the widths W1 and W2.

In addition to the data recording state information (temperature Tm1, humidity H1, tension Tn1, and width W1), data reproduction state information (temperature Tm2, humidity H2, tension Tn2, and width W2) may be also stored on the cartridge memory 11. For example, the data reproduction state information may be used in reproducing the data from the magnetic tape MT again at an opportunity after the data reproduction.

(Modification 10)

The first and second embodiments describe the case where the magnetic tape MT is a coating-type magnetic tape whose underlayer, magnetic layer and the like are prepared by coating (wet process). However, the magnetic tape may be a thin film-type magnetic tape whose underlayer, magnetic layer, and the like are prepared by vacuum thin film preparation such as sputtering or the like (dry process). In the case of such a thin film-type magnetic tape, the average thickness tm of the magnetic layer is preferably 9 [nm] ≤$t_m$≤90 [nm], more preferably 9 [nm]≤$t_m$≤20 [nm], or further more preferably 9 [nm]≤$t_m$≤15 [nm]. With the configuration where the average thickness $t_m$ of the magnetic layer is preferably 9 [nm]≤$t_m$≤90 [nm], it may become possible to improve electromagnetic conversion characteristics.

EXAMPLES

In the following, the present disclosure will be described in detail, referring to Examples, but it should be noted that the present disclosure is not limited to these Examples.

In these Examples, average particle volumes of magnetic powder, average particle sizes of magnetic powder, average thicknesses of base films (substrates), average thicknesses of magnetic layers, average thicknesses of underlayers, average thicknesses of back layers, average thicknesses of magnetic tapes, squareness ratios S1 of magnetic layers in the vertical direction, squareness ratios S2 of magnetic layers in the longitudinal direction, ($W_{max}$−$w_{min}$)/$W_{min}$ and Young's modulus of magnetic tapes in the longitudinal direction were worked out by the measuring methods described above in the first embodiment.

Examples 1 to 4, Comparative Examples 1, 2, 4, and 5

(Preparation of Coating Materials for Forming Magnetic Layer)

A coating material for forming a magnetic layer was prepared as below. To begin with, a first composition having the following contents was extruded by an extruder. After that, the first composition thus extruded and a second composition having the following contents were added into a stirring tank equipped with a dispenser, and a preliminary mixing was performed. After that, sand-mill mixing was further performed, and filtering was carried out to obtain the coating material for forming the magnetic layer.

(First Composition)

Powder of barium ferrite ($BaFe_{12}O_{19}$) particles (hexagonal plate-like shape, average aspect ratio 3.0, and average particle volume 2450 $nm^3$): 100 parts by mass Vinyl chloride resin (cyclohexanone solution 30 mass %): 10 parts by mass (polymerization degree 300, Mn=10000, containing, as polar groups, $OSO_3K$=0.7 mmol/g, secondary OH=0.3 mmol/g)

Aluminum oxide powder: 5 parts by mass (α-$Al_2O_3$, Average particle diameter 0.2 μm)

Carbon black: 2 parts by mass (Tokai carbon Co., Ltd., Product name: Seast TA)

(Second Composition)
Vinyl chloride resin: 1.1 parts by mass
(resin solution: resin content 30 mass %, cyclohexanone 70 mass %)
n-butyl stearate: 2 parts by mass
Methylethylketone: 121.3 parts by mass
Toluene: 121.3 parts by mass
Cyclohexanone: 60.7 parts by mass After that, into the coating material for forming the magnetic layer thus prepared, polyisocyanate (product name: coronate L, made by Nippon Polyurethane Industry Co., Ltd.) (4 parts by mass), and myristic acid (2 parts by mass) were added as curing agents.

(Preparation of Coating Materials for Forming Underlayer)

A coating material for forming an underlayer was prepared as below. To begin with, a third composition having the following contents was extruded by an extruder. After that, the third composition thus extruded and a fourth composition having the following contents were added into a stirring tank equipped with a dispenser, and a preliminary mixing was performed. After that, sand-mill mixing was further performed, and filtering was carried out to obtain the coating material for forming the underlayer.

(Third Composition)
Needle-like iron oxide particles: 100 parts by mass
($\alpha$-$Fe_2O_3$, average long axis length: 0.15 μm)
Vinyl chloride resin: 55.6 parts by mass
(Resin solution: resin content 30 mass %, cyclohexanone 70 mass %)
Carbon black: 10 parts by mass
(Average particle diameter 20 nm)

(Fourth Composition)
Polyurethane resin UR8200 (TOYOBO CO., LTD): 18.5 parts by mass
n-butyl stearate: 2 parts by mass
Methylethylketone: 108.2 parts by mass
Toluene: 108.2 parts by mass
Cyclohexanone: 18.5 parts by mass After that, into the coating material for forming the underlayer thus prepared, polyisocyanate (product name: coronate L, made by Nippon Polyurethane Industry Co., Ltd.) (4 parts by mass), and myristic acid (2 parts by mass) were added as curing agents.

(Preparation of Coating Material for Forming Back Layer)

A coating material for forming a back layer was prepared as below. The following materials were mixed in a stirring tank equipped with a dispenser, and filtered, so as to obtain the coating material for forming the back layer.

Carbon black (Asahi Carbon Co., Ltd. Product name: #80): 100 parts by mass
Polyester polyurethane: 100 parts by mass
(Nippon Polyurethane Industry Co., Ltd., product name: N-2304)
Methylethylketone: 500 parts by mass
Toluene: 400 parts by mass
Cyclohexane: 100 parts by mass (Film Formation)

With the coating materials thus prepared, an under layer of average thickness of 0.65 μm and a magnetic layer of average thickness of 85 nm were formed on a long-tape-shaped PEN film (average thickness of 4.2 μm) as the substrate (base film). On one of main surfaces of the PEN film, the coating material for forming the underlayer was applied and dried to form the underlayer on the one of the main surfaces of the PEN film. After that, on the underlayer, the coating material for forming the magnetic layer was applied and dried to form the magnetic layer on the underlayer. During the drying of the coating material for forming the magnetic layer, the magnetic powder was oriented in the thickness direction of the PEN film by a magnetic field by using a solenoid coil. Furthermore, drying conditions (drying temperature and drying time) for the coating material for forming the magnetic layer were adjusted, so that squareness ratio S1 in the thickness direction (vertical direction) of the magnetic tape would be 65% and squareness ratio S2 in the longitudinal direction would be 35%.

After that, on the other one of the main surfaces of the PEN film, on which the underlayer and the magnetic layer are formed, the coating material for forming the back layer was applied and dried to form the back layer of average thickness of 0.30 μm. After that, the PEN film with the underlayer, the magnetic layer, and the back layer formed thereon was cured. After that, the PEN film was subjected to calendaring, so as to smooth a surface of the magnetic layer.

(Cutting)

The magnetic tape thus prepared was cut to a width of ½ inches (12.65 mm). In this way, a long magnetic tape as aimed (average thickness 5.24 μm) was prepared.

Note that, in Examples 1 to 4 and Comparative Examples 1, 2, 4, and 5, the PEN film (substrate) was adjusted in terms of the stretching amounts in the width direction and longitudinal directions, the average thickness of the PEN film, the average thickness of the underlayer, and the squareness ratio of the magnetic layer so as to attain such a magnetic layer that $(w_{max}-w_{min})/w_{min}$ was in a range of 350 ppm to 550 ppm as illustrated on Table 1 and the Young's modulus in the longitudinal direction was 7.2 GPa as illustrate on Table 1.

(Writing of Servo Signal)

On the long magnetic tape thus obtained, servo signals were written by using servo writers, thereby forming five servo bands with a servo band width $W_{SB}$ of 95 μm. Note that as a result of the writing of the servo signals, a row of magnetic patterns of two diagonal lines (like hanoji character of Japanese Katakana) was formed on each servo band with predetermined intervals.

(Reeling-Up)

The magnetic tape on which the servo signals were written was reeled up around a cartridge of 102 mm×105 mm×22 mm in size (a cartridge in conformity with LTO).

(Writing of Data Signal)

The cartridge was loaded to the recording and reproducing device to be mounted to the spindle, and the spindle driving device and the reel driving device were driven to rotate. Then, while the entire magnetic tape in the cartridge was run back and forth, data was written onto the magnetic tape with track control performed on the basis of the servo signals. For the writing, the recording and reproducing device was controlled such that the recording track width W was 1100 nm and the recoding wavelength $\lambda$ was a single recording wavelength of 180 nm. Note that the recoding wavelength $\lambda$ [nm] of the data signals was 4 times greater than a magnetic reversal interval L [nm] recorded at a shortest recording wavelength (that is, the shortest recording wavelength L'=2×L, and the recording wavelength $\lambda$=2×L'). The recoding head was a ring head with a gap length of 0.2 μm.

Example 5

A magnetic tape was prepared in a similar manner as in Example 1, except that the drying conditions (drying temperature and drying time) of the coating material for forming the magnetic layer was adjusted such that the squareness ratio S1 in the thickness direction (vertical direction) of the magnetic tape was 75%, and the squareness ratio S2 in the longitudinal direction was 25%. After that, the servo signals and data signals were written onto the magnetic tape thus obtained, as in Example 1.

Example 6

A magnetic tape was prepared in a similar manner as in Example 1, except that dispersing time of the magnetic coating material with the sand mill was prolonged to attain better dispersion of the coating material, and magnetic flux application time via the solenoid for vertical orientation during the orienting of the magnetic coating material was prolonged to be longer than in Example 1, so that the squareness ratio S1 in the thickness direction (vertical direction) of the magnetic tape was 80% and the squareness ratio S2 in the longitudinal direction was 21%.

Example 7

A magnetic tape was prepared in a similar manner as in Example 1, except that dispersing time of the magnetic coating material with the sand mill was prolonged to attain better dispersion of the coating material, and magnetic flux application time via the solenoid for vertical orientation during the orienting of the magnetic coating material was prolonged to be longer than in Example 6 and further adjust the drying time, so that the squareness ratio S1 in the thickness direction (vertical direction) of the magnetic tape was 85% and the squareness ratio S2 in the longitudinal direction was 18%.

Example 8

A magnetic tape with an average thickness of 4.54 μm was prepared in a similar manner as in Example 1, except that the base film (substrate) was a PEN film with an average thickness of 3.5 μm.

Example 9

A magnetic tape with an average thickness of 4.24 μm was prepared in a similar manner as in Example 1, except that the base film (substrate) was a PEN film with an average thickness of 3.2 μm.

Example 10

A magnetic tape with an average thickness of 5.19 μm was prepared in a similar manner as in Example 1, except that coating thickness of the coating material for forming the magnetic layer was adjusted so that the magnetic layer formed on the underlayer had an average thickness of 35 nm.

Example 11

A magnetic tape was prepared in a similar manner as in Example 1, except that the magnetic powder was powder of barium ferrite ($BaFe_{12}O_{19}$) particles (hexagonal plate-like shape, average aspect ratio 2.5, and average particle volume 1500 $nm^3$).

Example 12

A magnetic tape was prepared in a similar manner as in Example 1, except that the magnetic powder was powder of barium ferrite ($BaFe_{12}O_{19}$) particles (hexagonal plate-like shape, average aspect ratio 2.8, and average particle volume 1800 $nm^3$).

Example 13

A magnetic tape was prepared in a similar manner as in Example 9. After that, data signals were written on the data band between the servo bands by using the recording and reproducing device, which was controlled to perform the recording such that the recording track width W was 1000 nm and the recoding wavelength λ was a single recording wavelength 180 nm.

Example 14

A magnetic tape was prepared in a similar manner as in Example 1, except that the magnetic powder was powder of cobalt ferrite particles (cubic shape, average particle volume 1200 $nm^3$).

Example 15

A magnetic tape was prepared in a similar manner as in Example 1, except that the magnetic powder was powder of ε iron oxide particles (spherical shape, average particle volume 1405 $nm^3$).

Example 16

A magnetic tape was prepared in a similar manner as in Example 1, except that the Young's modulus of the magnetic tape in the longitudinal direction was set to 7.0 GPa by configuring such that the average thickness of the underlayer was 0.60 μm, the average thickness of the back layer was 0.25 μm, and the average thickness of the magnetic tape was 5.14 μm.

Example 17

A magnetic tape was prepared in a similar manner as in Example 1, except that the Young's modulus of the magnetic tape in the longitudinal direction was set to 6.6 GPa by configuring such that the base film (substrate) was a long PET film with an average thickness of 4.2 μm.

Comparative Example 3

First, a magnetic tape was prepared in a similar manner as in Comparative Example 2. After that, the servo signals were written onto the magnetic tape in a similar manner as in Example 1. After that, the data signals were written onto the magnetic tape in a similar manner as in Example 1, except that the recording and reproducing device was controlled such that the data track width W was 1900 nm.

Comparative Example 6

First, a magnetic tape was prepared in a similar manner as in Example 1, except that the drying conditions (drying temperature and drying time) of the coating material for forming the magnetic layer was adjusted such that the squareness ratio S1 in the thickness direction (vertical direction) of the magnetic tape was 55%, and the squareness ratio S2 in the longitudinal direction was 45%. After that, the servo signals and data signals were written onto the magnetic tape thus obtained, as in Example 1.

Comparative Example 7

A magnetic tape was prepared in a similar manner as in Example 1, except that the Young's modulus of the magnetic tape in the longitudinal direction was set to 13.5 GPa by configuring such that the base film (substrate) was a long aramid film with an average thickness of 4.2 µm.
(Recording Capacity)
Recording capacities of the magnetic tapes were evaluated by three levels, namely A, B, and C, whose evaluation criteria were as below.
A: capable of having a recording capacity of 18 TB or more
B: capable of having a recording capacity not less than 16 TB but less than 18 TB
C: recording capacity is less than 16 TB
(Off-Track Characteristics without Tension Adjustment)
First, the cartridge was loaded to the recording and reproducing device to be mounted to the spindle, and the spindle driving device and the reel driving device were driven to rotate. Then, while the entire magnetic tape in the cartridge was run back and forth, data was read from the magnetic tape with track control performed on the basis of the servo signals.

The back and forth running driven by the recording and reproducing device was carried out in a thermo-hygrostat chamber. The running was performed at a speed of 5 m/sec. Regarding the temperature and humidity during the running, a predetermined environment change programs (for example, a program 10° C., 10%→29° C., 80%→10° C., 10% was repeated twice, making the change of 0° C., 10%→29° C., 80% over 2 hours and the change of 29° C., 80%→10° C., 10% over 2 hours) in a temperature range from 10° C. to 45° C. and in a relative humidity range 10% to 80% are gradually and repeatedly carried out independently of the running. While carrying out the running under the programs, a total time in which the data could not be read was measured for each tape as off-track time. On the basis of the off-track time, the magnetic tape was evaluated by nine levels, where "9" is the most desirable evaluation (with best off-track characteristics) and "1" is the least desirable evaluation (with worst off-track characteristics). More specifically, the nine levels of the evaluation were as below.
9: Running with no off-track
8: Running occasionally with off-track occurring once/240 sec
7: Running occasionally with off-track occurring once/120 sec
6: Running occasionally with off-track occurring once/60 sec
5: Running occasionally with off-track occurring once/30 sec
4: Running occasionally with off-track occurring once/10 sec
3: Running occasionally with off-track occurring once/2 sec
2: Occasionally stopped due to system errors caused by off-track
1: Immediately stopped due to system errors caused by off-track
(Off-Track Characteristics with Tension Adjustment)
Off-track times were measured in a similar manner as in the "Off-Track Characteristics without Tension Adjustment" above, except that the tensions of the magnetic tapes in the longitudinal direction were adjusted while running the magnetic tape back and forth by the recording and reproducing device. On the basis of the off-track time, the magnetic tape was evaluated by nine levels.

The tension adjustment of the magnetic tape in the longitudinal direction was carried out as below. That is, while running the magnetic tape back and forth by the recording and reproducing device, two or more servo tracks were reproduced at the same time to measure, during the running, the distance between the magnetic patterns continuously (every point where the servo's positional information was placed (specifically, about 6 mm each)) from shapes of the reproduction wavelength of each of the magnetic patterns of two diagonal lines (like hanoji-character of Japanese Katakana) (servo signals) in the servo tracks. Then, on the basis of the distance information between the magnetic patterns thus measured, the rotation driving of the spindle driving device and the reel driving device was controlled to automatically adjust the tension of the magnetic tape in the longitudinal direction in such a manner that the distance between the magnetic patterns would get closer to a specified width. Here, the "specified width" means a distance between two servo heads of the recording and reproducing device. Note that, during the running of the magnetic tape, the two servo heads were positioned respectively at two servo bands (servo tracks) positioned with the data band therebetween.
(SNR)
First, the reproduction signal from the magnetic tape was measured by a spectrum analyzer, so as to determine a carrier size S of the reproduction signal and a size N of cumulative noise (cumulating bands from low frequency near 0 Hz to 2 times of a reproduction signal carrier frequency) and calculate SNR (Signal-to-Noise Ratio) from S and N thus determined. After that, the SNR thus calculated out was converted to a relative value (dB) based on SNR of Comparative Example 1 as a reference media.

Table 1 lists configurations of the magnetic tapes of Examples 1 to 17 and Comparative Examples 1 to 7.

TABLE 1

| | Configuration of magnetic tape | | | | | | |
|---|---|---|---|---|---|---|---|
| | Magnetic powder composition | Magnetic powder shape | Average particle volume of magnetic powder [nm$^3$] | Average particle size of magnetic powder [nm] | Average thicknesses of base film [µm] | Materials of base film | Average thicknesses of magnetic layer [nm] |
| Example 1 | BaFe$_{12}$O$_{19}$ | Plate-like shape | 2450 | 22.5 | 4.2 | PEN | 85 |
| Example 2 | BaFe$_{12}$O$_{19}$ | Plate-like shape | 2450 | 22.5 | 4.2 | PEN | 85 |
| Example 3 | BaFe$_{12}$O$_{19}$ | Plate-like shape | 2450 | 22.5 | 4.2 | PEN | 85 |
| Example 4 | BaFe$_{12}$O$_{19}$ | Plate-like shape | 2450 | 22.5 | 4.2 | PEN | 85 |

TABLE 1-continued

| | | | | | | | |
|---|---|---|---|---|---|---|---|
| Example 5 | BaFe₁₂O₁₉ | Plate-like shape | 2450 | 22.5 | 4.2 | PEN | 85 |
| Example 6 | BaFe₁₂O₁₉ | Plate-like shape | 2450 | 22.5 | 4.2 | PEN | 85 |
| Example 7 | BaFe₁₂O₁₉ | Plate-like shape | 2450 | 22.5 | 4.2 | PEN | 85 |
| Example 8 | BaFe₁₂O₁₉ | Plate-like shape | 2450 | 22.5 | 3.5 | PEN | 85 |
| Example 9 | BaFe₁₂O₁₉ | Plate-like shape | 2450 | 22.5 | 3.2 | PEN | 85 |
| Example 10 | BaFe₁₂O₁₉ | Plate-like shape | 2450 | 22.5 | 4.2 | PEN | 35 |
| Example 11 | BaFe₁₂O₁₉ | Plate-like shape | 1500 | 17.9 | 4.2 | PEN | 85 |
| Example 12 | BaFe₁₂O₁₉ | Plate-like shape | 1800 | 19.8 | 4.2 | PEN | 85 |
| Example 13 | BaFe₁₂O₁₉ | Plate-like shape | 1500 | 17.9 | 4.2 | PEN | 85 |
| Example 14 | CoFe magnetic material | Cubic | 1200 | 10.6 | 4.2 | PEN | 85 |
| Example 15 | ε iron oxide | Spherical | 1405 | 13.9 | 4.2 | PEN | 85 |
| Example 16 | BaFe₁₂O₁₉ | Plate-like shape | 2450 | 22.5 | 4.2 | PEN | 85 |
| Example 17 | BaFe₁₂O₁₉ | Plate-like shape | 2450 | 22.5 | 4.2 | PET | 85 |
| Comparative example 1 | BaFe₁₂O₁₉ | Plate-like shape | 2450 | 22.5 | 4.2 | PEN | 85 |
| Comparative example 2 | BaFe₁₂O₁₉ | Plate-like shape | 2450 | 22.5 | 4.2 | PEN | 85 |
| Comparative example 3 | BaFe₁₂O₁₉ | Plate-like shape | 2450 | 22.5 | 4.2 | PEN | 85 |
| Comparative example 4 | BaFe₁₂O₁₉ | Plate-like shape | 2450 | 22.5 | 4.2 | PEN | 85 |
| Comparative example 5 | BaFe₁₂O₁₉ | Plate-like shape | 2450 | 22.5 | 4.2 | PEN | 85 |
| Comparative example 6 | BaFe₁₂O₁₉ | Plate-like shape | 2450 | 22.5 | 4.2 | PEN | 85 |
| Comparative example 7 | BaFe₁₂O₁₉ | Plate-like shape | 2450 | 22.5 | 4.2 | Aramid | 85 |

| | Configuration of magnetic tape | | | | | |
|---|---|---|---|---|---|---|
| | Average thicknesses of underlayer [µm] | Average thicknesses of back layer [µm] | Average thicknesses of tape [µm] | Vertical direction squareness ratio S1 [%] | Longitudinal direction squareness ratio S2 [%] | ($W_{max} - W_{min}$)/$W_{min}$ [ppm] | Longitudinal direction Young's modulus [Gpa] |
| Example 1 | 0.65 | 0.30 | 5.24 | 65 | 35 | 400 | 7.2 |
| Example 2 | 0.65 | 0.30 | 5.24 | 65 | 35 | 390 | 7.2 |
| Example 3 | 0.65 | 0.30 | 5.24 | 65 | 35 | 370 | 7.2 |
| Example 4 | 0.65 | 0.30 | 5.24 | 65 | 35 | 350 | 7.2 |
| Example 5 | 0.65 | 0.30 | 5.24 | 75 | 25 | 400 | 7.3 |
| Example 6 | 0.65 | 0.30 | 5.24 | 80 | 21 | 400 | 7.3 |
| Example 7 | 0.65 | 0.30 | 5.24 | 85 | 18 | 400 | 7.3 |
| Example 8 | 0.65 | 0.30 | 4.54 | 65 | 35 | 400 | 7.4 |
| Example 9 | 0.65 | 0.30 | 4.24 | 65 | 35 | 400 | 7.4 |
| Example 10 | 0.65 | 0.30 | 5.19 | 65 | 35 | 400 | 7.2 |
| Example 11 | 0.65 | 0.30 | 5.24 | 65 | 35 | 400 | 7.2 |
| Example 12 | 0.65 | 0.30 | 5.24 | 65 | 35 | 400 | 7.2 |
| Example 13 | 0.65 | 0.30 | 5.24 | 65 | 35 | 400 | 7.2 |
| Example 14 | 0.65 | 0.30 | 5.24 | 65 | 35 | 400 | 7.2 |
| Example 15 | 0.65 | 0.30 | 5.24 | 65 | 35 | 400 | 7.2 |
| Example 16 | 0.60 | 0.25 | 5.14 | 65 | 35 | 400 | 7.0 |
| Example 17 | 0.65 | 0.30 | 5.24 | 65 | 35 | 400 | 6.6 |
| Comparative example 1 | 0.65 | 0.30 | 5.24 | 65 | 35 | 420 | 7.2 |
| Comparative example 2 | 0.65 | 0.30 | 5.24 | 65 | 35 | 450 | 7.2 |
| Comparative example 3 | 0.65 | 0.30 | 5.24 | 65 | 35 | 450 | 7.2 |
| Comparative example 4 | 0.65 | 0.30 | 5.24 | 65 | 35 | 500 | 7.2 |
| Comparative example 5 | 0.65 | 0.30 | 5.24 | 65 | 35 | 550 | 7.2 |
| Comparative example 6 | 0.65 | 0.30 | 5.24 | 55 | 45 | 400 | 7.1 |
| Comparative example 7 | 0.65 | 0.30 | 5.24 | 65 | 35 | 400 | 13.5 |

Table 2 lists recording and reproducing formats of the magnetic tapes of Examples 1 to 17 and Comparative Examples 1 to 7.

TABLE 2

| | Recording and reproducing format | | | | | | | |
|---|---|---|---|---|---|---|---|---|
| | Number of servo tracks | Servo band width $W_{SB}$ [µm] | Magnetic reversal interval L [nm] | Linear recording density [kfci] | Data track width W [nm] | Track recording density [ktpi] | W/L | Surface recording density [Mbpsi] | Winding length [m] |
| Example 1 | 5 | 95 | 45 | 529 | 1100 | 23.1 | 24.4 | 4635 | 1020 |
| Example 2 | 5 | 95 | 45 | 529 | 1100 | 23.1 | 24.4 | 4635 | 1020 |
| Example 3 | 5 | 95 | 45 | 529 | 1100 | 23.1 | 24.4 | 4635 | 1020 |
| Example 4 | 5 | 95 | 45 | 529 | 1100 | 23.1 | 24.4 | 4635 | 1020 |
| Example 5 | 5 | 95 | 45 | 529 | 1100 | 23.1 | 24.4 | 4635 | 1020 |
| Example 6 | 5 | 95 | 45 | 529 | 1100 | 23.1 | 24.4 | 4635 | 1020 |
| Example 7 | 5 | 95 | 45 | 529 | 1100 | 23.1 | 24.4 | 4635 | 1020 |
| Example 8 | 5 | 95 | 45 | 529 | 1100 | 23.1 | 24.4 | 4635 | 1390 |

TABLE 2-continued

| | | | | | Recording and reproducing format | | | | |
|---|---|---|---|---|---|---|---|---|---|
| | Number of servo tracks | Servo band width $W_{SB}$ [μm] | Magnetic reversal interval L [nm] | Linear recording density [kfci] | Data track width W [nm] | Track recording density [ktpi] | W/L | Surface recording density [Mbpsi] | Winding length [m] |
| Example 9 | 5 | 95 | 45 | 529 | 1100 | 23.1 | 24.4 | 4635 | 1610 |
| Example 10 | 5 | 95 | 45 | 529 | 1100 | 23.1 | 24.4 | 4635 | 1030 |
| Example 11 | 5 | 95 | 45 | 529 | 1100 | 23.1 | 24.4 | 4635 | 1020 |
| Example 12 | 5 | 95 | 45 | 529 | 1100 | 23.1 | 24.4 | 4635 | 1020 |
| Example 13 | 5 | 95 | 45 | 529 | 1000 | 25.4 | 22.2 | 4635 | 1020 |
| Example 14 | 5 | 95 | 45 | 529 | 1100 | 23.1 | 24.4 | 4635 | 1020 |
| Example 15 | 5 | 95 | 45 | 529 | 1100 | 23.1 | 24.4 | 4635 | 1020 |
| Example 16 | 5 | 95 | 45 | 529 | 1500 | 16.9 | 33.3 | 4635 | 1040 |
| Example 17 | 5 | 95 | 45 | 529 | 1100 | 23.1 | 24.4 | 4635 | 1020 |
| Comparative example 1 | 5 | 95 | 45 | 529 | 1100 | 23.1 | 24.4 | 4635 | 1020 |
| Comparative example 2 | 5 | 95 | 45 | 529 | 1100 | 23.1 | 24.4 | 4635 | 1020 |
| Comparative example 3 | 5 | 95 | 45 | 529 | 1900 | 13.4 | 42.2 | 4073 | 1020 |
| Comparative example 4 | 5 | 95 | 45 | 529 | 1100 | 23.1 | 24.4 | 4635 | 1020 |
| Comparative example 5 | 5 | 95 | 45 | 529 | 1100 | 23.1 | 24.4 | 4635 | 1020 |
| Comparative example 6 | 5 | 95 | 45 | 529 | 1100 | 23.1 | 24.4 | 4635 | 1020 |
| Comparative example 7 | 5 | 95 | 45 | 529 | 1100 | 23.1 | 24.4 | 4635 | 1020 | fci: flux change per inch
tpi: track per inch
bpsi: bit per square inch
rl: Reelable Length, which is a length of a reeled magnetic tape that can be accommodated in a cartridge of 102 mm × 105 mm × 22 mm (LTO compatible).

Table 3 shows evaluation results of the magnetic tapes of Examples 1 to 17, and Comparative Examples 1 to 7.

TABLE 3

| | Evaluation | | | |
|---|---|---|---|---|
| | Recording capacity | Off-tack characteristics (without tension adjustment) | Off-tack characteristics (with tension adjustment) | SNR (dB) |
| Example 1 | B | 7 | 8 | 0 |
| Example 2 | B | 7 | 8 | 0 |
| Example 3 | B | 8 | 9 | 0 |
| Example 4 | B | 9 | 9 | 0 |
| Example 5 | B | 7 | 8 | 0.7 |
| Example 6 | B | 7 | 8 | 0.7 |
| Example 7 | B | 7 | 8 | 0.8 |
| Example 8 | A | 7 | 8 | 0 |
| Example 9 | A | 7 | 8 | 0 |
| Example 10 | B | 7 | 8 | 0 |
| Example 11 | B | 7 | 8 | 1.7 |
| Example 12 | B | 7 | 8 | 1.1 |
| Example 13 | B | 7 | 8 | 0 |
| Example 14 | B | 7 | 8 | 2.1 |
| Example 15 | B | 7 | 8 | 2.1 |
| Example 16 | B | 7 | 8 | 0 |
| Example 17 | B | 7 | 8 | 0 |
| Comparative example 1 | B | 5 | 5 | 0 |
| Comparative example 2 | B | 1 | 1 | 0 |
| Comparative example 3 | C | 6 | 6 | 0 |
| Comparative example 4 | B | 2 | 2 | 0 |
| Comparative example 5 | B | 1 | 1 | 0 |
| Comparative example 6 | B | 7 | 8 | −0.8 |
| Comparative example 7 | B | 4 | 4 | 0 |

The evaluation results of Examples 1 to 17, and Comparative Examples 1 to 7 demonstrate that, with configurations that (1) the maximum $w_{max}$ and minimum $w_{min}$ satisfies $(w_{max}-w_{min})/w_{min} \geq 400$ [ppm], that (2) the substrate (base film) contains polyester, and that (3) the squarenes ratio of the magnetic layer in the vertical direction is 65% or more, the decrease of SNR in reproducing the magnetic tape can be reduced, and the off-track characteristics can be improved even if the data track width W is 1500 nm or less. Furthermore, the evaluation results also demonstrate that the off-track characteristics can be further improved if the tension of the magnetic tape is adjusted in the longitudinal direction than if not. For example, in Example 1 the evaluation result of the off-track characteristics was improved from 7 to 8 with the tension adjustment. The evaluation results of Examples 1, and 5 to 7 demonstrate that, for the sake of better SNR, the squareness ratio in the vertical direction is preferably 75% or more, or more preferably 85% or more.

The evaluation results of Examples 1, 11, and 12 demonstrates that, for the sake of better SNR, the average particle volume of the magnetic powder is preferably 1800 $nm^3$ or less, or more preferably 1500 $nm^3$ or less.

The evaluation results of Examples 1, 14, and 15 demonstrate that these effects can be attained as long as the configurations (1) to (3) are satisfied, regardless of the kinds of magnetic powder.

The evaluation result of Comparative Example 3 demonstrate that a track width greater than 1500 nm can reduce the SNR deterioration and off-track in reproducing the magnetic tape even without the configuration (1).

The evaluation result of Comparative Example 7 demonstrates that if a substrate (base film) contains aramid, off-track characteristics attained with the tension adjustment of the magnetic tape in the longitudinal direction would not be much different from that attained without such tension adjustment. This is because the Young's modulus of the magnetic tape in the longitudinal direction is 13.5 GPa in the case where the substrate (base film) contains aramid, so that the magnetic tape MT is not so stretchable by external force, thereby making it difficult to adjust the width of the magnetic tape MT by tension control.

Furthermore, Comparative Example 7 was such that the magnetic tape with a very high Young's modulus in the longitudinal direction was poorly stretchable and highly sensitive to the writing of the servo signals and the tension change caused during drive running, which resulted in deterioration of servo signal quality.

Examples 1A to 17A, Comparative Examples 1A to 7A (Preparation of Magnetic Tape and Writing of Servo Signals)

Magnetic tapes were prepared in a similar manner as in Examples 1 to 17, and Comparative Examples 1 to 7, respectively. After that, servo signals were written on these magnetic tapes in a similar manner as in Examples 1 to 17, and Comparative Examples 1 to 7, respectively.

(Reeling-Up)

To begin with, a cartridge was prepared, which had a cartridge memory with an area for writing the tension adjustment information and was capable of writing the tension adjustment information onto the area, and reading on the tension adjustment information from the area. The cartridge had a similar size to those used in Examples 1 to 17, and Comparative Examples 1 to 7 (102 mm×105 mm×22 mm).

(Writing of Data Signal)

The cartridge was loaded to the recording and reproducing device to be mounted to the spindle, and the spindle driving device and the reel driving device were driven to rotate. Then, while the entire magnetic tape in the cartridge was run back and forth, data was written onto the magnetic tape with track control performed on the basis of the servo signals. Furthermore, in addition to the data writing, a distance d1 between the magnetic patterns at the time of data recording was measured at constant intervals (every 1 m interval) from the shape of the reproduction waveform of the servo signals, and the readings of the distance d1 thus measured was written on the cartridge memory together with the positions where the readings were measured. The recording track width W and the recording wavelength λ were measured as in Examples 1 to 17, and Comparative Examples 1 to 7, Respectively (Off-Track Characteristics with Tension Adjustment Based on Tension Adjustment Information Stored in Cartridge Memory)

Off-track times were measured in the same manner as in the "Off-Track Characteristics without Tension Adjustment" above, except that the tensions of the magnetic tapes in the longitudinal direction were adjusted while running the magnetic tape back and forth by the recording and reproducing device. On the basis of the off-track time, the magnetic tape was evaluated by nine levels.

The tension adjustment of the magnetic tape in the longitudinal direction was carried out as below. That is, while running the magnetic tape back and forth by the recording and reproducing device, two or more servo tracks were reproduced at the same time to measure, during the running, the distance between the magnetic patterns continuously (every point where the servo's positional information was placed (specifically, about 6 mm each)) from shapes of the reproduction wavelength of each of the magnetic patterns of two diagonal lines (like hanoji-character of Japanese Katakana) (servo signals) in the servo tracks, and read out the distance d1 between the magnetic patterns at the time of data recording from the cartridge memory. After that, the rotation driving of the spindle driving device and the reel driving device was controlled to automatically adjust the tension of the magnetic tape in the longitudinal direction in such a manner that the distance d2 between the magnetic patterns at the time of data reproduction would get closer to the distance d1 between the magnetic patterns at the time of data recording.

Table 4 shows evaluation results of the magnetic tapes of Examples 1A to 17A, and Comparative Examples 1A to 7A.

TABLE 4

| | Evaluation |
|---|---|
| | Off-tack characteristics (with tension adjustment based on tension adjustment information) |
| Example 1A | 9 |
| Example 2A | 9 |
| Example 3A | 9 |
| Example 4A | 9 |
| Example 5A | 9 |
| Example 6A | 9 |
| Example 7A | 9 |
| Example 8A | 9 |
| Example 9A | 9 |
| Example 10A | 9 |
| Example 11A | 9 |
| Example 12A | 9 |
| Example 13A | 9 |
| Example 14A | 9 |
| Example 15A | 9 |
| Example 16A | 9 |
| Example 17A | 9 |
| Comparative example 1A | 6 |
| Comparative example 2A | 1 |
| Comparative example 3A | 6 |
| Comparative example 4A | 2 |
| Comparative example 5A | 1 |
| Comparative example 6A | 9 |
| Comparative example 7A | 4 |

Table 4 demonstrates that the tension adjustment of the magnetic tape on the basis of the tension adjustment information stored in the cartridge memory can further improve the off-track characteristics, compared with the case where the tension adjustment was carried out on the basis of the specified width (distance between two servo heads) stored in the recording and reproducing device in advance.

So far, the embodiments and modifications of the present disclosure have been described, but it should be noted that the present disclose is not limited to these embodiment and the modification, and may be varied in various ways based on technical concept of the present disclosure. For example, the configurations, methods, steps, shapes, materials, values, and the like exemplified in the embodiments and modifications are illustrative only, and may be varied as necessary or combined with each other, as long as such variations or combination do not depart from the gist of the present disclosure.

It should be understood that the chemical formulas of compounds and the like exemplified in the embodiment and modifications are representative and illustrative, and a general name of compound is not limited to the valencies etc. described herein, encompassing variations of the same general name with different valencies, etc.

Regarding the numerical ranges gradually narrowed down in the embodiments and modifications, it should be understood that the upper limit or lower limit of a numerical range in series of narrowed-down numerical ranges may be replaced with the upper limit or lower limit of another numerical range in the series of numerical ranges. The materials exemplified in the embodiments and modifications may be used solely or two or more of them may be used in combination, unless otherwise specified.

Additionally, the present disclosure may also be configured as below.

(1)

A tape-type magnetic recording medium, including:
a substrate; and
a magnetic layer provided on the substrate, in which $$(w_{max} - w_{min})/w_{min} \leq 400 \text{ [ppm]} \quad (1)$$

where $w_{max}$ and $w_{min}$ are respectively maximum and minimum of average values of width of the magnetic recording medium measured under four environments whose temperature and relative humidity are (10° C., 10%), (10° C., 80%), (29° C., 80%), and (45° C., 10%), respectively,
the substrate containing polyester, and
the magnetic layer having a squareness ratio of 65% or more in the vertical direction.

(2)

The magnetic recording medium according to (1), in which the magnetic layer is configured such that a plurality of data tracks is formable on the magnetic layer, and the plurality of data tracks is 1500 nm or less in width.

(3)

The magnetic recording medium according to (1) or (2), in which the magnetic recording medium is configured to be used in a recording and reproducing device capable of recording data with a data track width of 1500 nm or less.

(4)

The magnetic recording medium according to any one of (1) to (3), in which a Young's modulus of the magnetic recording medium is less than 8.0 GPa in a longitudinal direction.

(5)

The magnetic recording medium according to any one of (1) to (4), in which a Young's modulus of the substrate is less than 7.5 GPa in a longitudinal direction.

(6)

The magnetic recording medium according to any one of (1) to (5), in which the magnetic layer has a squareness of 35% in a longitudinal direction.

(7)

The magnetic recording medium according to any one of (1) to (6), in which the magnetic layer is configured to be capable of recording data such that the ratio W/L is W/L≤35, where L is a minimum magnetic reversal interval and W is a data track width.

(8)

The magnetic recording medium according to any one of (1) to (7), in which the magnetic layer is configured to be capable of recording data such that the ratio W/L is W/L≤30, where L is a minimum magnetic reversal interval and W is a data track width.

(9)

The magnetic recording medium according to any one of (1) to (8), in which the magnetic layer is configured to be capable of recording data such that L is 48 nm or less, where L is a minimum magnetic reversal interval.

(10)

The magnetic recording medium according to any one of (1) to (9), in which
the magnetic layer includes a plurality of servo bands, and
a ratio of a total area of the servo bands over a surface area of the magnetic layer is 4.0% or less.

(11)

The magnetic recording medium according to (10), in which the magnetic layer includes five or more servo bands.

(12)

The magnetic recording medium according to (10), in which the magnetic layer includes 5+4n servo bands (where n is a positive integer).

(13)

The magnetic recording medium according to any one of (10) to (12), in which the servo bands are 95 μm or less in width.

(14)

The magnetic recording medium according to any one of (1) to (13), having an average thickness of 5.6 μm or less.

(15)

The magnetic recording medium according to any one of (1) to (14), in which the substrate has an average thickness of 4.2 μm or less.

(16)

The magnetic recording medium according to any one of (1) to (15), in which the magnetic layer has an average thickness of 90 nm or less.

(17)

The magnetic recording medium according to any one of (1) to (16), in which 650 [ppm/N]≤Δw, where Δw is a width-direction size change amount caused due to a tension change in a longitudinal direction.

(18)

The magnetic recording medium according to any one of (1) to (17), in which 6 [ppm/° C.]≤α≤8 [ppm/° C.], where α is a temperature coefficient of expansion, and β≤5 [ppm/% RH], where β is a humidity coefficient of expansion.

(19)

The magnetic recording medium according to any one of (1) to (18), in which 0.3≤ρ, where ρ is a Poisson ratio.

(20)

The magnetic recording medium according to any one of (1) to (19), in which 0.8 [N]≤$\sigma_{MD}$, where $\sigma_{MD}$ is an elastic limit in a longitudinal direction.

(21)
The magnetic recording medium according to any one of (1) to (20), in which
the magnetic layer contains magnetic powder, and
the magnetic powder contains hexagonal ferrite, ε iron oxide, or Co-contained spinel ferrite.
(22)
The magnetic recording medium according to (21), in which an average aspect ratio of the magnetic powder is not less than 1.0 but not more than 3.0.
(23)
The magnetic recording medium according to (21) or (22), in which
the hexagonal ferrite contains at least one of Ba or Sr, and
the ε iron oxide contains at least one of Al or Ga.
(24)
The magnetic recording medium according to (21), in which the magnetic powder contains the hexagonal ferrite and has an average particle volume not less than 1000 nm³ but not more than 1800 nm³.
(25)
The magnetic recording medium according to any one of (1) to (24), further including an underlayer between the substrate and the magnetic layer
(26)
A cartridge, including:
the magnetic recording medium according to any one of (1) to (25); and
a memory including an area for storing adjustment information for adjusting a tension applied on the magnetic recording medium in a longitudinal direction.
(27)
The cartridge according to (26), further including:
a communication unit for communicating with a recording and reproducing device; and
a control unit for recording, in the area, the adjustment information received via the communication unit from the recording and reproducing device, reading out the adjustment information from the area in response to a request from the recording and reproducing device, and transmitting the adjustment information to the recording and reproducing device via the communication unit.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10 Cartridge
11 Cartridge memory
31 Antenna coil
32 Rectification and power circuit
33 Clock circuit
34 Detection and modulation circuit
35 Controller
36 Memory
36A First storage area
36B Second storage area
41 Substrate
42 Underlayer
43 Magnetic layer
44 Back layer
50, 50A Recording and reproducing device
51 Spindle
52 Reel
53 Spindle driving device
54 Reel driving device
55 Guide roller
56 Head unit
57 Reader writer
58 Communication interface
59 Control device
60 Thermometer
61 Hygrometer
100, 100A Recording and reproducing system
MT Magnetic tape

The invention claimed is:
1. A tape-type magnetic recording medium, comprising:
a substrate; and
a magnetic layer provided on the substrate, wherein

$$(w_{max} - w_{min})/w_{min} \leq 400 \text{ [ppm]} \qquad (1)$$

where $w_{max}$ and $w_{min}$ are respectively maximum and minimum of average values of width of the magnetic recording medium measured under four environments whose temperature and relative humidity are (10° C., 10%), (10° C., 80%), (29° C., 80%), and (45° C., 10%), respectively,
the substrate containing polyester, and
the magnetic layer having a squareness ratio of 65% or more in the vertical direction.
2. The magnetic recording medium according to claim 1, wherein
the magnetic layer is configured such that a plurality of data tracks is formable on the magnetic layer, and
the plurality of data tracks is 1500 nm or less in width.
3. The magnetic recording medium according to claim 1, wherein the magnetic recording medium is configured to be used in a recording and reproducing device capable of recording data with a data track width of 1500 nm or less.
4. The magnetic recording medium according to claim 1, wherein the magnetic recording medium has a Young's modulus of less than 8.0 GPa in a longitudinal direction.
5. The magnetic recording medium according to claim 1, wherein the substrate of a Young's modulus is less than 7.5 GPa in a longitudinal direction.
6. The magnetic recording medium according to claim 1, wherein the magnetic layer has a squareness ratio of 35% or less in a longitudinal direction.
7. The magnetic recording medium according to claim 1, wherein the magnetic layer is configured to be capable of recording data such that the ratio W/L is W/L≤35, where L is a minimum magnetic reversal interval and W is a data track width.
8. The magnetic recording medium according to claim 1, wherein the magnetic layer is configured to be capable of recording data such that the ratio W/L is W/L≤30, where L is a minimum magnetic reversal interval and W is a data track width.
9. The magnetic recording medium according to claim 1, wherein the magnetic layer is configured to be capable of recording data such that L is 48 nm or less, where L is a minimum magnetic reversal interval.
10. The magnetic recording medium according to claim 1, wherein
the magnetic layer includes a plurality of servo bands, and
a ratio of a total area of the servo bands over a surface area of the magnetic layer is 4.0% or less.
11. The magnetic recording medium according to claim 10, wherein the magnetic layer includes five or more servo bands.

12. The magnetic recording medium according to claim 10, wherein the magnetic layer includes 5+4n servo bands where n is a positive integer.

13. The magnetic recording medium according to claim 10, wherein the servo bands are 95 μm or less in width.

14. The magnetic recording medium according to claim 1, wherein the magnetic recording medium has an average thickness of 5.6 μm or less.

15. The magnetic recording medium according to claim 1, wherein the substrate has an average thickness of 4.2 μm or less.

16. The magnetic recording medium according to claim 1, wherein the magnetic layer has an average thickness of 90 nm or less.

17. The magnetic recording medium according to claim 1, wherein 650 [ppm/N]≤Δw, where Δw is a width-direction size change amount caused due to a tension change in a longitudinal direction.

18. The magnetic recording medium according to claim 1, wherein 6 [ppm/° C.]≤α≤8 [ppm/° C.], where a is a temperature coefficient of expansion, and β≤5 [ppm/% RH], where β is a humidity coefficient of expansion.

19. The magnetic recording medium according to claim 1, wherein 0.3 ρ, where ρ is a Poisson ratio.

20. The magnetic recording medium according to claim 1, wherein 0.8 [N]≤$\sigma_{MD}$, where $\sigma_{MD}$ is an elastic limit in a longitudinal direction.

21. The magnetic recording medium according to claim 1, wherein
the magnetic layer contains magnetic powder, and
the magnetic powder contains hexagonal ferrite, ε iron oxide, or Co-contained spinel ferrite.

22. The magnetic recording medium according to claim 21, wherein an average aspect ratio of the magnetic powder is not less than 1.0 but not more than 3.0.

23. The magnetic recording medium according to claim 21, wherein
the hexagonal ferrite contains at least one of Ba or Sr, and
the ε iron oxide contains at least one of Al or Ga.

24. The magnetic recording medium according to claim 21, wherein
the magnetic powder contains the hexagonal ferrite and has an average particle volume not less than 1000 nm³ but not more than 1800 nm³.

25. The magnetic recording medium according to claim 1, further comprising an underlayer between the substrate and the magnetic layer.

26. A cartridge, comprising:
the magnetic recording medium according to claim 1; and
a memory including an area for storing adjustment information for adjusting a tension applied on the magnetic recording medium in a longitudinal direction.

27. The cartridge according to claim 26, further comprising:
a communication unit for communicating with a recording and reproducing device; and
a control unit for recording, in the area, the adjustment information received via the communication unit from the recording and reproducing device, reading out the adjustment information from the area in response to a request from the recording and reproducing device, and transmitting the adjustment information to the recording and reproducing device via the communication unit.

* * * * *